(12) United States Patent
Williams

(10) Patent No.: US 12,075,733 B2
(45) Date of Patent: Sep. 3, 2024

(54) IRRIGATION SYSTEM

(71) Applicant: Christopher Guy Williams, Spokane, WA (US)

(72) Inventor: Christopher Guy Williams, Spokane, WA (US)

(*) Notice: Subject to any disclaimer, the term of this patent is extended or adjusted under 35 U.S.C. 154(b) by 149 days.

(21) Appl. No.: 17/803,680

(22) Filed: Oct. 11, 2022

(65) Prior Publication Data

US 2023/0320293 A1 Oct. 12, 2023

Related U.S. Application Data

(60) Provisional application No. 63/360,559, filed on Oct. 13, 2021.

(51) Int. Cl.
*A01G 25/09* (2006.01)

(52) U.S. Cl.
CPC ......... *A01G 25/097* (2013.01); *A01G 25/092* (2013.01)

(58) Field of Classification Search
CPC ..... A01G 25/09; A01G 25/092; A01G 25/097
USPC ......................................... 239/723, 741–743
See application file for complete search history.

(56) References Cited

U.S. PATENT DOCUMENTS

| | | |
|---|---|---|
| 2,750,228 A | 6/1956 | Engel |
| 3,255,969 A | 6/1966 | Stafford |
| 3,381,893 A | 5/1968 | Smith |
| 3,444,941 A | 5/1969 | Purtel |
| 3,463,175 A | 8/1969 | Rogers |
| 3,831,692 A | 8/1974 | Fry |
| 4,036,436 A | 7/1977 | Standal |
| 4,172,551 A * | 10/1979 | Johnson ............... A01G 25/097 239/733 |
| 4,192,335 A | 3/1980 | Standal |
| 4,295,607 A | 10/1981 | Nobel |
| 4,330,085 A | 5/1982 | Siekmeier |
| 4,350,295 A | 9/1982 | Gheen |
| 4,405,085 A | 9/1983 | Meyer |
| 4,413,783 A | 11/1983 | Ostrum |
| 4,609,187 A | 9/1986 | Chapman |
| 4,632,494 A * | 12/1986 | Newell .................. A01G 25/09 239/741 |
| 4,877,189 A | 10/1989 | Williams |
| 4,899,934 A | 2/1990 | Krisle |

(Continued)

*Primary Examiner* — Steven J Ganey

(57) ABSTRACT

A fully automated irrigation system to irrigate regular and irregular shapes of land. The system includes a water delivery pipe assembly configured to travel linearly while irrigating adjacent to a stationary row of water main spaced access valves. The system includes an automated connector configured to supply water from the access valves to the water delivery pipe assembly. The connector includes a swing arm, a compensator, a valve coupler, a lift and a swinger. The swing arm facilitates positioning a coupler body above a next-up access valve and facilitates positioning the delivery pipe assembly. The compensator compensates for distance change between a coupled-to access valve and the delivery pipe assembly when the assembly travels. A coupler body resides at an outer end of the swing arm. The lift raises and lowers the swing arm to couple and uncouple respectively the coupler body along the row of access valves. The lift also holds the swing arm above the ground while the swinger swings the swing arm proximate to the next-up access valve for subsequent coupling the coupler body thereto.

20 Claims, 24 Drawing Sheets

(56) References Cited

U.S. PATENT DOCUMENTS

| | | | |
|---|---|---|---|
| 5,246,164 | A | 9/1993 | McCann |
| 6,431,475 | B1 | 8/2002 | Williams |
| 6,726,132 | B2 | 4/2004 | Malsam |
| 8,591,925 | B2 | 10/2013 | Korus |
| 9,301,459 | B1 | 4/2016 | Williams |
| 9,386,753 | B1 | 7/2016 | Charipar |
| 10,477,784 | B1 | 11/2019 | Williams |
| 10,687,484 | B1 | 6/2020 | Williams |
| 2003/0066913 | A1 | 4/2003 | Reinke |
| 2013/0341419 | A1* | 12/2013 | Pfrenger .............. A01G 25/097 239/743 |
| 2014/0326808 | A1* | 11/2014 | Malsam ............... A01G 25/092 239/728 |

* cited by examiner

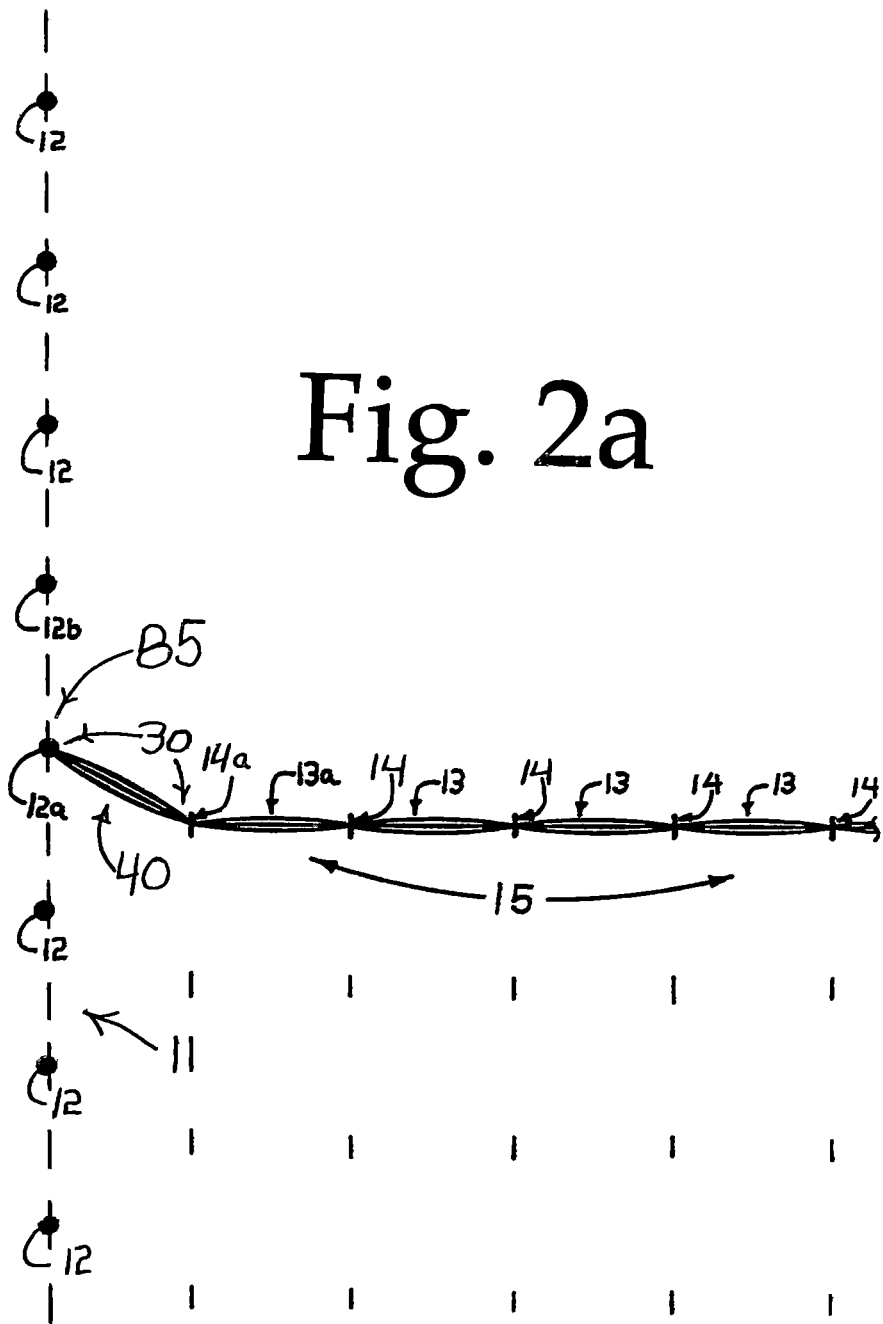

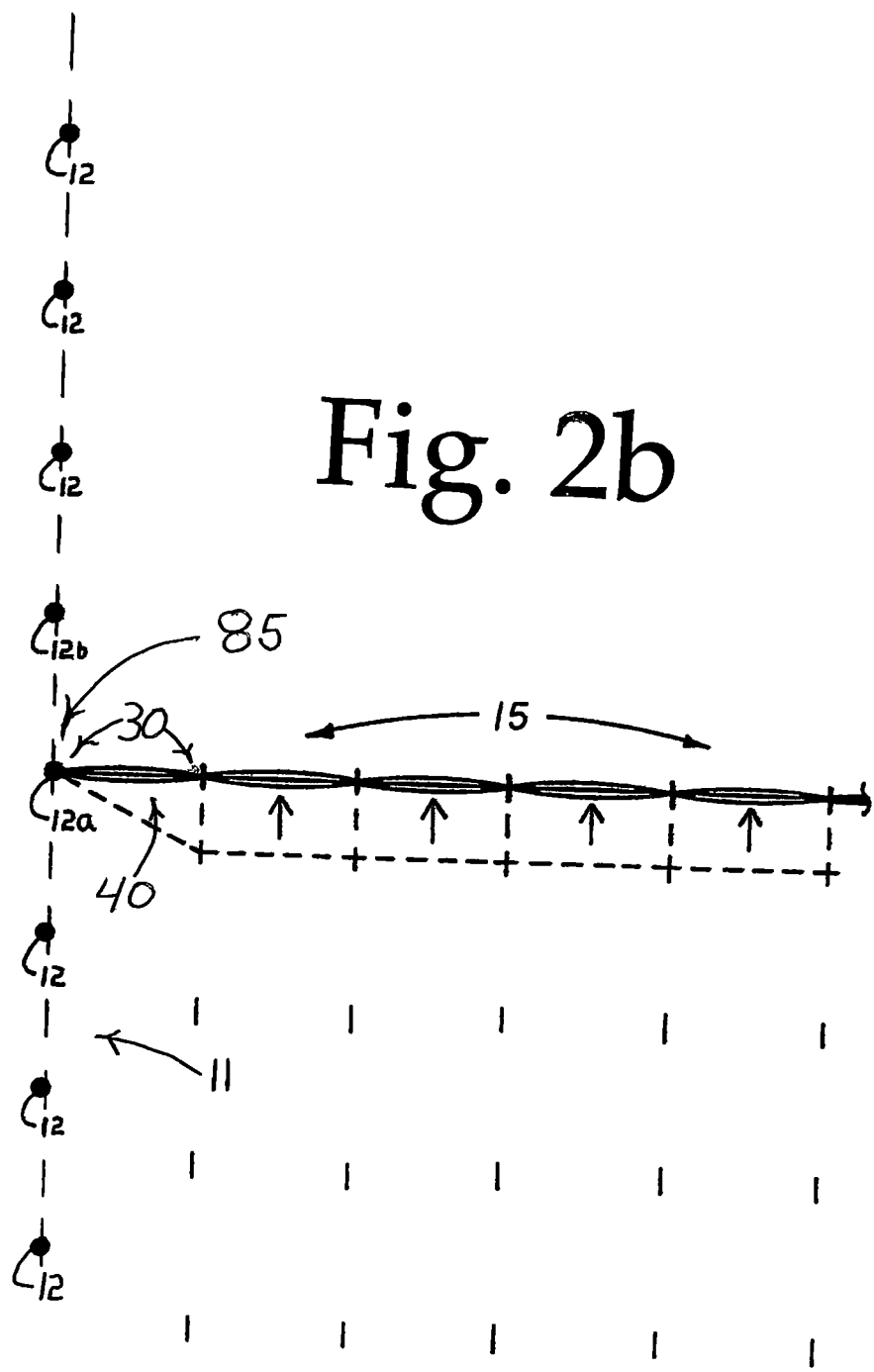

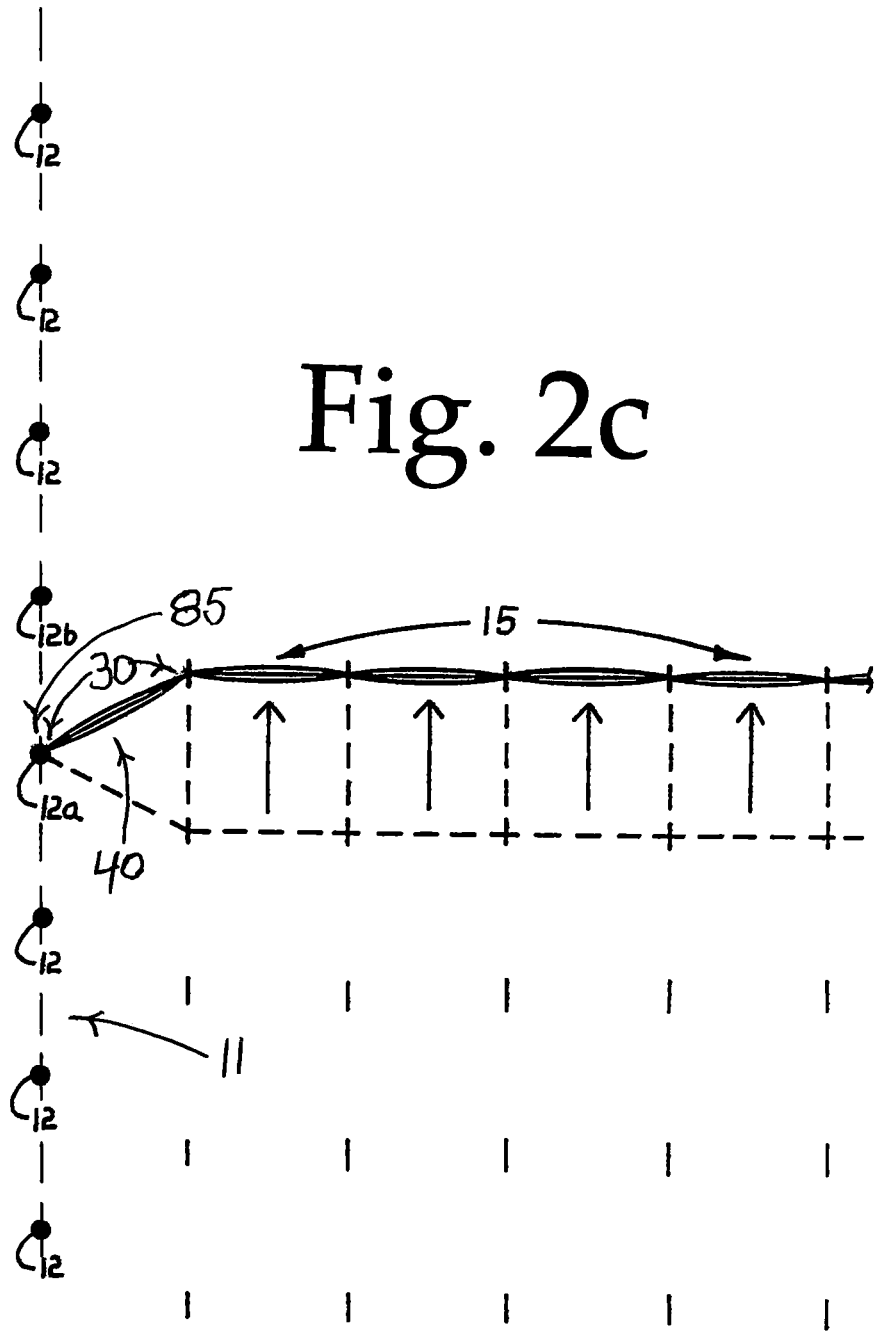

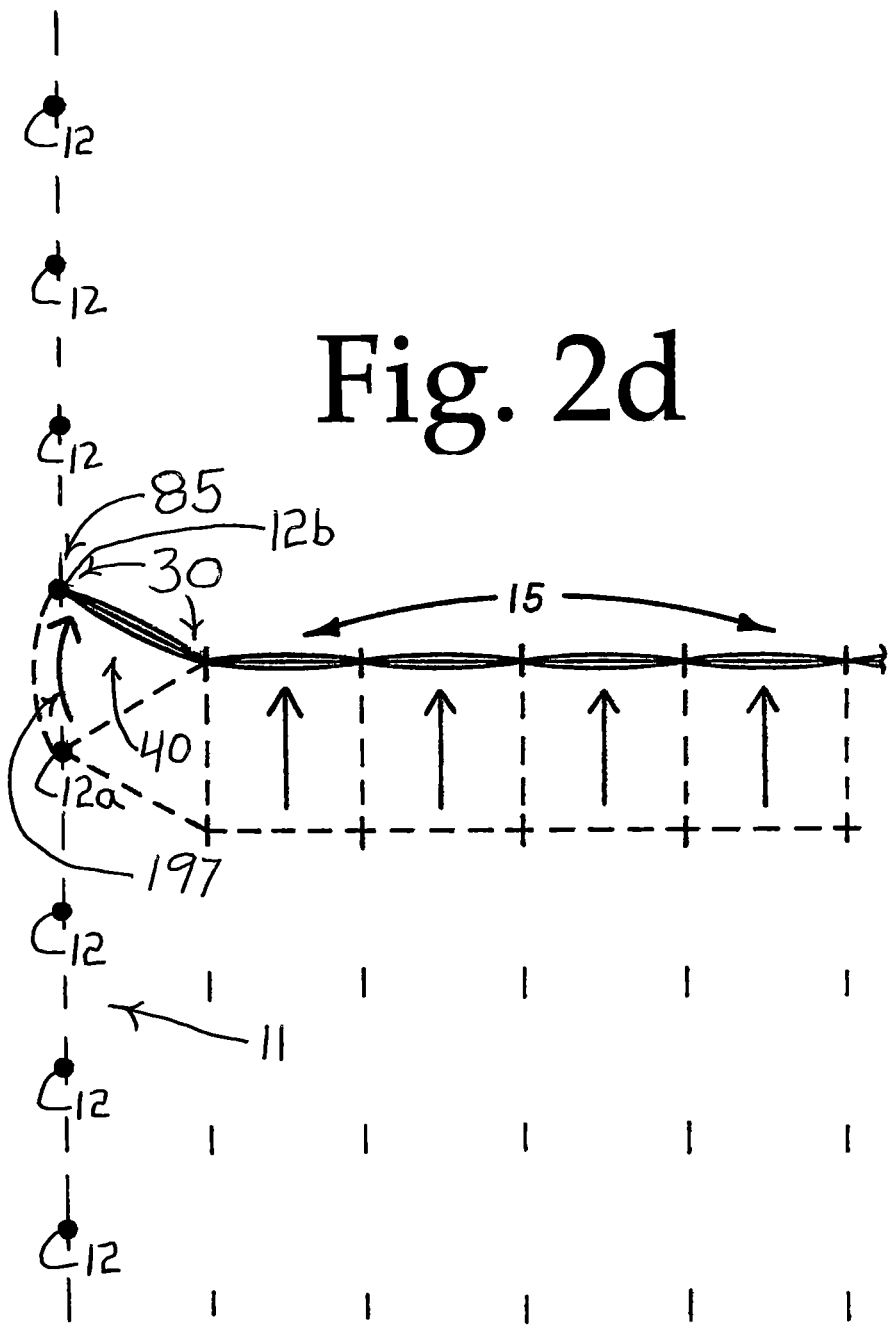

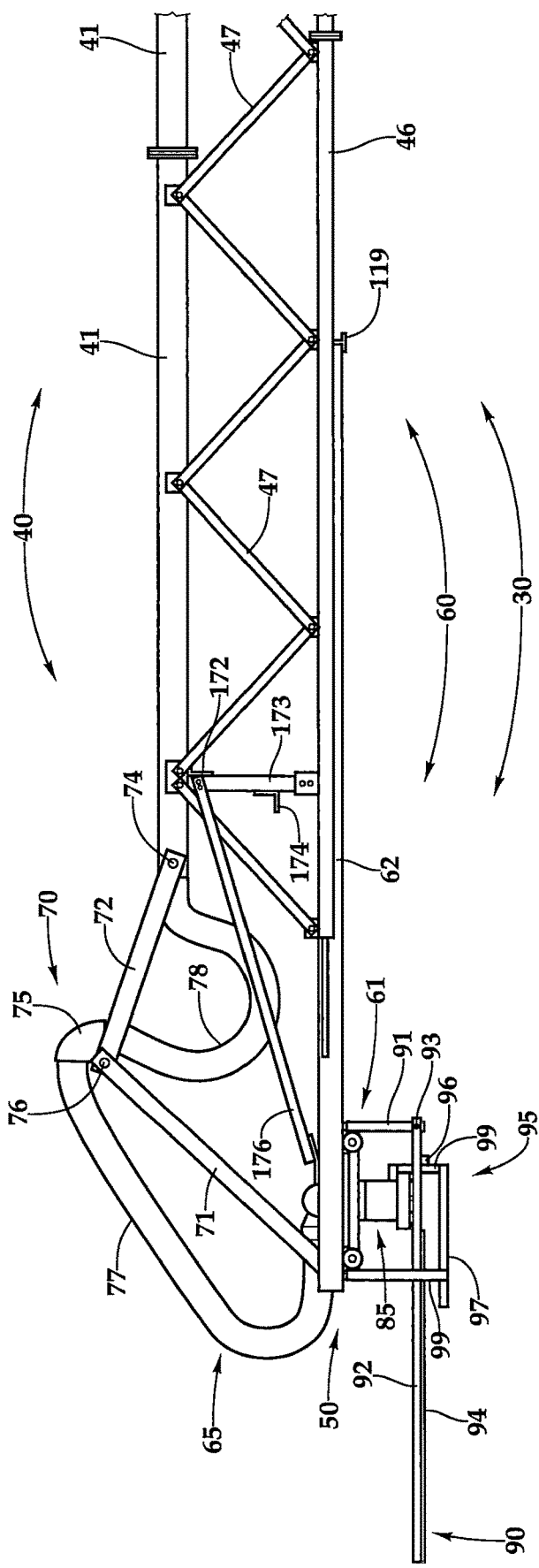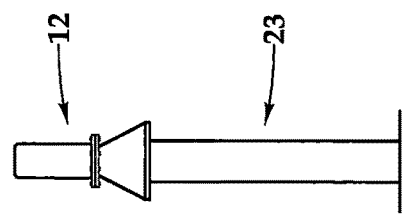
Fig.10

IRRIGATION SYSTEM

FIELD OF THE INVENTION

The present invention pertains to a new approach toward forwarding a water main connection which enables adoption of presently hamstrung high efficiency irrigation practices.

BACKGROUND

Movable sprinklers, including a series of nozzles mounted along a delivery pipe that moves linearly along a series of access valves, have been in use for decades. One approach has the movable delivery pipe stationary while irrigating. After irrigating that narrow patch, the delivery pipe is disconnected from the water main and moved forward to a successive access valve and then reconnected to the water main.

However, it is highly preferable, more efficient, to slowly forward the delivery pipe during irrigation. Many ways have been suggested to manually forward the connection after intervals of forward traveling linear irrigation. Manually forwarding a draggable hose is today's most common practice. Manual connection forwarding introduces labor costs, large hose-related pressure loss expense and operational limitations to the forward traveling linear-move irrigation. Absent these costs, expense and limitations, linear-move irrigation would be a widely adopted method of irrigation water application. Center pivot irrigators are presently widely adopted yet linear irrigator water application is considerably more efficient. Linear irrigators provide uniform water distribution and uniform output while center pivot irrigators display uneven distribution and must ramp-up output toward the outer end. Furthermore, land is generally parceled up into rectangles and linear-move irrigators irrigate rectangles. Conversely, pivots irrigate circles leaving the corners dry or requiring problematic attachments in the attempt to catch the corners. Additionally, pivots typically employ an end gun in an attempt to catch some of the corner, the end gun of poor efficiency due to evaporation, wind and poor uniformity. Linear-move irrigators inherently catch all of the corner and, so, need not be compromised by the poor efficiency of an end gun.

Many methods have been suggested to automate the forwarding of the supply main connection. Suggested methods found include: Engel U.S. Pat. No. 2,750,228; Hogg U.S. Pat. No. 3,281,080; Smith U.S. Pat. No. 3,381,893; Purtell U.S. Pat. No. 3,444,941; Rogers U.S. Pat. No. 3,463,175; Nobel U.S. Pat. No. 4,295,607; and Nobel U.S. Pat. No. 4,274,584. All of these methods are very elaborate. Furthermore, all of these methods limit the delivery pipe to straight line travel only. Consequently, after completing an irrigation across a field, the delivery pipe must reverse travel the irrigated field in order to assume its original starting position.

U.S. Pat. No. 6,431,475 issued to Williams and U.S. Pat. No. 9,301,459 issued to Williams disclose improved affordability and more reliable automated connector forwarding for traveling linear-move sprinkler irrigation (a.k.a. lateral-move irrigation). The Williams connectors also provide that the linear-move irrigator can be rotated at field's end to irrigate a field along the opposite side of the water main. Thus, Williams circumvents the reverse travel requirement of the prior cited references and utilizes one length of irrigator and one set of valves to irrigate two fields (i.e. enhanced system affordability). For valve coupling and de-coupling as disclosed in U.S. Pat. No. 6,431,475, ground transport wheels are configured to raise and lower respectively relative to a swing arm. Raising the transport wheels lowers the swing arm and a coupler body there-mounted providing for the coupler body to couple to an access valve. For valve coupling and de-coupling as disclosed in U.S. Pat. No. 9,301,459, the ground transport wheels are fixed to the swing arm and the valve coupler body is raised and lowered independent of the swing arm providing for the coupler body to couple to an access valve. Both patents use ground transport wheels to transport the swing arm outer end, and thus to transport the coupler body, across the ground from one water main access valve connection to the next water main access valve connection.

BRIEF DESCRIPTION OF THE DRAWINGS

A form of the invention is illustrated in the accompanying drawings in which:

FIGS. 2a, 2b, and 2c are diagrammatic plan views, each view illustrating an orientation between the FIG. 1 delivery pipe assembly and automated connector.

FIG. 2d is a diagrammatic plan view depicting a coupler body swing from a previously coupled-to access valve to a next-up access valve.

FIG. 9 is a top view of the delivery-pipe-end of FIG. 8a.

FIG. 10 is an enlarged side elevation view of the outer end of the swing arm when the connector is positioned relative to the delivery pipe as depicted in FIG. 2c with the coupler body having been disconnected from the access valve.

DETAILED DESCRIPTION

Figure 1:
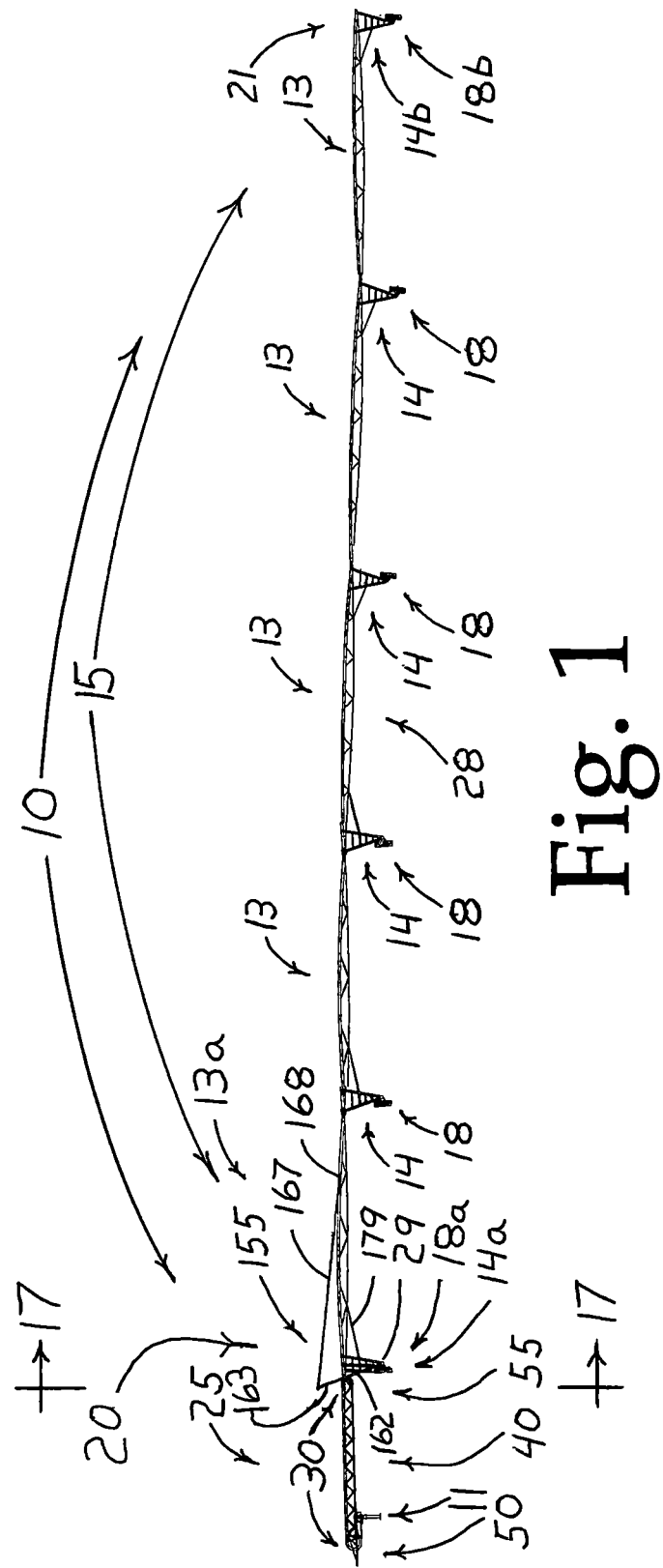
FIG. 1 is a side elevation view of an automated connector of the present invention attached to a linear-move water delivery pipe assembly.

The present invention pertains to forwarding a water main connection to supply water to a linear-move irrigator. Access valves are mounted spaced along the water main enabling selective access to the water therein. The linear-move irrigator is positioned perpendicular to the water main and travels linearly thus traveling parallel to the succession of spaced valves along the water main. Embodiments herein disclose a valve coupler body residing at an outer end of a swing arm. When coupled to an access valve, irrigation water flows from the water main through the coupler body, through the swing arm and into the linear-move irrigator. When irrigation has been completed about a coupled-to access valve, the swing arm with coupler body residing at the outer end is swung through the air positioning the coupler body for coupling to the next-up access valve.

The linear-move irrigator has an inlet end, the inlet end being the end of the irrigator near the water main and has a far end, the far end being the irrigator end remote from the water main. The swing arm is attached to the inlet end. The swing arm outer end, with coupler body, is swung through the air. The swing is pivoted about the swing arm attachment to the inlet end. The swing arm is of a sufficient length so that the swing carries the coupler body essentially directly between the two water main access valves.

Embodiments herein disclose acting between the swing arm and the inlet end of the linear-move irrigator to swing the swing arm. Embodiments herein disclose acting between the swing arm and the inlet end of the linear-move irrigator to raise and lower the coupler body and, additionally, to hold the swing arm outer end off of the ground so that the coupler body can be swung through the air. The benefits of the present invention relative to cited U.S. Pat. Nos. 6,431,475 and 9,301,459 to Williams include:

Eliminates ground transport components, for example hydraulic wheel motors, tires, rims, hydraulic lines, and elaborate mounting structure.

Eliminates wheel ruts from transport tires.

Eliminates transport tires getting stuck in mud.

Eliminates the risk of humans getting run over by transport tires.

Eliminates energy expense associated with transport wheels trudging through mud.

Eliminates pivoting ground support about an access valve and the associated complexities and hardware expense.

Eliminates concrete ground support around every access valve riser and the need to keep that concrete ground support free of debris.

Eliminates the crop getting caught in the valve finding mechanism(s).

Positions valve coupling above the crop zone meaning no crop/humans get there-caught.

And, simplifies coupler body alignment subsequently reducing the hardware expense.

The present invention generally relates to linear-move irrigators (also known as lateral-move irrigators). An example of the present invention, referred to herein as a linear-move irrigation system 10, is illustrated in the side elevation view of FIG. 1. The exemplary system 10 employs a linear-move water delivery pipe assembly 15 and a connector 25 as illustrated.

Figure 3A:
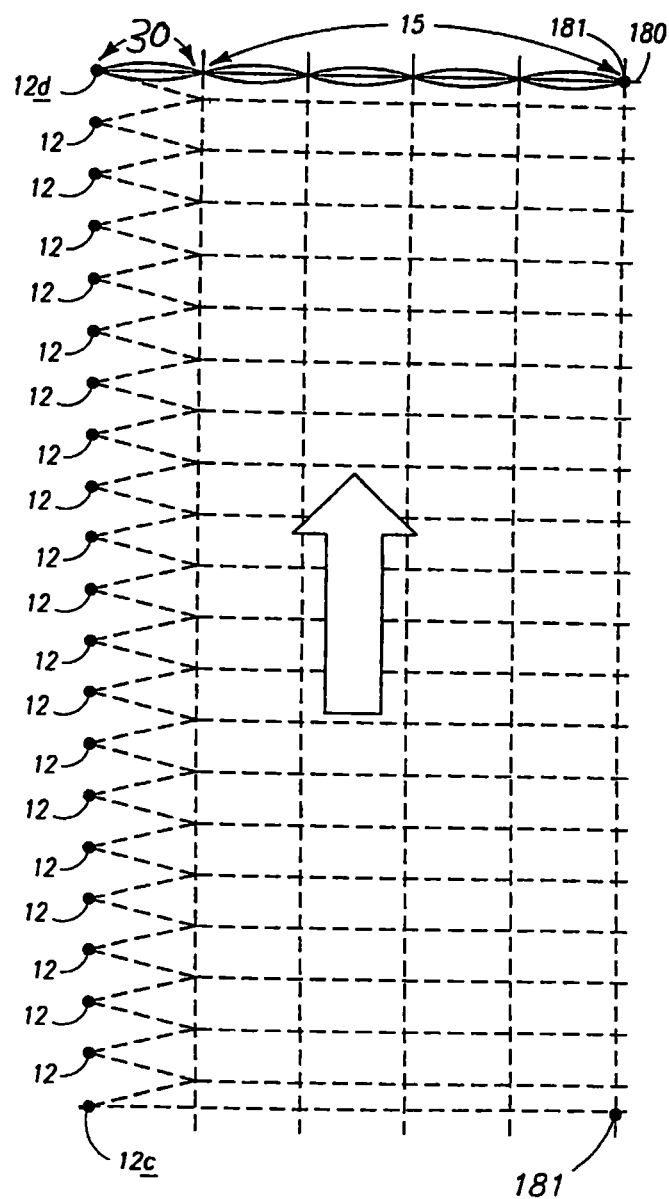
FIG. 3a is a diagrammatic plan view-depicting linear-move travel of the water delivery pipe assembly and associated connection forwarding along a series of water main access valves.
Figure 3B:
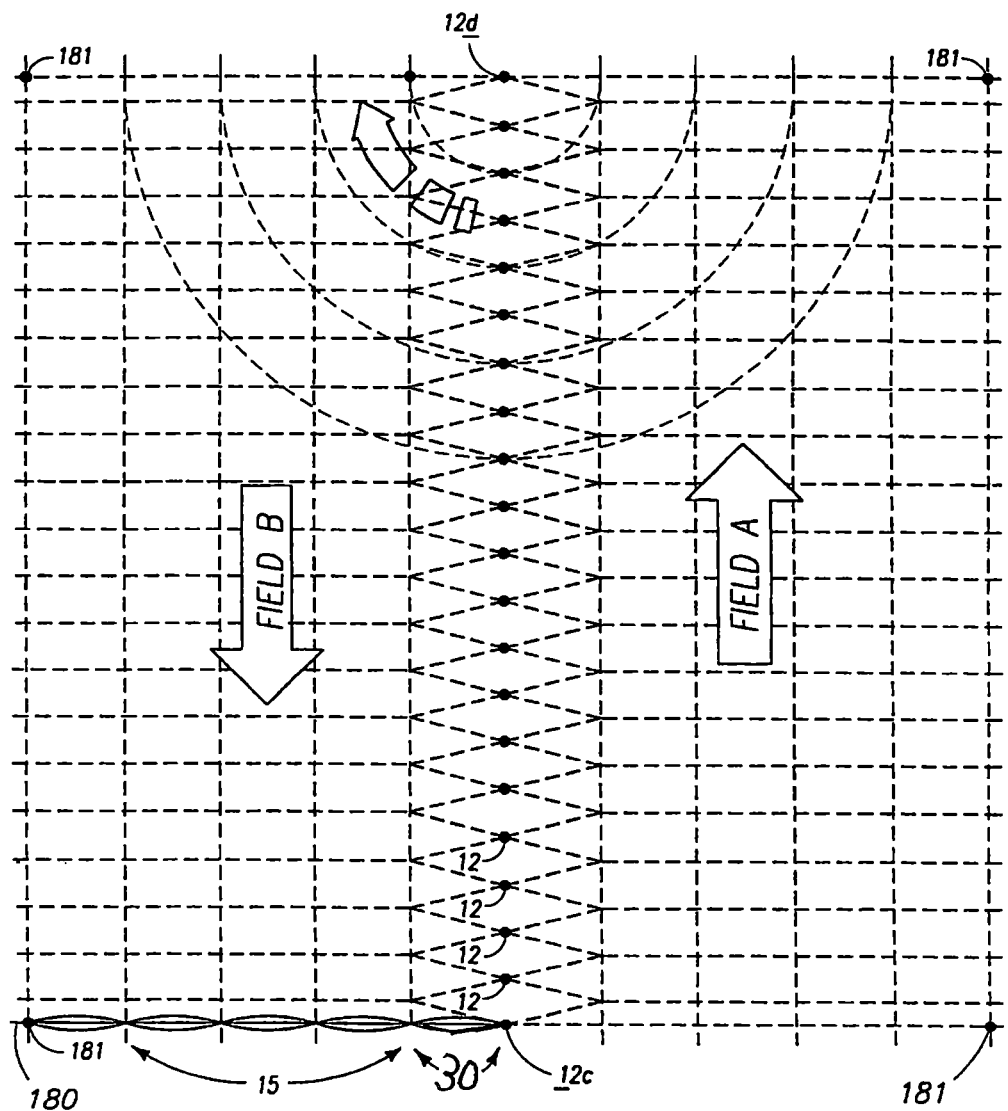
FIG. 3b is a diagrammatic plan view depicting linear-move travel of the water delivery pipe assembly and associated connection forwarding along a series of water main access valves to irrigate a Field A, rotation of the delivery pipe assembly to a Field B and linear-move travel of the delivery pipe assembly and associated connection forwarding along the series of valves to irrigate the Field B.

The present invention is intended for use in conjunction with a water main 11. An example of a water main 11 is illustrated in FIGS. 2a, 2b, 2c, 2d, 3a and 3b. The exemplary water main 11 includes a length of pvc pipe and a plurality of a water main access valve 12 with each access valve 12 bolted atop a corresponding riser 23. Each riser 23 is coupled to and positioned spaced along the pvc pipe. For this example, linear-move water delivery pipe assembly 15 is positioned perpendicular to the length of the pvc pipe of main 11 and the linear travel of assembly 15 is parallel to that length. (In other words, for this example, water delivery pipe assembly 15 is positioned perpendicular to an imaginary line running through the center of the succession of access valves 12 and the travel direction of assembly 15 is parallel to that line.) In this example, the access valves 12 are spaced equidistant along water main 11. As one example, a half-section of land is being irrigated. The half section measures 2640 feet by 5280 feet. Water main 11 has been installed down the center of the width (as shown in FIG. 3b). Accordingly, water main 11 extends the 5280 feet. Access valves 12 have been installed every 82.5 feet. Therefore, the number of access valves 12 along this example of main 11 is 64 (5280/82.5) plus one more access valve 12 for the uncounted end. In other words, the total number of access valves 12 is 65.

Figure 16:
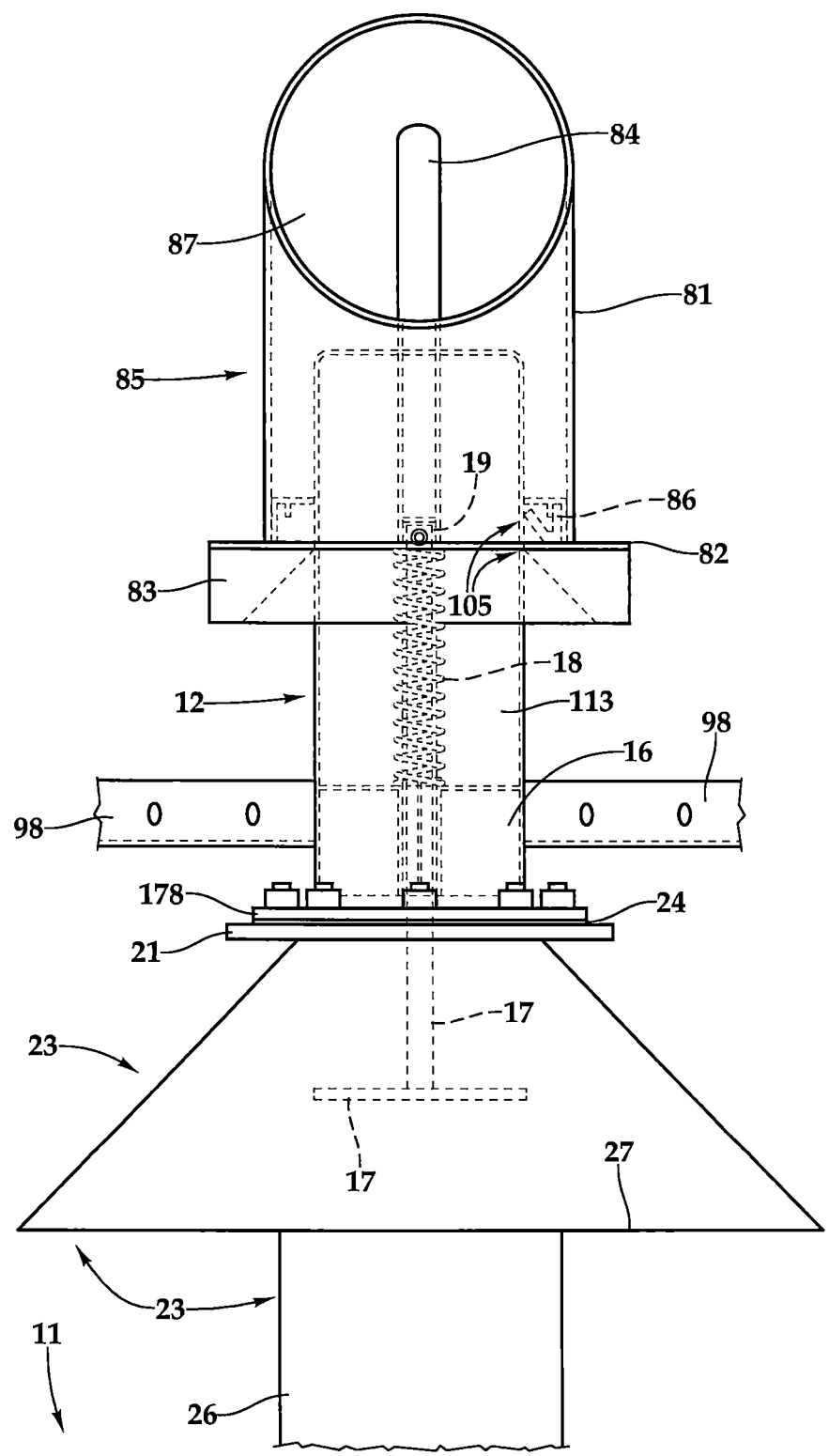
FIG. 16 is an enlarged sectional fragmentary end view taken on line 16-16 of FIG. 5 showing the coupler body engaged to an access valve.

An example of an access valve 12 is illustrated in FIG. 16. The exemplary access valve 12 provides access to water main 11. When a coupler body 85 is coupled to one of the access valves 12 (body 85 described in greater detail later on), water flows from water main 11 through the access valve 12, through coupler body 85, through connector 25 to delivery pipe assembly 15 and ultimately through water applicators (mounted to assembly 15) and onto the field surface. The exemplary access valve 12 includes a valve body 113, a bolt flange 178, a three-tab stem mount 16, a poppet valve 17, a spring 18 and a keeper 19.

Body 113 is an 8 inch OD, 14 gauge steel pipe, 18 inches long, the length positioned to extend substantially vertically.

Bolt flange 178 is one-half inch thick, has a six inch ID, a 12 inch OD and has bolt holes spaced equidistant near its perimeter. Flange 178 is welded to the bottom of body 113.

Stem mount 16 includes a length of pipe. The pipe is five inches long and has a one and one-eighth inch ID. Mount 16 also includes three tabs, each three-sixteenths inch thick, four inches high and about three and three-eighths inches long. The tabs are welded, spaced 120 degrees apart, to the OD of the length of the pipe. Each tab's length extends outward from the pipe and is welded to the ID surface of body 113 at the bottom end just above flange 178.

Poppet valve 17 has a stem and a face plate. The stem is one-inch OD round steel 17 inches in length. The face plate is one-half inch thick and has a seven inch OD. The stem is welded at one end (the lower end) to the face plate, the stem positioned at the center of the face plate. The opposite end of the stem of valve 17 is slid upward inside stem mount 16.

Spring 18 has a one and one-eighth inch ID and is 12 inches long. Spring 18 is mounted over the stem of valve 17, above mount 16 and is held in place by a keeper 19.

Rubber gasket 24 is one-quarter inch thick, has a six inch ID, a 12 inch OD and shares the same bolt hole pattern as flange 178.

Flange 178 is bolted atop a riser flange 21 of a riser 23. (Riser 23 described below.) (In other words, access valve 12 resides atop the riser 23.) Rubber gasket 24 resides in between flange 178 and a flange 21 of riser 23. The area of gasket 24 immediately outside its ID is sandwiched between flange 178 and the face plate end of poppet valve 17 to prevent water from escaping past poppet valve 17.

An example of a riser 23 is also illustrated in FIG. 16. The exemplary riser 23 includes riser bolt flange 21, a reducer cone 22, a flange 27 and a length of pipe 26.

Bolt flange 21 is one-half inch thick, has an eight inch ID, a 12 inch OD and shares the bolt hole pattern of flange 178. Flange 21 is bolted to flange 178 with gasket 24 residing there-between.

Reducer cone 22 is 12 gauge steel, has a eight inch ID smaller end, a 18 inch OD larger end and is 12 inches high. Bolt flange 21 is welded to the top/smaller end of reducer cone 22.

Flange 27 is three-eighths inch thick, has a 12 inch ID and an 18 inch OD. The OD of flange 27 is welded to the bottom/larger end of cone 22.

Length of pipe 26 is 14 gauge steel, has a 10 and ¾ inch OD and is nine feet long, the length positioned to extend essentially vertically. The top end of pipe 26 is welded to the ID of flange 27. The bottom three feet of pipe 26 is buried in the ground (not shown). The bottom end of pipe 26 is welded to a t-coupler. Each of the two ends of the t-coupler extend substantially vertically (in opposite directions) with each mated to a separate length of pvc pipe (the exception is the first and last risers 23 each have their outermost end plugged). (The bottom end of pipe 26, the there-attached t-coupler and the pvc are all buried underneath the surface of the ground as is and has been a common practice in the industry.) Linear-move delivery pipe assembly 15 functions to deliver irrigation water to cropland.

An exemplary pipe assembly 15 is illustrated in FIG. 1. Exemplary pipe assembly 15 has an inlet end 20 and a far end 21. Inlet end 20 is the end of assembly 15 closest to water main 11. Far end 21 is the end of assembly 15 remote from water main 11.

The exemplary pipe assembly 15 illustrated in FIG. 1 includes five lengths of trussed delivery pipe 13, each trussed delivery pipe 13 mounted atop a movable cart 14 forming a linear series of trussed water delivery pipes as illustrated. The trussed delivery pipe 13 residing at inlet end 20 of pipe assembly 15 is shown as trussed delivery pipe 13*a*. (Exemplary assembly 15 can employ any number of trussed delivery pipes 13, for example can employ one pipe 13 or can employ 20 pipes 13. The length of trussed delivery pipe 13 can be for example 100 feet long, can be for example 200 feet long or can be other.)

Each trussed delivery pipe 13 has one of a cart 14 attached at one end. The other end of the delivery pipe 13 is pivotably attached to the adjacent pipe 13 with one exception. The middle trussed delivery pipe 13 of the assembly 15 has two of the carts 14, one attached at each end. This double-cart trussed delivery pipe 13 is known in the industry as the "free-standing-span" (free-standing-span 28 shown in FIG. 1. Trussed delivery pipe 13 is common in the industry.)

Each cart 14 includes a base-beam 29, four of a tower leg 162 and a knee brace 179. The cart 14 located at inlet end 20 of assembly 15 is shown in FIG. 1 as cart 14*a*. (Trussed delivery pipe 13*a* is mounted atop cart 14*a*.) The cart 14 located at far end 21 of assembly 15 is shown in FIG. 1 as cart 14*b*. Cart 14*a* (inlet end 20 of assembly 15) in FIG. 1 shows base-beam 29 (also shown in FIGS. 8*a*, 8*b* and 19). Base-beam 29 is a 12 foot long steel pipe having an eight inch OD. (A wheel-mount gearbox is mounted near each end of the length of beam 29 with the wheel holding a traction tire, the wheel bolted to the output hub of the gearbox.) Cart 14*a* in FIG. 1 shows two of tower legs 162, the left-hand leg identified by number 162. Each tower leg 162 resides between the base-beam 29 and a top pipe of the associated delivery pipe 13. (Tower leg 162 of cart 14*a* resides between base-beam 29 and the top pipe of delivery pipe 13*a*.) Each cart 14 includes a knee brace 179, one side of which shows in the elevation view of FIG. 1. For each cart 14, each knee brace 179 resides between two of each set of four of tower leg 162 and a truss support of delivery pipe 13. (The truss support is connected to and supports the span of top pipe of delivery pipe 13. Cart 14 is common in the industry.) A drive 18 is mounted on each cart 14 and each drive 18 propels the respective cart 14.

Each drive 18 includes a drive motor bolted to a gear reducer. The gear reducer is mounted to the base-beam 29 of the associated cart 14, typically mounted near the center of the length of the base-beam 29. Each drive 18 further includes two drivelines. Each driveline extends between a respective one of two output shafts of the gear reducer and a respective one of the two fore-mentioned wheel-mount gearboxes. When propelled by drive 18, the associated cart 14 travels in a direction perpendicular to the length of the above there-mounted delivery pipe 13.

Each drive 18 is controlled to maintain linear alignment along the succession of trussed delivery pipes 13. The drive 18 that propels the prior-described cart 14*a* is illustrated in FIG. 1 as drive 18*a* (shown as INLET DRIVE 18*a* in FIG. 18). The drive 18 that propels the prior-described cart 14*b* is illustrated in FIG. 1 as drive 18*b* (shown as FAR DRIVE 18*b* in FIG. 18). To accomplish the linear travel of assembly 15, drive 18*a* (at cart 14*a*) and drive 18*b* (at cart 14*b*) are simultaneously operated a percentage of the time. (The percent of time depends upon how much water the farmer cares to apply as dictated by a percentage timer 145, timer 145 described later.) (Drives 18 of the remaining carts 14 operate responsive to the travel at carts 14*a* and 14*b* via alignment switches that detect misalignment between the delivery pipes 13. Drive 18 is common in the industry.)

The above example of linear-move delivery pipe assembly 15 is representative of conventional presently-commercially-available equipment. Assembly 15 can be other than conventional equipment. (Assembly 15 can utilize conventional water applicators such as rotator sprinklers or spray nozzles or any other applicator type. The water applicators are employed to apply water carried by pipe assembly 15 onto the field surface. A series of the chosen applicators, for example 20, are spaced along and plumbed to each length of water delivery pipe 13. Each applicator applies water supplied by the respective delivery pipe 13 onto the field surface.)

Figure 4:
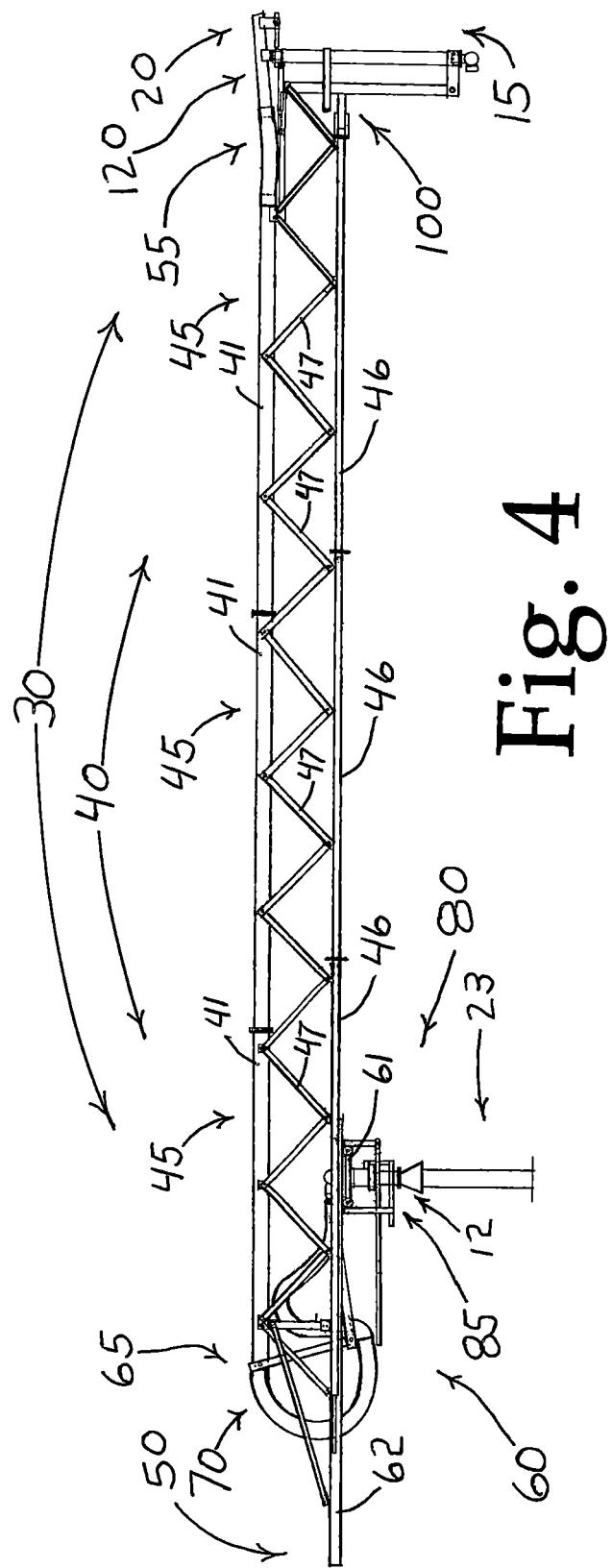
FIG. 4 is a side elevation view of a first embodiment of an automated connector of the present invention, the connector illustrated positioned relative to the delivery pipe assembly as diagrammed in FIG. 2b.
Figure 5:
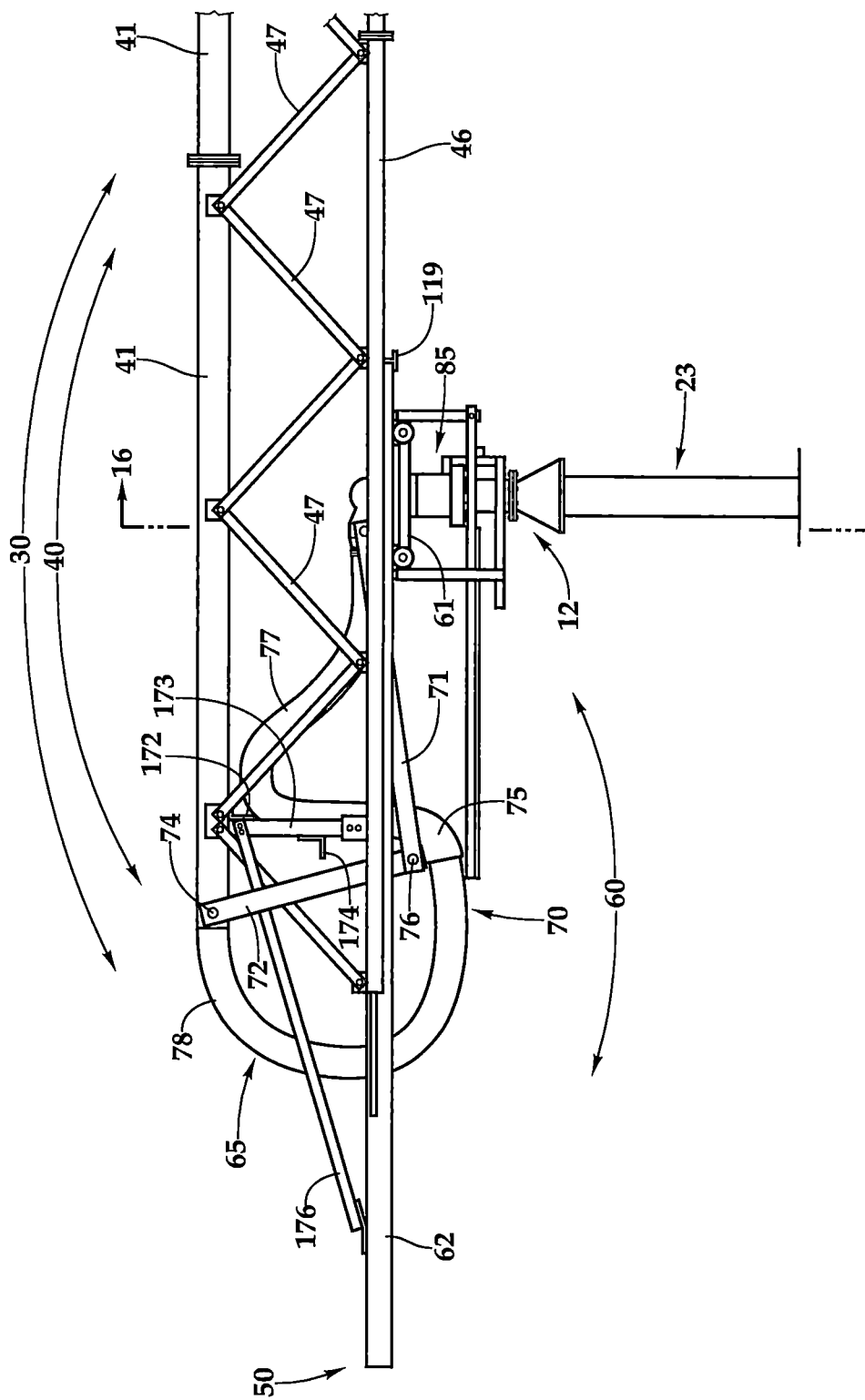
FIG. 5 is an enlarged view from FIG. 4 showing an outer end of a swing arm there-sporting a coupler body, a compensator and a free-rotating-elbow transfer.

Connector 25 (FIG. 1) functions to connect a linear-move irrigator to a water supply. Connector 25 can comprise an automated connector 30. (Connector 25 can be a manual connector. As one example, connector 25 can comprise essentially identical hardware to automated connector 30 but can be manually operated. Such might be preferable in special circumstances so that an attendant can monitor and/or control connection forwarding, e.g. on hilly terrain and/or tall crop.) Automated connector 30 functions to automatically connect a linear-move irrigator to a water supply. An example of automated connector 30 is illustrated in FIGS. 1 and 4. Examples of components of connector 30 are illustrated in FIGS. 5 through 17. The exemplary connector 30 includes a swing arm 40, a compensator 60, a valve coupler 80, a lift 100, a swinger 120, a guidance 130 and a control 140.

Swing arm 40 functions to position. An example of swing arm 40 is illustrated in FIGS. 1 and 4. The exemplary swing arm 40 has an outer end 50 and a delivery-pipe-end 55. Outer end 50 resides remote from inlet end 20 of pipe assembly 15. Delivery-pipe-end 55 resides proximate to inlet end 20 of pipe assembly 15. Exemplary swing arm 40 includes a length 45 between end 50 and end 55. Exemplary arm 40, with the fore-mentioned coupler body 85 residing proximate to outer end 50, is swung from one access valve 12 to a next-up access valve 12. Length 45 (shown in FIG. 4) is a fixed and known length. (As one example of length 45, length 45 can be 72 feet.) The fixed and known length 45 facilitates the positioning of the coupler body 85 to a known vicinity above the next-up access valve 12 for subsequent coupling of body 85 to that next-up access valve 12. (Described in detail later on in the description of swinger 120.)

The fixed and known length 45 of exemplary swing arm 40 also facilitates the positioning of delivery pipe assembly 15. (Described in detail later on in the description of guidance 130.) Additionally, the exemplary swing arm 40 (FIG. 4) carries water to the inlet end 20 of pipe assembly 15 via a supply pipe 41, the water received by coupler body 85 when body 85 is coupled to an access valve 12.

Exemplary swing arm 40 is configured to support the weight of length 45 when outer end 50 is ground-supported via coupler body 85 residing coupled to an access valve 12 and delivery-pipe end 55 is ground-supported via its attachment to inlet end 20 of assembly 15. Exemplary swing arm 40 also supports length 45 when swing arm out end 50, with coupler body 85, resides held off the ground by a lift 100 (lift 100 described later on). Exemplary swing arm 40 also is configured to provide the support required to counter the force of wind gusts against length 45.

The exemplary arm 40 (FIG. 4) includes a supply pipe 41, two of a bottom tube extension 46, 38 of a diagonal strut 47 and six of a bottom crosser 48.

Supply pipe 41 is an eight inch OD, 14 gauge, steel pipe sixty feet in length.

Each of the two of bottom tube extension 46 is a three and one-half inch by three and one-half inch 12 gauge steel square tube sixty-three feet in length. (Fabricated as three sections, two sections twenty feet in length and one section twenty-three feet in length, the three sections bolted together. Tubes 46 also shown in FIGS. 9 and 11.)

Figure 9:
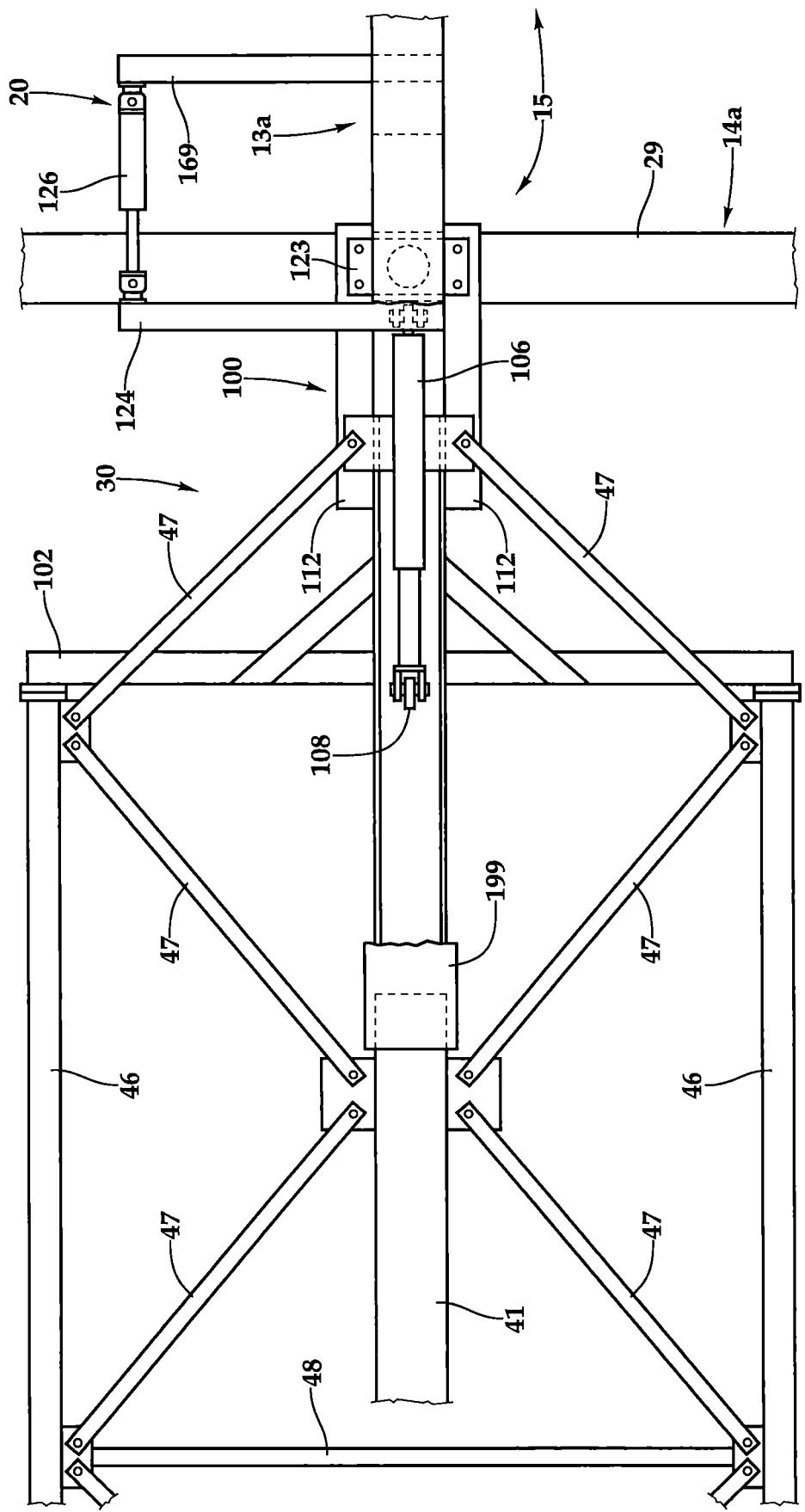
Figure 11:
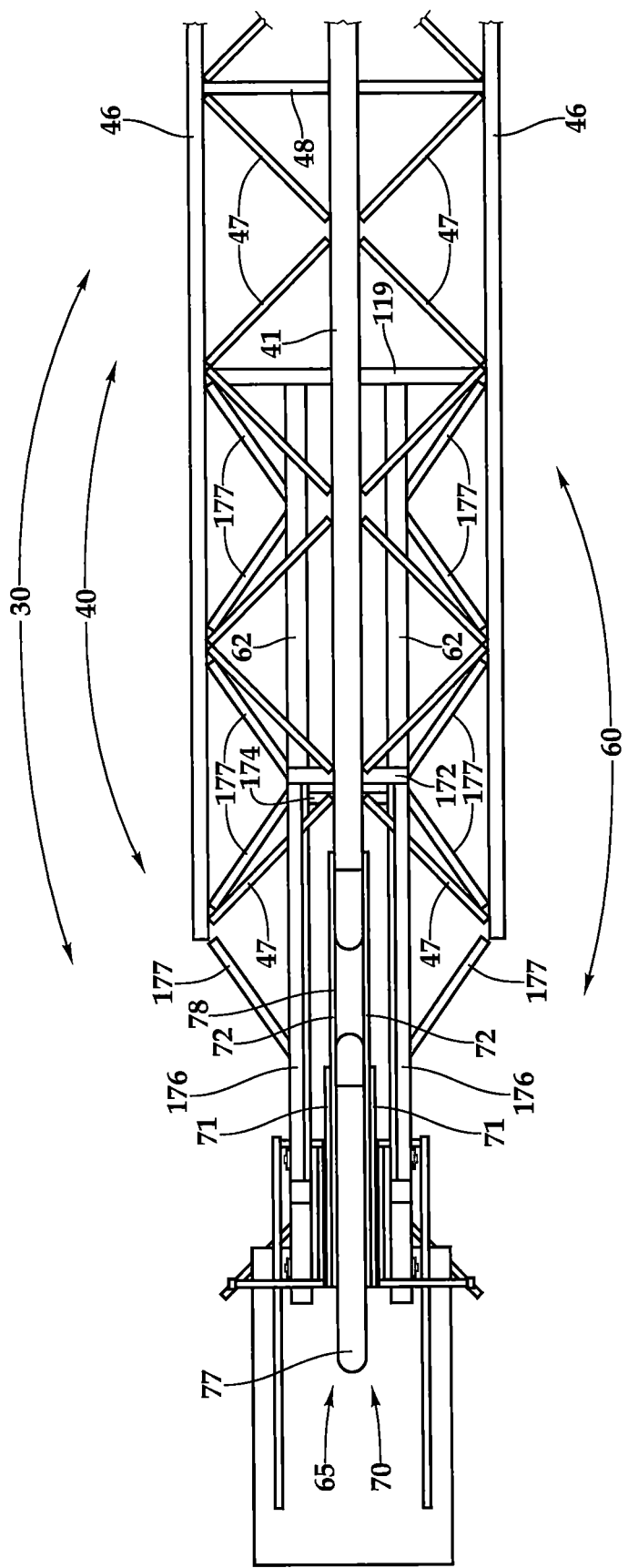
FIG. 11 is a top view of the outer end of FIG. 10.

Each of the 38 of diagonal strut 47 is a two inch by two inch by one-eighth inch thick steel angle iron 74 inches in length. (Struts 47 are displaced in pairs with one of each pair hidden in FIG. 4. Each of the last pair of struts 47, located at the delivery-pipe end 55 of swing arm 40, is about six inches shorter. Struts 47 are also shown in FIGS. 9 and 11.) One end of each strut 47 is bolted to a tab welded to supply pipe 41, extends there-from downward, outward and diagonally with its other end bolted to a tab welded to bottom tube 46.

Each of the six bottom crossers 48 is a two inch by two inch by one-eighth inch thick steel angle iron six feet eight inches in length (crossers 48 shown in FIGS. 9 and 11). Each crosser 48 is bolted at one end to a tab welded to one of the bottom tubes 46. Each crosser 48 extends there-from horizontally and perpendicular to the tubes 46 and is bolted at its other end to a tab welded to the other bottom tube 46.

Compensator 60 functions to distance compensate. An example of compensator 60 is illustrated in FIGS. 4, 5 and 10 through 15. The exemplary compensator 60 resides proximate to outer end 50 of swing arm 40 and compensates for distance change between access valve 12 and delivery pipe assembly 15 when coupler body 85 is coupled to an access valve 12 (shown in FIG. 16) and assembly 15 travels (linearly).

FIG. 2a illustrates the orientation between assembly 15 and automated connector 30 when coupler body 85 is initially coupled to the access valve 12a and assembly 15 begins linear travel. FIG. 2b illustrates the orientation subsequent to linear travel placing assembly 15 and connector 30 longitudinally aligned. In FIG. 2a, the distance between inlet end 20 of assembly 15 and the access valve 12a is essentially at its farthest (as is also true in FIG. 2c). In FIG. 2b, the distance between inlet end 20 of assembly 15 and the access valve 12a is essentially at its closest.

Here's one example of distance that needs to be compensated by compensator 60. For this example, the distance between valve 12a and inlet end 20 in FIG. 2b measures 50 feet and assembly 15 has traveled linearly 40 feet from its position in FIG. 2a. The distance between inlet end 20 and access valve 12a in FIG. 2a is the square root of [(50×50)+(40×40)]. In other words the distance is 64 feet. Therefore, for this example, the distance that need be compensated between inlet end 20 and the coupled-to access valve 12a when assembly 15 travels from the location shown in FIG. 2a to the location shown in FIG. 2b is 14 feet (64 feet minus 50 feet).

Exemplary compensator 60 provides to accommodate distance change such as the 14 feet of the above example. The exemplary compensator 60 accommodates distance change between a coupled-to access valve 12 and delivery pipe assembly 15 when assembly 15 travels linearly by translating two of a rail 62 across four of a roller 63 of a carriage 61. Each rail 62 is fixed mounted to swing arm 40 and the length of each rail 62 is parallel to (longitudinally aligned with) the length of swing arm 40. Accordingly, when translating across rollers 63, rails 62 and the length of swing arm 40 will all be moving in the same direction.)

Exemplary compensator 60 (FIGS. 4, 5 and 10 through 15) includes the two of rail 62 and the carriage 61. (FIG. 11 shows both of rails 62.) Each rail 62 is a 21 foot long aluminum I-beam having four inch wide flanges and a six inch tall web. (The flanges are oriented to extend horizontally, thus the web extends vertically.) The two rails 62 reside in the same horizontal plane positioned lengthwise parallel to each other with 24 inches between them. Each rail 62 resides below and is attached to swing arm supply pipe 41. The parallel set of rails 62 resides in between the two prior-described bottom tubes 46.

Carriage 61 (FIGS. 6 and 7) includes two of a plate 66, two of an axle 49, four of a roller 63, two of a mount tube 67, four of an end tube 68 and four of a follower 69.

Each of the two of plate 66 is an aluminum plate one-quarter inch thick, 10 inches wide and 36 inches in length. Each plate 66 is welded to a respective side of a 90-degree elbow 87, centered length wise with respect to elbow 87 (centered best shown in FIG. 7, elbow 87 part of coupler body 85 described below). Each plate 66 has a one and one-half inch diameter hole drilled at each lower outside end (i.e. two holes).

Each of the two of axle 49 is an aluminum rod one and one-half inch thick and 32 inches in length. One axle 49 is positioned near the front end of carriage 61, extends perpendicular to the length of rails 62, and has been slide inside the front lower outside end hole on each plate 66 and there-welded (the front end of carriage 61 being the end that faces outer end 50). The other axle 49 is positioned near the back end of carriage 61, extends perpendicular to the length of rails 62, and has been slide inside the back lower outside end hole on each plate 66 and there-welded (the back end being the end of carriage 61 that faces delivery-pipe end 55).

Each of the four of roller 63 is a four inch long uhmw plastic rod having a four inch OD and a one and nine-sixteenths inch hole drilled through its center. Each roller 63 is mounted to a respective one of the ends of the two axles 49. Each roller 63 spins about the stationary axle 49.

Each of the two of mount tube 67 is two inches wide, eight inches deep, 40 inches in length and has a one and one-half inch hole drilled proximate to the bottom of each outside end (i.e. two holes). Each tube 67 resides between a respective one of the two plates 66 and a respective set of two of the rollers 63. Each tube 67 mounts the two axles 49. One axle 49 slid and welded inside the front lower outside end hole. The other axle 49 slid and welded inside the back lower outside end hole.

Each of the four of end tube 68 (FIG. 7) is two inches wide and three inches deep. Two of tubes 68 are 20 inches long and each one of the two has been welded to the outer end 50 facing end of a respective tube 67, the bottom of the tube 68 flush with the bottom side of the tube 67. Two of tubes 68 are 11 inches long and each one of the two has been welded to the delivery-pipe end 55 facing end of a respective tube 67, the bottom of the tube 68 flush with the bottom side the tube 67.

Each of the four of followers 69 is a two inch long stainless steel rod having a one and one-half inch OD and an eleven-sixteenth inch hole drilled through its diameter. A five-eighths inch stainless steel bolt extends through the hole of each follower 69 for bolting to a respective tube 68 (bolted un-cinched i.e. with space remaining to allow the follower to spin). The four followers 69 are mounted on one side of carriage 61. Two of follower 69 are bolted atop the end tube 68 on that side of carriage 61 that resides closest to outer end 50 with a four and one-eighth inch space between the ODs of the two followers 69. Two of follower 69 are bolted atop the end tube 68 on that side of carriage 61 that resides farthest from outer end 50 with a four and one-eighth inch space between the ODs of the two followers 69. The one of the two rails 62 located on that one side of carriage 61 resides inside the four and one-eighth inch space between each set of two of the follower 69. Thus the set of four followers 69 serve to guide carriage 61, i.e. maintain the carriage 61 positioned, along the rail 62 that resides inside the four and one-eighth inch space.

Again, exemplary compensator 60 accommodates, for example the above example 14 foot distance change between inlet end 20 and the coupled-to access valve 12*a* when assembly 15 travels by translating rails 62 across, i.e. over the top of, rollers 63 of carriage 61. In other words, exemplary compensator 60 allows rails 62 to freely translate relative to carriage 61 via the set of rollers 63 and as guided by the set of four of followers 69. With the length of rails 62 parallel to swing arm 40 and with rails 62 fixed to swing arm 40, the translation direction of rails 62 remains aligned with the length axis of arm 40

Exemplary compensator 60 (FIGS. 5 and 10 through 15), in addition to the above-described rails 62 and carriage 61, also includes a rail crossbeam 119, a top pipe tie-in 172, two of a vertical strut 173, two of an end strut 176, a strut tie 174, and ten of a stiffener 177 (stiffener 177 shown in FIG. 11).

As described above, the lengths of the two rails 62 reside in the same horizontal plane oriented parallel to each other and reside below, and are attached to, swing arm supply pipe 41. The parallel set of rails 62 resides in essentially the same horizontal plane as bottom tubes 46 with the set of rails 62 positioned in between the tubes 46.

Rail crossbeam 119 is a six foot eight inch long aluminum I-beam having a seven inch long web and two four and one-half inch wide flanges. Crossbeam 119 resides at the inward end rails 62 (inward being the end closest to delivery-pipe end 55 of arm 40) and extends perpendicular to the length of rails 62. One end of crossbeam 119 is bolted to one of bottom tubes-46 and the other end is bolt to the other bottom tube 46. The width of the flanges of crossbeam 119 are horizontally disposed with the outward facing top flange of beam 119 slid over the top of the top flange of both rails 62 and the outward facing bottom flange of crossbeam 119 slid over the bottom of the bottom flange of both rails 62 (with a one-half inch thick spacer in between). Both top and bottom flanges of crossbeam 119 are bolted to the overlapped inward end flanges of each respective rail 62.

Top pipe tie-in 172 is four tab mounts with each tab having two holes. Tie-in 172 resides proximate to the outer end 50 end of supply pipe 41 and is there-welded to the bottom of the pipe 41. Two of the four tabs extend mostly vertically, each mounted by and bolted to a respective one of the two vertical struts 173 (struts 173 described below). The other two of the four tabs extend outward and downward, each mounted by and bolted to a respective one of the two end struts 176 (struts 176 described below).

Each of the two of vertical strut 173 is a three inch by three inch by one-quarter inch thick aluminum angle 36 inches in length. The end of each strut 173 opposite to the end bolted to tie-in 172 is bolted to a tab residing near the center of the length of a respective one of the rails 62, the tab bolted to the top flange of the rail 62. (FIGS. 10 and 12 through 15 show strut 173 but only one of the two because the second strut 173 resides behind the one shown.)

Each of the two of end strut 176 is a three inch by three inch by one-quarter inch thick aluminum angle 90 inches in length. The end of each strut 176 opposite to the end bolted to tie-in 172 is bolted to a respective tab residing very near the outer end 50 end of the length of a respective one of the rails 62, the tab bolted to the top flange of the rail 62.

Strut tie 174 is a three inch by three inch by one-quarter inch thick aluminum angle 30 inches in length. One end of strut tie 174 is bolted to one of the two of vertical strut 173. The other end of tie-in 174 is bolted to the other of the two of strut 173. The length of strut tie-in 174 extends horizontally and the bottom of tie 174 resides about ten inches above the top of the rails 62.

Each of the ten of stiffener 177 (FIG. 11) is a two inch by two inch by one-eighth inch thick steel angle iron 46 inches in length. Each of five of stiffener 177 are bolted at one end to a respective tab welded to one of the two bottom tubes 46 with the other end bolted to the top flange of one of the respective two of rails 62. Each of the remaining five of stiffener 177 are bolted at one end to a respective tab welded to the other bottom tube 46 with the other end bolted to the top flange of the other of the two of rails 62. Each stiffener 177 extends horizontally and diagonally between the respective tube 46 and the respective rail 62.

Exemplary compensator 60 includes a transfer 65. Transfer 65 functions to transfer water. An example of transfer 65 is illustrated in FIGS. 4, 5 and 10 through 15. The exemplary transfer 65 transfers water from coupler body 85 to swing arm supply pipe 41. Exemplary transfer 65 includes a free-rotating-elbow transfer 70.

An example of free-rotating-elbow transfer 70 is illustrated in FIGS. 4, 5 and 10 through 15. The exemplary free-rotating-elbow transfer 70 flows water between coupler body 85 and swing arm supply pipe 41 and does so within a minimized footprint meaning minimized weight and minimized pressure loss. Exemplary transfer 70 includes an elbow 75, two of a lower bearing 73, two of an upper bearing 74, an elbow bearing 76, two of a lower positioning strut 71, two of an upper positioning strut 72, a lower flexible hose 77 and an upper flexible hose 78.

Elbow 75 is an eight inch schedule 10 stainless steel 90-degree elbow having an eight inch OD. Elbow 75 includes an eight inch OD 10 gauge stainless steel round tube four inches long welded to one end of the 90-degree elbow and an eight inch OD 10 gauge stainless steel round tube four inches long welded to the other end of the 90-degree elbow. Elbow 75 includes a stainless steel one-quarter inch thick plate cut to fit the inner radius of the 90-degree elbow and is welded to that inner radius of the elbow (the plate is hidden behind struts 71 and 72 in the views). The plate extends far enough beyond the center of the radius for a one and one-half inch diameter hole to be drilled at the center point of that radius.

Each of the two of lower bearing 73 (bearing 76 shown in FIG. 6 only) is a one and seven-sixteenths inch diameter aluminum round rod one and one-half inches long. Each bearings 73 is welded to the rail 62 side of a respective one of the two plates 66 of carriage 61, each bearing 73 welded near the top and near the outer end 50 end of the respective plate 66.

Each of upper bearings 74 is a one and seven-sixteenths inch diameter stainless steel round rod one and one-half inches long. The two bearings 74 are welded 180 degrees apart, thus on opposite sides, four inches from the outer end 50 end of supply pipe 41.

Elbow bearings 76 is a one and seven-sixteenths inch diameter stainless steel round rod 15 inches long. Bearing 76 is positioned with its length centered inside the above-mentioned one and one-half inch hole in the plate of elbow 75 and there-welded.

Each lower positioning strut 71 is a one inch thick by three inch wide, one-quarter inch wall, aluminum rectangular tube 88 inches long and has a one and one-half inch diameter hole drilled through its thickness near each end. Each strut 71 is positioned on one of the two respective opposite sides of elbow 75 with each strut 71 end hole mounted to one or the other of bearing 73 and bearing 76 and thus extending there-between.

Each upper positioning strut 72 is a one inch thick by three inch wide, one-quarter inch wall, aluminum rectangular tube about 60 inches long and has a one and one-half inch diameter hole drilled through its thickness near each end. Each strut 72 is positioned on one of the two respective opposite sides of elbow 75 with each strut end hole mounted to one or the other of bearing 74 and bearing 76 and thus extending there-between. (On each respective side, upper strut 72 mounts inside of lower strut 71 to the elbow bearing 76.)

Figure 6:
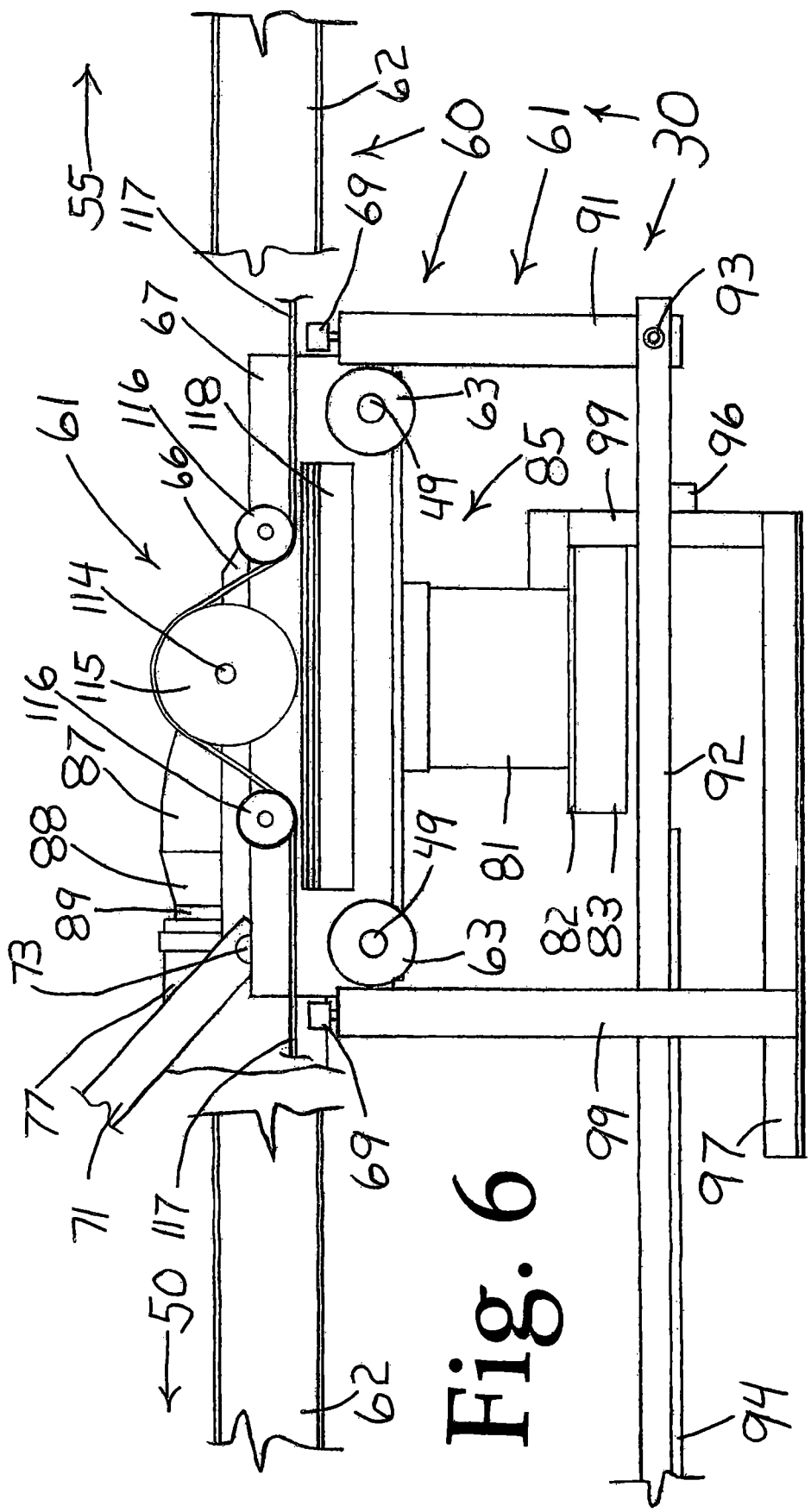
FIG. 6 is an enlarged view from FIG. 5 of a carriage of the compensator.
Figure 7:
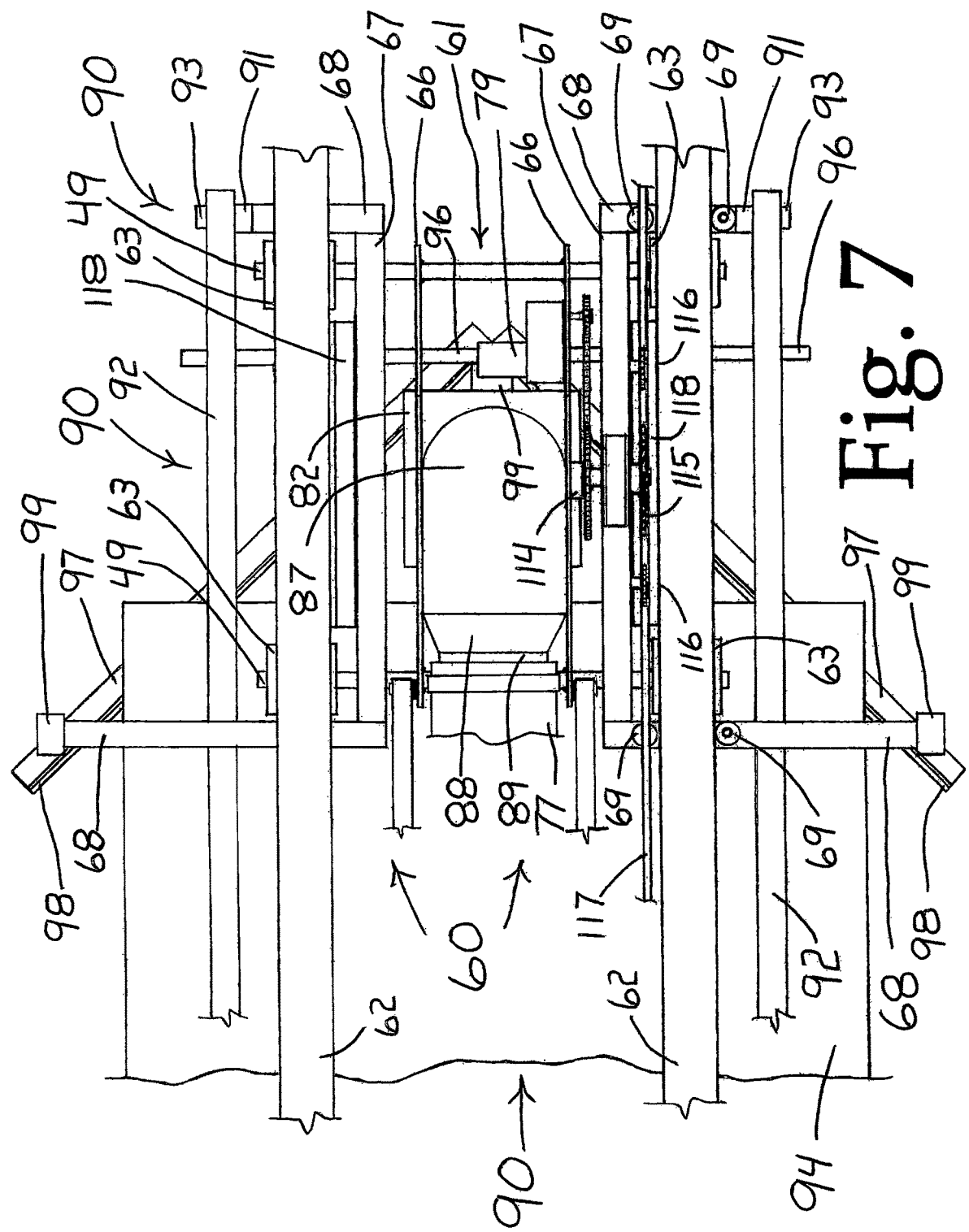
FIG. 7 is a top view of the carriage of FIG. 6.

Lower flexible hose 77 is an eight inch ID 10 foot long pressure-bearing flexible hose. One end of hose 77 is slid over and clamped to pipe 89 of body 85 (FIG. 6). The other end of hose 77 is slid over and clamped to a respective one end of elbow 75.

Upper flexible hose 78 is an eight inch ID seven foot long pressure-bearing flexible hose. One end of hose 78 is slid over and clamped to the other respective end of elbow 75. The other end of hose 78 is slid over and clamped to the outer end 50 end of supply pipe 41.

As can be seen from the orientations shown in FIGS. 5 and 10 through 15, translating rails 62 across rollers 63 of carriage 61 causes free-rotating-elbow transfer 70 to reposition. The repositioning of lower positioning struts 71 and upper positioning struts 72 causes elbow 75 to rotate via elbow bearing 76 to equalize hose bending stress between lower flexible hose 77 and upper flexible hose 78. (The repositioning of lower positioning struts 71 and upper positioning struts 72, i.e. the swinging of struts 71 and 72, is in a substantially vertical plane. The rotation of exemplary elbow 75 is in a substantially vertical plane as well.)

Compensator 60 can be located elsewhere than at outer end 50 of swing arm 40. As one example, compensator 60 is located at delivery-pipe-end 55 instead of outer end 50. For this example, coupler body 85 is fixed to the outer end 50 end of arm 40. A roller carriage is mounted atop cart 14*a* (at inlet end 20 of pipe assembly 15). A set of rails is mounted/fixed to delivery-pipe-end 55 of swing arm 40. The rails translate along rollers mounted to the carriage. The mount between carriage and pipe assembly 15 is a universal joint. The joint allows the carriage to pivot up and down and also right and left. With the length of rails 62 parallel to swing arm 40 and with rails 62 fixed to swing arm 40, the translation direction of rails 62 remains aligned with the length axis of arm 40. (A transfer transfers water from swing arm supply pipe 41 to pipe assembly 15.)

As a second example, compensator 60 is located at delivery-pipe-end 50 instead of outer end 50. Coupler body 85 is fixed to the outer end 50 end of arm 40. A roller carriage is mounted/fixed at the delivery-pipe end 55 of arm 40. A set or rails is mounted atop the cart 14*a*. The mount between rails and pipe assembly 15 is a universal joint. The joint allows the rails to pivot up and down and also right and left. The roller carriage translates along the rails. With the roller carriage fixed to swing arm 40, the translation direction of the roller carriage remains aligned with the length axis of arm 40. (A transfer transfers water from supply pipe 41 to pipe assembly 15.)

The above-given exemplary compensator 60, the above "first example" and the above "second example" all employ a translation direction aligned with the length axis of arm 40. Utilizing a translation direction aligned with the length axis of arm 40 provides that the linear travel of pipe assembly 15 is naturally compensated by compensator 60. In other words, the travel of pipe assembly 15 by itself causes arm 40 to move and that movement causes compensator 60 to translate, the translation compensating the distance change between access valve 12 and delivery pipe assembly 15 (the "distance change" caused by the travel of assembly 15). No motors or gear ratios or calibrations or other are needed. (Exemplary compensator 60 located at outer end 50 has advantage for re-locating carriage 61 along rails 62 as employed by a horizontal positioner 90 and a vertical positioner 95, both positioners described below. With the above first and second examples, the entire weight of the swing arm need be relocated instead of just the weight of carriage 61 plus the weight carried by carriage 61.)

Valve coupler 80 functions to couple to a water main. Components of an example of coupler 80 are illustrated in FIGS. 6 through 9 and 16. The exemplary coupler 80 provides to couple and uncouple along the succession of access valves 12 of water main 11. The exemplary coupler 80 includes a coupler body 85 and utilizes carriage 61 of compensator 60. Exemplary coupler 80 also includes a horizontal positioner 90, a vertical positioner 95 and a rotator 105.

An example of coupler body 85 is best illustrated in FIG. 16. Exemplary coupler body 85 includes a main body 81, a bolt flange 82, a pre-couple alignment cone 83, a water seal 86, an elbow 87, a reducer cone 88 (FIG. 7), an outlet pipe 89 (FIG. 7) and a valve plunger 84.

Main body 81 is a 10 inch OD one-quarter inch wall aluminum round tube nine inches in length. The length of body 81 is oriented vertically.

Bolt flange 82 has a round eight and three-eighths inch ID, a square perimeter, is welded to the bottom edge of main body 81 and has bolt holes spaced equidistant near its square perimeter.

Pre-couple alignment cone 83 is a 14 inch square three-inch thick block of uhmw plastic having an 8 & ¼ inch hole machined out of its center. One-half inch down from the top of the hole, cone 83 is further machined with a 45 degree cone shape bevel machined out of the hole, the bevel expanding toward the bottom of the block to a 13 inch diameter. Cone 83 shares the bolt pattern of flange 82 and is bolted to the bottom of flange 82. The top one-half inch of the hole in cone 83 acts as a bearing surface against the outside surface of body 113 of access valve 12. Travel of assembly 15 causes outer end 50 of swing arm 40, and thus coupler body 85, to rotate (in a substantially horizontal plane). Body 85 rotates about the coupled-to access valve 12 meaning cone 83 acts against the outside surface of body 113.

Water seal 86 is a round rubber seal having an eight and one-quarter inch diameter. Seal 86 is fitted inside body 81 above and butting down against the top edge of flange 82, body 81 fitted with a retainer ring that butts against the top edge of seal 86.

Elbow 87 is a 10-inch OD 90-degree short radius aluminum elbow. One end of elbow 87 faces downward and the other end faces toward outer end 50. The bottom end of elbow 87 is welded to the top edge of body 81.

Reducer cone 88 is one-quarter inch thick aluminum cone, has a 10-inch large end diameter, an eight-inch small end diameter and is four inches long. The large end of cone 88 is welded to the outward facing end of elbow 87.

Outlet pipe 89 is an eight inch OD one-quarter inch wall aluminum round tube having a length of five inches. One end of outlet pipe 89 is welded to the smaller diameter end of cone 88. The other end faces toward outer end 50. Lower flexible hose 77 (detailed above) is slid over pipe 89 and clamped there-to.

Valve plunger 84 is a two inch diameter aluminum rod 13 inches in length. The length of plunger 84 is oriented vertically. The top end of plunger 84 is fitted inside a hole drilled through elbow 87 and there-welded such that plunger 84 extends downward from the hole and is centered inside body 81. The bottom end of plunger 84 has a one and one-half inch diameter by one half inch deep cup machined out of it. The cup is for encompassing the stem of poppet valve 17 of access valve 12 (FIG. 16). Plunger 84 mates to the stem of valve 17 for opening access valve 12.

Valve coupler 80 accomplishes the lowering of coupler body 85 by pivoting swing arm 40 downward which lowers swing arm outer end 50. (Coupler body 85 resides proximate to outer end 50.) To lower outer end 50, coupler 80 (via a controller 150, controller 150 described later on) utilizes a lift 100 (lift 100 described below, FIGS. 8a. 8b and 9). Extending a cylinder 106 of lift 100 affects to lower outer end 50 and thus to lower coupler body 85. To extend cylinder 106, controller 150 opens a swing arm "down" solenoid 104 (shown as SW. DOWN 104 in FIG. 18, described in detail later on). Opening solenoid 104 provides for hydraulic oil to be released from cylinder 106 allowing cylinder 106 to extend, pulled by the weight at outer end 50 of arm 40. Exemplary valve coupler 80 thus utilizes the weight at outer end 50 to open the valve 12. (Cylinder 106 is plumbed to retract and extend freely when body 85 resides coupled to an access valve 12. Retracting and extending freely provides to accommodate elevation changes at cart 14a and at the adjacent cart 14 when assembly 15 travels.)

(In an alternate configuration, solenoid 104 supplies pressurized hydraulic oil to cylinder 106 to extend cylinder 106 causing outer end 50 with coupler body 85 to lower. This pressurized approach provides added force which can be advantageous for opening access valve 12 when water main 11 is holding pressurized water. "Holding pressurized water" occurs when instead of turning off the water pump prior to the uncouple, swing and re-couple, the pump is left operating and thus water main 11 remains pressurized when body 85 is lowered onto valve 12.)

To open exemplary access valve 12 (FIG. 16), valve coupler 80 (via controller 150) lowers coupler body 85 onto the prior-described valve body 113 of access valve 12. The lowering initially engages alignment cone 83 with the top edge (rounded) of body 113. Further lowering presses cone 83 against the top edge of body 113 causing cone 83 and thus body 85 to align to body 113. Further lowering by coupler 80 causes flange 82 to slide over the perimeter of the top of body 113. Further lowering causes water seal 86 to slide over the perimeter of the top of body 113. Further lowering engages the cup machined into the bottom end of valve plunger 82 with the top of the stem of poppet valve 17. Further lowering subsequently pushing down valve 17 which opens access valve 12 thus enabling water flow from main 11 to coupler body 85 via valve 12. Further lowering pushes valve 17 further down until spring 18 is fully compressed, valve 17 then all the way down. Fully compressed spring 18 affects to transfer the weight at out end 50 to three-tab stem mount 16 and ultimately to riser 23. (The weight transfers from plunger 82 to valve 17 to spring 18 to mount 16 to body 113 and finally to riser 23 which is supported by ground burial.)

Exemplary coupler 80 utilizes the prior-described carriage 61 of compensator 60. For utilization by coupler 80, carriage 61 (FIGS. 6 and 7) further includes a carriage drive motor 79, a driveline 114, a drive sprocket 115, two of an idler sprocket 116 and a roller chain 117. (All of these components are located on the side of coupler body 85 where prior-described followers 69 reside.) Carriage 61 further includes two of a slider 118.

Carriage drive motor 79 is a one HP wash-down-rated electric motor. Motor 79 is bolted to and includes a 20 to 1 gear reducer and sprocket. The reducer has an output shaft with the stainless steel 14 tooth number 40 sprocket mounted there-to. The output shaft side of the reducer is bolted to the one of the prior-described plates 66 that resides on the side of carriage 61 where the four followers 69 reside (the reducer bolted to the coupler body 85 side of the plate 66).

Driveline 114 includes a three inch OD nylon bearing housed inside a short length of pipe welded to the respective side of prior-described plate 66. Driveline 114 includes a nylon bearing bolt-mounted atop, and centered along the length of, the follower-side mount tube 67 and an axle extending from inside the housed bearing through the bolt-mounted bearing to an outer end. Driveline 114 includes a 50 tooth number 40 sprocket residing between the two nylon bearings, the sprocket welded to the axle. Driveline 114 includes a length of roller chain looped around the gear reducer sprocket and the driveline sprocket. A powered motor 79 propels driveline 114 via reducer sprocket, chain and driveline sprocket.

Drive sprocket 115 is a stainless steel 60 tooth number 40 sprocket mounted to the outer end of the driveline axle.

Each of the two of idler sprocket 116 is a stainless steel 24 tooth number 40 sprocket. Each sprocket 116 is bolt-mounted proximate to the top on the outside of the one of the follower-side prior-described mount tube 67. The idler sprockets 116 are positioned 18 inches apart center to center with the bolt-mounted nylon bearing of driveline 114 located centered between them. Each idler sprocket 116 in its center has a pressed-in bearing. A bolt extends through the center of the bearing thus the sprocket via the bearing revolves around the bolt.

Roller chain 117 is a number 40 stainless steel roller chain about 24 feet long. One end of chain 117 is attached at the outer end 50 end of the adjacent rail 62. One end of chain 117 is attached at the end of the adjacent rail 62 closest to delivery-pipe end 55. Chain 117 extends between the outer and inner attachments and is looped under each idler sprocket 116 and over drive sprocket 115.

Each of the two of slider 118 resides on the rail side of a respective one of the two prior-described tubes 67. Each slider 118 includes a three-eighths thick by three inch wide uhmw plastic bar 24 inches in length. The plastic bar is bolt-mounted atop a horizontally extending leg of a one and one-half inch by one and one-half inch aluminum angle. The angle is centered along the length of the respective tube 67 and the downward leg is welded to the side of the tube 67. A one-eighth inch thick three-inch wide aluminum bar 24 inches in length resides atop the plastic bar. The plastic bar is sandwich-bolted between the aluminum bar and the horizontally extending leg of the angle. One and one-half inches of the plastic bar width protrudes beyond the angle. The outside one inch of the one and one-half inches resides atop the bottom flange of the I-beam of the respective rail 62, there-positioned to slide along the length of the top of the bottom flange. Therefore, when coupler body 85 is not coupled to an access valve 12, each slider 118 disposes the weight of carriage 61 onto rails 62 via the top of the inside bottom flange.

Carriage drive motor 79 propels driveline 114 and the propelled driveline 114 turns drive sprocket 115. Turning sprocket 115 affects to move carriage 61 along the length of rails 62, the weight of the carriage 61 disposed by each of the two sliders 118 onto a respective rail 62. In other words, drive motor 79 propels carriage 61 along rails 62 with carriage 61 sliding atop the bottom flange of each rail 61 via the respective slider 118. (The prior-described four followers 69 serve to maintain the orientation between carriage 61 and the set of rails 62 as carriage 61 is propelled.) An example of horizontal positioner 90 (of valve coupler 80) is illustrated in FIGS. 6, 7, 12 and 13. Exemplary horizontal positioner 90 establishes a horizontal orientation between coupler body 85 and access valve 12. The exemplary horizontal positioner 90 includes two of a plank frame mount 91, a plank frame 92, two of a plank frame bearing 93, a detector plank 94, a rest stop 96, and utilizes a carriage "in" switch 144 of control 140, a plank set limit-switch 133 of control 140 and a horizontal alignment limit-switch 131 of control 140.

Each of the two of plank frame mount 91 is a two inch by two inch aluminum square tube 18 inches in length. Each mount 91 is welded at the remote end of a respective one of the two of prior-described end tubes 68 that are located on the delivery-pipe-end 50 side of carriage 61. The length of each mount 91 extends downward there-from.

Each of the two of plank frame bearing 93 is a nickel-plated flange mount pillow block bearing and is bolted near the bottom end to a respective one of the frame mounts 91.

Plank frame 92 is two lengths of rectangular aluminum tube each two inch by three inch and having a one-quarter inch wall. The three inch side is vertically disposed. One end of each length of frame 92 mounts to a respective one of the two of frame bearing 93 and extends there-from toward outer end 50 thus providing that the outer end 50 end of frame 92 is enabled to swing up and down about the bearings 93.

Rest stop 96 is a two inch by two inch aluminum tube 44 inches in length. Stop 96 is bolted at the center of its length to delivery-pipe end 55 leg mount 99 (mount 99 described below) and extends there-from horizontally in the direction perpendicular to rails 62. Each of the two lengths of plank frame 92 rests on top of a respective outer end of rest stop 96. Thus stop 96 holds plank frame 92 in an at-rest (not swung) position (frame 92 shown at rest in FIGS. 12 and 13).

Detector plank 94 is a 48 inch wide by 78 inch long, one-half inch thick, sheet of uhmw plastic. Plank 94 is flush-mount bolted to the bottom side of frame 92 toward the outer end 50 end of frame 92.

Carriage "in" switch 144 (shown as CAR. IN 144 in FIG. 18) is switched on by a signal from controller 150 and when switched on provides power to carriage motor 79 causing motor 79 causing motor 79 to propel carriage 61 toward delivery-pipe end 55.

Plank set limit-switch 133 (shown as PLANK SET 133 in FIG. 18) is mounted on one side of carriage 61 and senses a trigger mounted to the rail 62 located next to that side of carriage 61.

Horizontal alignment limit-switch 131 (shown as HOR. ALIGN 131 in FIG. 18) is mounted on one of the two leg mounts 99 located on the outer end 50 side of carriage 61. Switch 131 is there-positioned to sense the adjacent arm of frame 93 when frame 93 has been swung upward.

Figure 12:
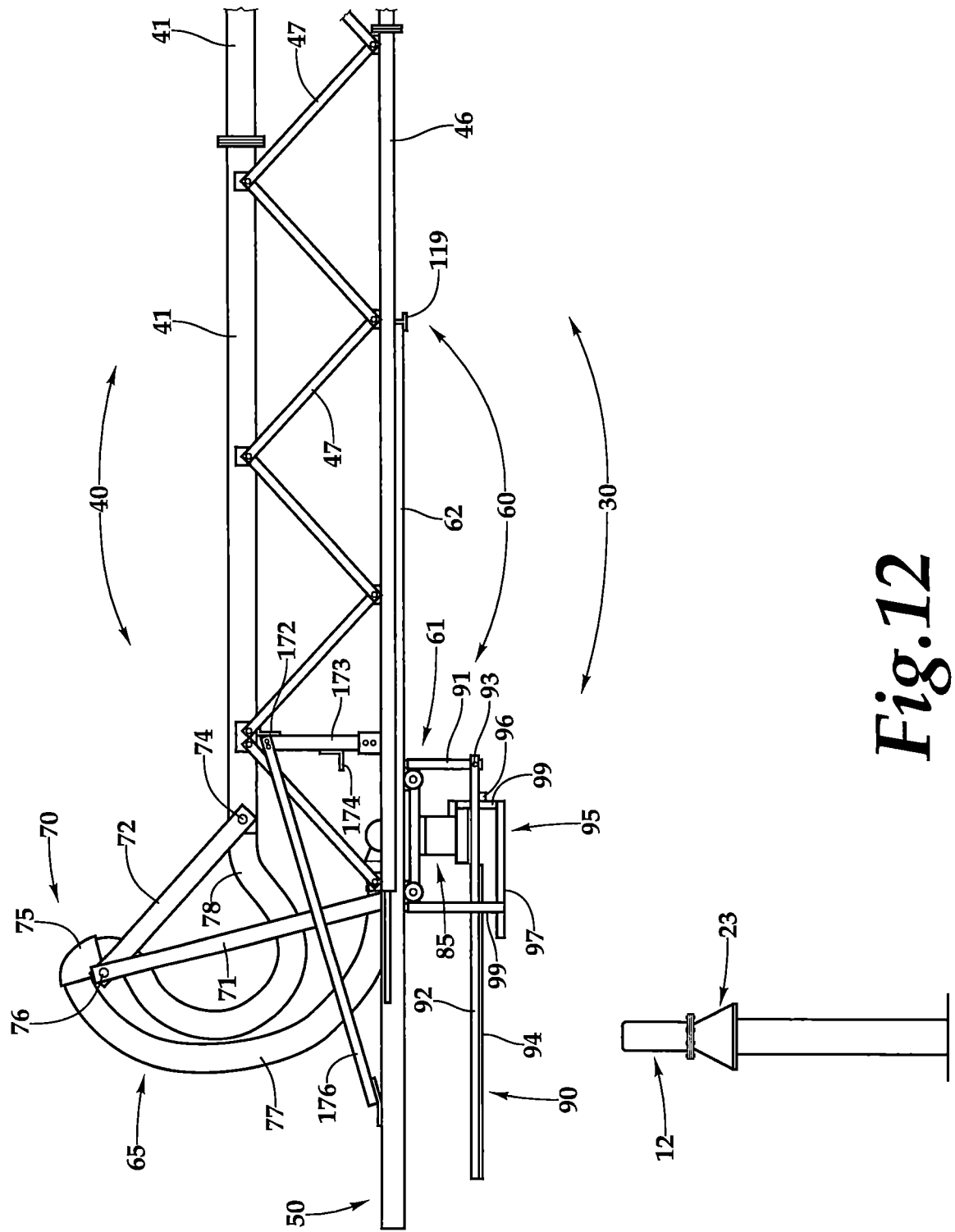
FIG. 12 is an enlarged side elevation view of the outer end of the swing arm when the connector is positioned relative to the delivery pipe as depicted in FIG. 2d with a detector plank positioned above an access valve.

Exemplary horizontal positioner 90 establishes a horizontal orientation between coupler body 85 and an access valve 12 by first positioning detector plank 94 above the subject valve 12 (FIG. 12). To so position, carriage 61 is propelled by carriage motor 79 toward delivery-pipe end 55 along rails 62. Motor 79 is powered via an energized carriage "in" switch 144 until plank set limit-switch 133 senses the trigger mounted to the rail 62 and sends a signal to controller 150.

Figure 8A:
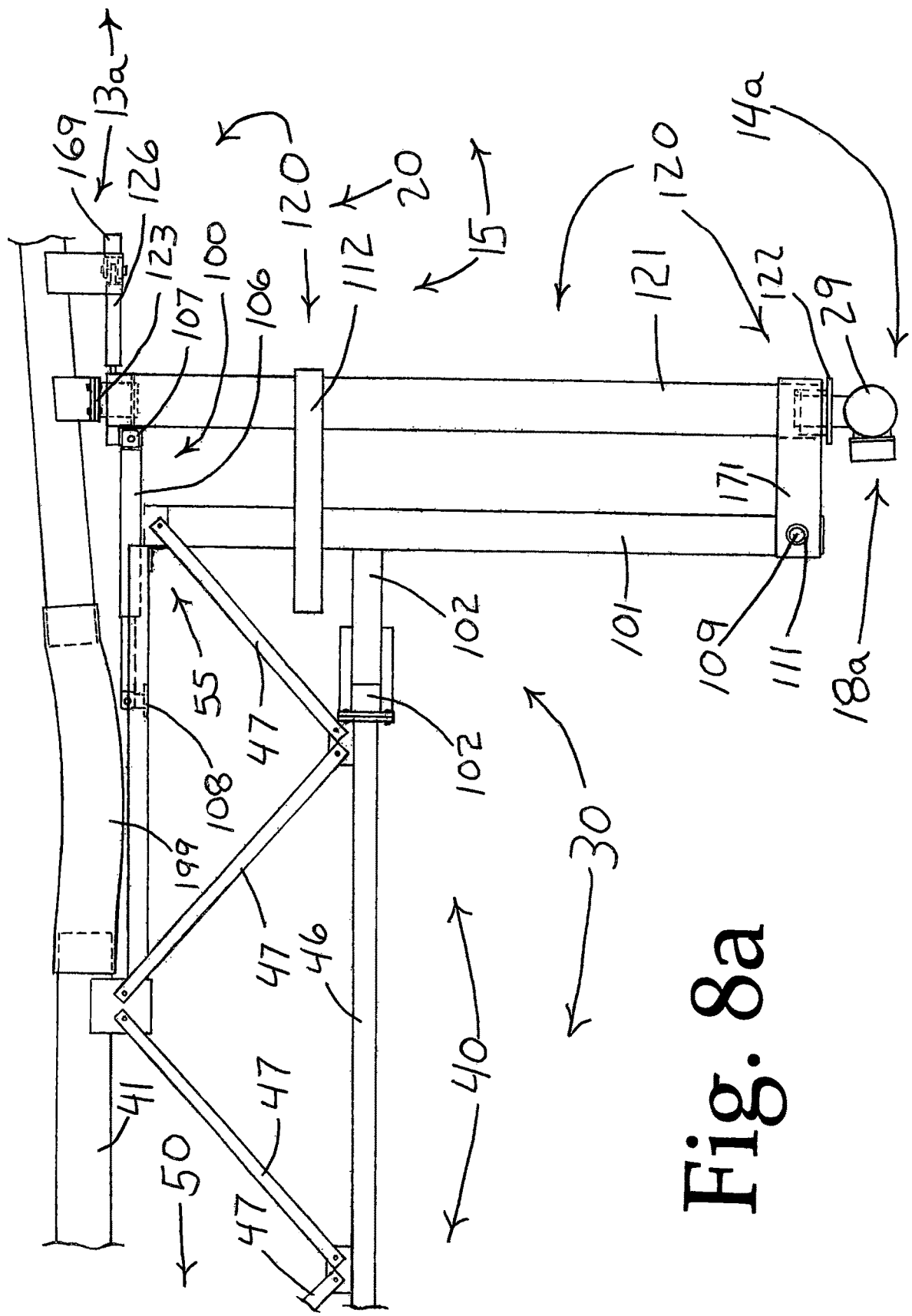
FIG. 8a is an enlarged view from FIG. 4 showing a delivery-pipe-end of the swing arm there-sporting a lift, a cantilever and a swinger, the lift shown in a lowered position.

Subsequently, outer end 50 is lowered by controller 150 energizing the prior-described swing arm "down" solenoid 104 (shown as SW. DOWN 104 in FIG. 18). Energized solenoid 104 extends hydraulic cylinder 106 utilizing lift 100 (FIGS. 8a. 8b and 9, lift 100 described below). Lowering outer end 50 causes the bottom side of plank 94 to contact the top of valve body 113 of the access valve 12. Further lowering causes valve 12 to force plank frame 92, via the contacted plank 94, to swing upward via the two frame bearings 93. The upward swing moves the trigger mounted to the arm of frame 93 within sensing range of horizontal alignment limit-switch 131 activating switch 131. Activated limit-switch 131 signals controller 150 to discontinue operation of "down" solenoid 104 thus halting the extension of cylinder 106. (Plank 94 is now oriented as shown by the outer end of plank 94 in dashed lines 198 in FIG. 13.) A horizontal orientation between coupler body 85 and access valve 12 is in this way established and vertical orientation between coupler body 85 and the access valve 12 via vertical positioner 95 can commence.

Figure 13:
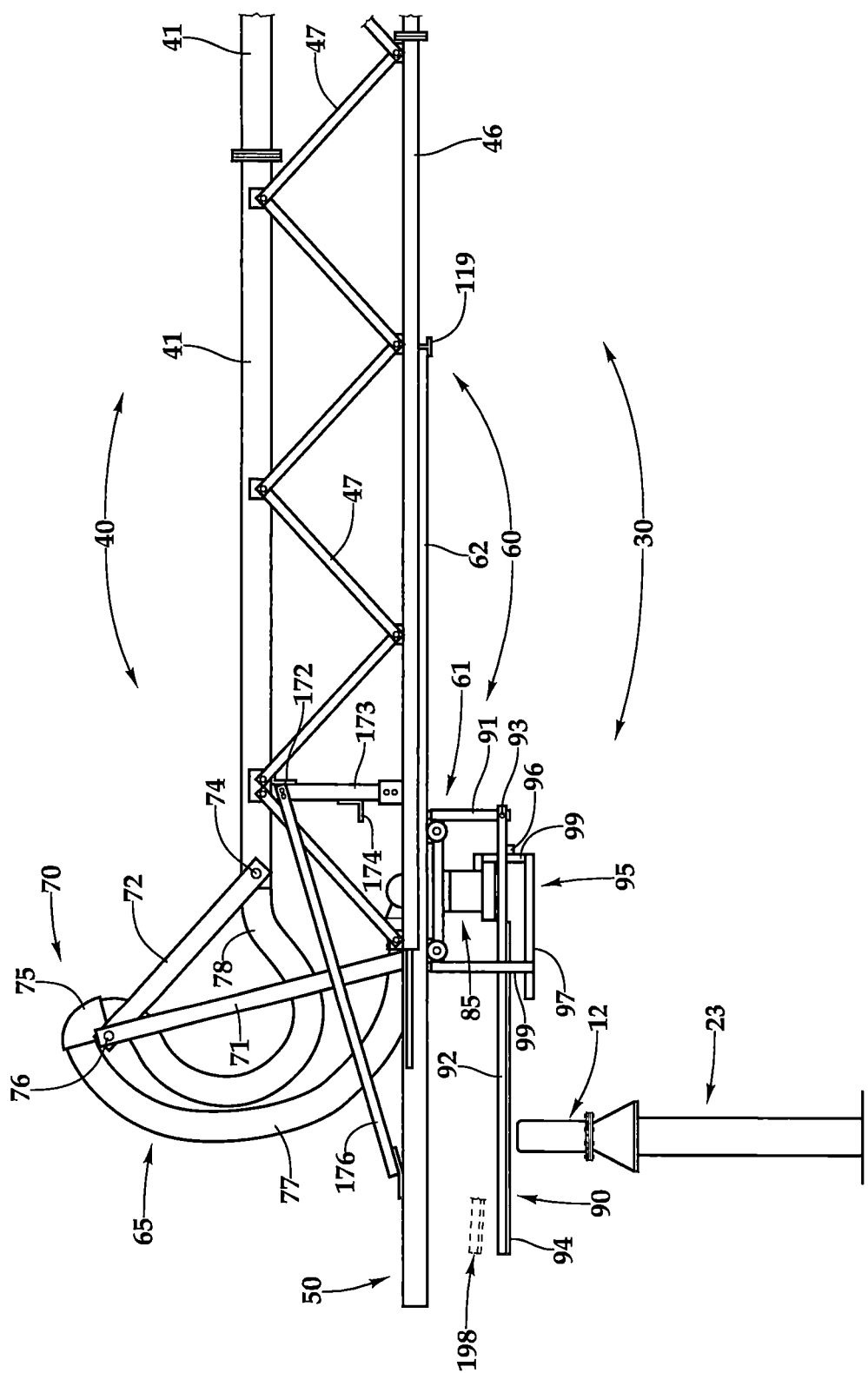
FIG. 13 is a view similar to FIG. 12 except that the outer end has been lowered causing the detector plank to contact the top of the access valve.
Figure 18:
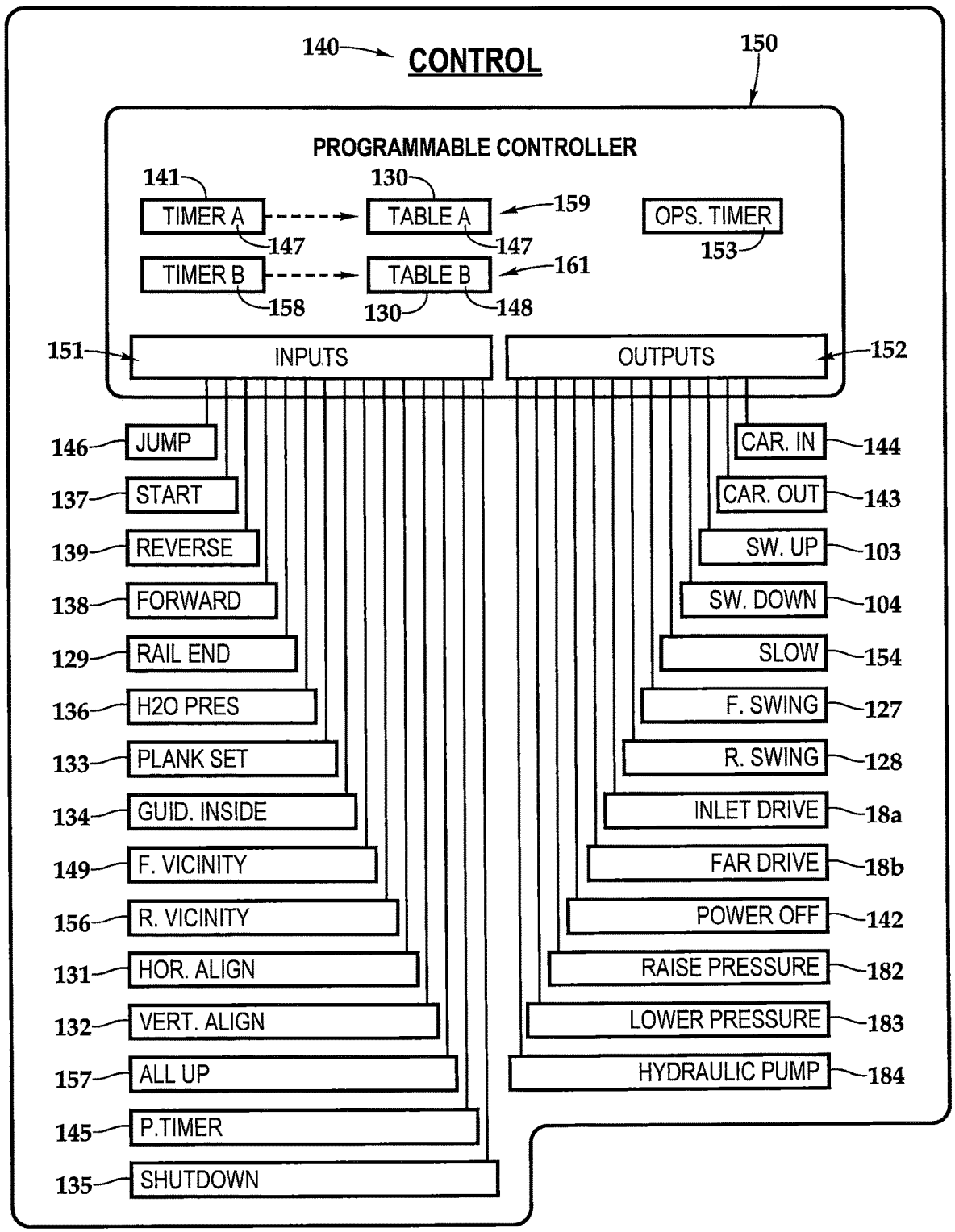
FIG. 18 is a control diagram.

Controller 150 can employ a slow solenoid 154 (shown as SLOW 154 in FIG. 18). When energized, slow solenoid 154 routes the pressurized hydraulic fluid through a flow restrictor. As a result, any component being powered by the hydraulic fluid will then operate at a slower speed. For example, after the above-described upward swing activates horizontal alignment limit-switch 131 subsequently discontinuing operation of "down" solenoid 104, controller 150 can then energize slow solenoid 154 along with swing arm "up" solenoid 103 (shown as SW. UP 103 in FIG. 18, described later on) affecting to raise outer end 50 and thus plank 94 but at a restricted speed relative to the faster speed when activating "up" solenoid 103 by itself. The restricted speed raise of plank 94 continues until plank set limit-switch 131 deactivates and controller 150 responds by de-energizing solenoids 154 and 103. Plank 94 is now oriented as illustrated in FIG. 13. This approach provides for a slower and thus more precise/accurate horizontal orientation.

(Slow solenoid 154 can likewise be employed advantageously to increase the accuracy of swinger 120, swinger 140 described below. For example, swinger 120 can swing arm 40, stop the swing and subsequently swing in the opposite direction employing solenoid 154 until the associated limit-switch de-activates. Alternately, swinger 120 can deploy two switches, the first switch when triggered signals to energize slow solenoid 154. The second switch when triggered signals to stop the swing. Slow solenoid 154 can likewise be employed advantageously when coupler 80 opens an access valve 12, when coupler 80 raises off of an access valve 12 or during any of the here-in described hydraulic operations to improve accuracy and/or to more delicately accomplish an operation.)

An example of vertical positioner 95 (of valve coupler 80) is illustrated in FIGS. 6, 7, 13 and 14. The exemplary positioner 95 establishes a vertical orientation between coupler body 85 and access valve 12. The exemplary vertical positioner 95 includes three of a catcher leg mount 99, a v-catcher frame 97, two of a v-catcher glider 98, utilizes a carriage "out" switch 143 of control 140, utilizes the previously described carriage motor 79 (motor 79 also employed by horizontal positioner 90) and utilizes a vertical alignment limit-switch 132 of control 140.

Each of the three of leg mount 99 is a two inch by three inch aluminum square tube. Two of the three of leg mounts 99 are welded to carriage 61, each welded to the free end of a respective one of the two end tubes 68 located on the outer end 50 side of carriage 61. The third leg mount 99 is welded to the side facing delivery-pipe end 55 of the square perimeter of flange 82, mount 99 positioned centered along the flange 82 side. Each leg mount 99 extends downward from the respective tubes 68 and flange 82.

V-catcher frame 97 is two arms each two inch by two inch aluminum angle four feet in length. One end of one arm is welded to one end of the other arm forming a 90-degree angled v-shape. The mouth of the v-shape faces toward outer end 50. Each arm angle of v-catcher frame 97 is oriented with a vertical side facing the other's vertical side and the other side of each angle oriented on the bottom and extending away from the other's bottom side. Each arm's bottom side is welded to the bottom of a respective one of the two leg mounts 99 located on the outer end 50 side of carriage 61. The vertical sides of the two arms at the butt of frame 97 are welded to the third leg mount 99 near the bottom of the mount 99. Each of the two arms of the v-shape of catcher frame 97 extends substantially horizontally and toward outer end 50. In other words, the mouth of the v-shape is toward outer end 50 (as opposed to toward delivery-pipe end 55).

Each glider 98 is a 2 inch wide by ⅜ inch thick uhmw plastic bar four feet in length. The ⅜ inch thickness of each glider 98 is flush-bolted to a respective vertical side of one of the two arms of v-catcher frame 97 such that the two-inch widths face each other.

Carriage "out" switch 143 (shown as CAR. OUT 143 in FIG. 18) is switched on by a signal from controller 150, and when switched on, provides power to carriage motor 79 causing motor 79 to propel carriage 61 toward outer end 50.

Vertical alignment limit-switch 132 (shown as VERT. ALIGN 132 in FIG. 18) is mounted to the above-described third leg mount 99 and is triggered/activated upon sensing the presence of main body 113 of access valve 12.

Vertical positioner 95 establishes a vertical orientation between coupler body 85 and the access valve 12 by landing valve body 113 (of the access valve 12) into the butt of v-catcher frame 97. To so land, controller 150 turns on carriage "out" switch 143 which switches power to carriage motor 79. Consequently, motor 79 propels carriage 61 toward outer end 50 along rails 62. The outward travel causes one of the two of glider 98 to contact the side of access valve body 113 (unless body 85 happens to already be perfectly vertically aligned with the valve 12). Continued outward travel pushes the one glider 98 against body 113 causing the glider 98 to slide along the side of access valve body 113 which forces swing arm 40 to swing via swinger 120 (swinger 120 described below). Continued outward travel of carriage 61 causes swing arm 40 to continue to swing as the side of glider 98 continues to slide until body 113 resides wedged into the butt of v-catcher frame 97. Wedged into the butt, body 113 is then positioned pressed up against both of the gliders 98. Just prior to body 113 landing in the butt of v-catcher frame 97, vertical alignment limit-switch 132 senses body 113 and trips. The activated limit-switch 132 signals programmable controller 150 which responds by switching off carriage "out" switch 143 causing carriage motor 79 to halt. A vertical orientation between coupler body 85 and access valve 12 has now been established and final alignment and coupling of body 85 to access valve 12 can then commence.

An example of rotator 105 (of valve coupler 80) is illustrated in FIG. 16. The exemplary rotator 105 provides rotation between coupler body 85 and a coupled-to access valve 12. When assembly 15 travels linearly while body 85 is coupled to an access valve 12, that travel affects arm 40 causing body 85 to rotate relative to the stationary poppet valve 17 and valve body 113 of valve 12. To accommodate the rotation, the bottom surface of the prior-described cup at the bottom of plunger 84 (the cup mated to the top of the stem of poppet valve 17) turns while the poppet valve 171 remains stationary. Further to accommodate the rotation, pre-alignment cone 83 and water seal 86 (both of coupler body 85) rotate about the there-inside stationary access valve body 113.

Figure 8B:
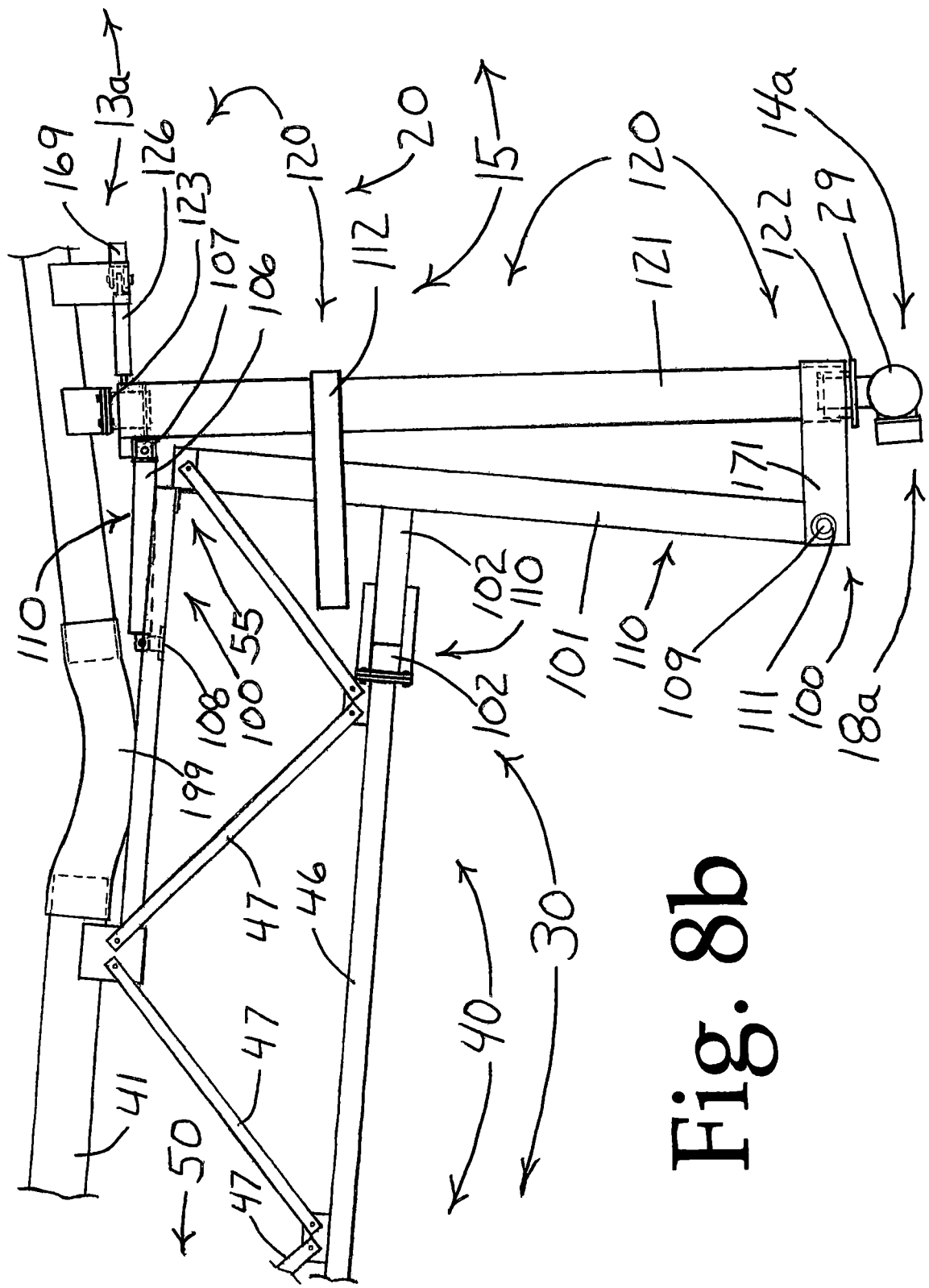
FIG. 8b is a view similar to FIG. 8a except with the lift is shown in a fully raised position.

Lift 100 functions to hold a swing arm off the ground. An example of lift 100 is illustrated in FIGS. 8a, 8b and 9. The exemplary lift 100 provides to raise swing arm 40, hold arm 40 and lower arm 40. Exemplary lift 100 includes a raise and lower beam 101, a bottom hinge 111, a hinge pin 109, a cross member 102, a beam cylinder mount 107, a swing arm cylinder mount 108, a hydraulic cylinder 106, and utilizes a swing arm "up" solenoid 103 of control 140, a swing arm "down" solenoid 104 of control 140 and an "all up" limit-switch 157 of control 140. (Only the wheel gearbox of drive 18a has been shown in FIGS. 8a and 8b, attached to the outer end 50 side of base-beam 29. Tires, wheels and wheel hubs have been omitted to present unobstructed view.)

Raise and lower beam 101 is a six inch by eight inch by one-quarter inch wall steel tube roughly seven and one-half feet in length that extends substantially vertically with bottom hinge 111 located near its bottom end.

Bottom hinge 111 has two halves. One halve of hinge 111 is a two inch diameter hole drilled through two opposite sides of beam 101, the two holes drilled near the bottom of beam 101. Pin 109 (further described below) is slide through the two holes and through two holes of the remaining halve of hinge 111. Hinge 111 provides that the upper end of beam 101 can be swung about pin 109 as its fulcrum, the upper end swing being toward and away from a rotator beam 121 (beam 121 described below).

The remaining halve of hinge 111 is a two inch diameter hole drilled through the two sides of a hinge support 171 (both sides extend toward water main 11), the two holes drilled near the free end of the sides of support 171. The other ends of support 171 are welded to rotator beam 121 of swinger 120 (support 171, beam 121 and swinger 120 all described below).

Hinge pin 109 is a one and seven-eighths diameter stainless steel pin ten inches in length that is fitted inside the two holes of the beam 101 halve of hinge 111 and inside the two holes of the hinge support 171 halve of hinge 111.

Cross member 102 is four inch by four inch by three-sixteenths inch wall square steel tube. Member 102 is t-shaped. The leg of the tee is roughly four feet in length and extends horizontally toward delivery-pipe far end 21. The top of the tee is just over seven feet in length. The top of the tee is welded to the one end of the leg and extends horizontally and perpendicular to the length of beam 101 with each end bolted to a respective one of the two of bottom tube 46. Cross member 102 is positioned roughly two-thirds up the length of beam 101 with the other leg end of the t-shape there-welded to beam 101.

Beam cylinder mount 107 is a hydraulic cylinder mount welded near the top and to the side of rotator beam 121 that faces toward water main 11.

Swing arm cylinder mount 108 includes a length of channel iron. The channel iron is four inches wide with a 0.184 inch thick web, 1.584 inch wide flanges and is 76 inches in length. The mouth of the channel iron faces up and a hydraulic cylinder mount is positioned and welded along the channel iron length in the mouth of the channel. The length of channel is bolted at one end to a mount welded to top pipe 41 of swing arm 40 and is bolted at the other end to a mount welded to the top of beam 101.

Hydraulic cylinder 106 has a four inch ID, a two inch rod and a 24 inch stroke. Cylinder 106 is pinned at one end to arm mount 108 and at the other end to beam mount 107.

"Up" solenoid 103 (shown as SW. UP 103 in FIG. 18) when energized opens supplying pressurized hydraulic fluid to cylinder 106 causing cylinder 106 to contract which pulls the top of beam 101 toward beam 121. When pulled toward beam 121, beam 101 swings about pin 109. Pulling beam 101 toward beam 121 affects to lift outer end 50 of swing arm 40 off of the ground.

"Down" solenoid 104 (shown as SW. DOWN 104 in FIG. 18) when energized provides for hydraulic oil to be released from cylinder 106 allowing cylinder 106 to extend, pulled by the weight of swing arm 40 (including all of the weight of the there-carried accoutrements). Extending cylinder 106 swings beam 101 about pin 109 and swings the top of beam 101 away from the top end of rotator beam 121. Swinging beam 101 away from the top of rotator beam 121 causes the outer end 50 of swing arm 40 to lower toward the ground. (In other words, exemplary lift 100 is configured to lower outer end 50 via gravity instead of via pressurized oil. Also, the released oil flows through a flow restrictor plumbed to cylinder 106 providing that, in the case of a burst hose or other, outer end 50 can only lower at a moderate speed, i.e. no free fall.)

"All up" limit-switch 157 (shown as ALL UP 157 in FIG. 18) is mounted near the top of beam 121 and is activated when sensing a trigger mounted near the top of beam 101. The contracting of cylinder 106 causes beam 101 to swing toward beam 121 moving the trigger within sensing range of switch 157 just prior to cylinder 106 being fully contracted. Sensing the trigger activates switch 157 sending a signal to controller 150. Controller 150 responds by turning off "up" solenoid 103 (and by beginning operation of a swinger 120, swinger 120 described below).

Exemplary lift 100 incorporates a cantilever 110. Cantilever 110 functions to cantilever-hold a swing arm. An example of cantilever 110 is illustrated in FIG. 8b. The exemplary cantilever 110 provides to cantilever-hold swing arm 40 off of the ground. Exemplary cantilever 110 utilizes structure built into lift 100 (including raise and lower beam 101, cross member 102, hydraulic cylinder 106, beam cylinder mount 107 and swing arm cylinder mount 108), in combination with structure built into swing arm 40, to achieve the cantilever-hold of swing arm 40.

For example, the fully contracted cylinder 106 (FIG. 8b) positions the top of beam 101 fully toward beam 121 thus positioning outer end 50 of swing arm 40 fully off of the ground. This cantilever of swing arm 40 puts supply pipe 41 into tension and pulls on the end of trussed delivery pipe 3a (there-located at inlet end 20 of assembly 15). The putting of supply pipe 41 into tension in turn puts each of the two of bottom tube 46 into compression via diagonal struts 47. The compression force in each of the two of tube 46 pushes against cross beam 102 which transfers that push to the bottom end of raise and lower beam 101. The push at the bottom end of beam 101 transfers to rotator beam 121 via hinge support 171, to bottom bearing mount 122 and ultimately to base-beam 29 of cart 14a (rotator beam 121 and bottom bearing mount 122 described below).

Figure 17:
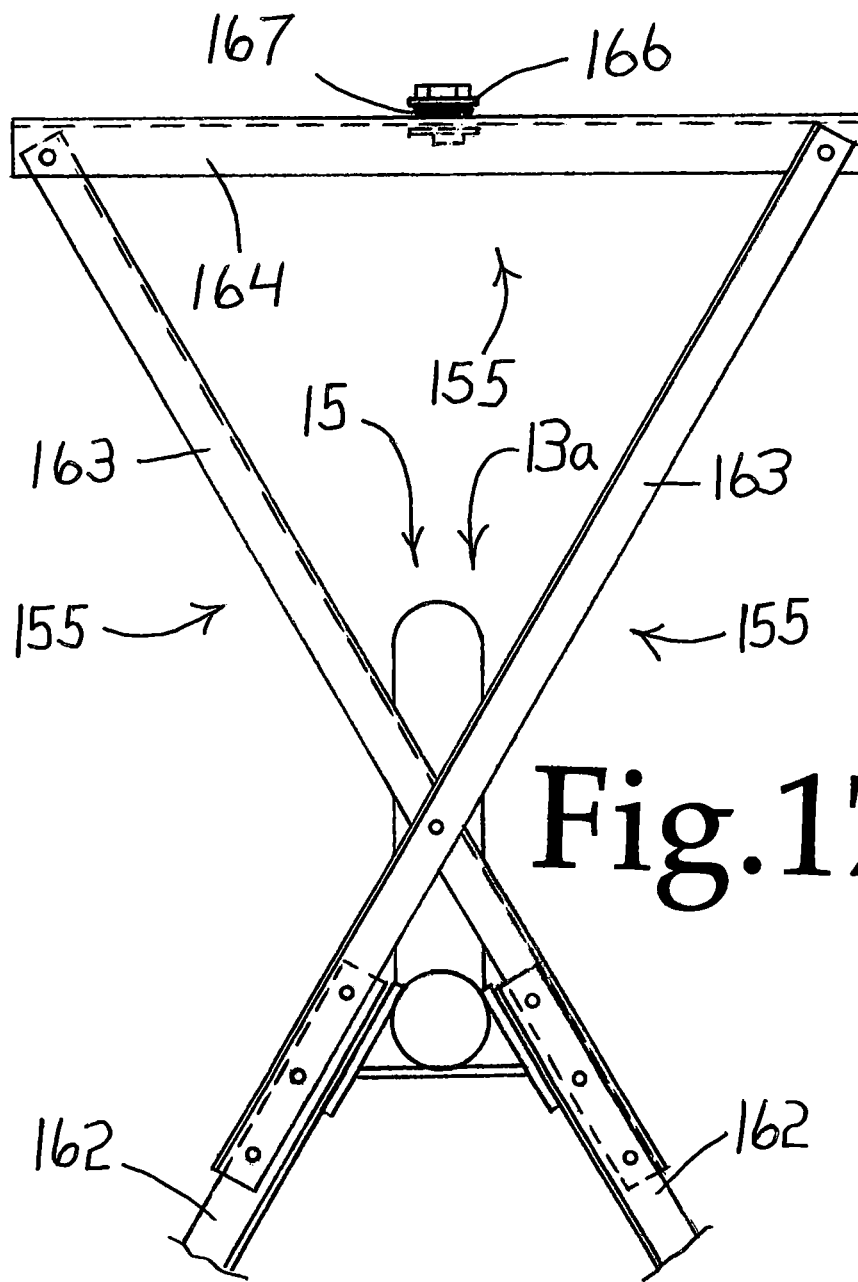
FIG. 17 is an enlarged end view taken on line 17-17 of FIG. 1 showing components of a counterbalance.

Exemplary lift 100 can include a counterbalance 155. Counterbalance 155 functions to counterbalance utilizing weight from a delivery pipe assembly. Components of an example of counterbalance 155 are illustrated in FIGS. 1 and 17. (FIG. 17 is taken on line 17-17 of FIG. 1). Delivery-pipe end 55 of swing arm 40 has been omitted from FIG. 17 to present an unobstructed view of the counterbalance 155 components.) The exemplary counterbalance 155 provides to counterbalance weight held by lift 100 with weight from one or more trussed delivery pipe 13.

Exemplary lift 100 holds off the ground weight that includes the weight of swing arm 40, including components of compensator 60 and coupler 80 there-mounted, as well as the weight of all water being carried there-in. Swing arm 40 can be of a length 45 (FIG. 4) and of a water carrying capacity (water weight) that, when held off of the ground, places significant push on base-beam 29 (of cart 14a). That push on beam 29 causes an upward push on the associated delivery pipe 13a around the area where knee brace 179 ties into the truss support of delivery pipe 13a. Enough of that upward push could cause buckling of pipe 13a around the area where knee brace 158 ties into the truss support (and/or elsewhere).

Exemplary counterbalance 155 includes two of a rabbit-ear 163, an ear top combiner 164, an ear wire-rope tie-in 166, a length of wire rope 167 and a delivery-pipe-assembly-span wire rope tie-in 168 (FIG. 1). Each rabbit ear 163 is a three inch by three inch by one-quarter inch steel angle, each ear 163 bolted to a respective one of the two tower legs 162 which reside closest to water main 11 (FIG. 1). There-from the rabbit ears 163 cross each other just above the top pipe of pipe assembly 13a (assembly 13a is bolted to the top the tower legs 162) and extend upward there-from. The top of each ear 163 is bolted to one end of ear top combiner 164. Combiner 164 is a three inch by three inch by one-quarter inch steel angle with the top leg positioned horizontally and facing far end 21. The length of combiner 164 extends horizontal and between the tops of the ears 163. Ear wire rope tie-in 166 is bolted to combiner 164 at the center of the length of the combiner 164 (shown in FIG. 17). Ear wire rope tie-in 166 affixes wire rope 167 to combiner 164. Delivery-pipe-assembly-span wire rope tie-in 168 is bolted to a flange welded to the top pipe of trussed delivery pipe 13a, the flange resides about half way between the apex of the crown of delivery pipe 13a and the end of pipe 13a closest to far end 21 of assembly 15 (FIG. 1). Delivery-pipe-assembly-span wire rope tie-in 168 affixes wire rope 167 to that flange.

The exemplary counterbalance 155 affects to counterbalance weight held by lift 100 with a trussed delivery pipe 13 by transferring the above-described pull on the top pipe of delivery pipe 13a. Counterbalance 155 transfers that pull on the top pipe of delivery pipe 13a from the bolted-to tower legs 162, via the rabbit ears 163 that are bolted to the tower legs 162, to ear top combiner 164, to ear wire rope tie-in 166, to length of wire rope 167, to delivery-pipe-assembly-span wire rope tie-in 168 and, ultimately, to the entirety of delivery pipe assembly span 13a. (Should that "pull" create a need for more counterbalance, counterbalance 155 can be configured to transfer the pull farther out along pipe assembly 15 to one or more of the adjacent delivery pipe spans 13.

(In an alternate embodiment, counterbalance 155 can constitute merely a reinforcement of conventional base-beam 29. Beam 19 can be reinforced, for example, by adding a length of eight inch schedule 40 pipe cut in half, the two halves placed around the length of a commercially available beam 29 and there-welded.)

(Lift 100 can hold swing arm 40 off the ground employing other than cantilever 110. As but one example, lift can employ the counterbalance illustrated in FIG. 17. Hydraulic cylinder 106 can be replaced by a cable winch mounted at the water main side of ear wire rope tie-in 166 on ear top combiner 164. The wire rope from the winch is attached toward the center of swing arm top pipe 41. The cable winch is operated to raise, lower and hold arm 40 and thus to raise, lower and hold coupler body 85.)

Swinger 120 functions to swing a swing arm. An example of swinger 120 is illustrated in FIGS. 8a, 8b and 9. The exemplary swinger 120 provides to swing an off-the-ground-held swing arm between a previously coupled-to access valve 12 to a next-up access valve 12.

Exemplary swinger 120 swings swing arm 40 and thus swings outer end 50 of arm 40 with coupler body 85 there-mounted in nearly a straight line between the two access valves. In other words, swinger 120 swings outer end 50 with coupler body 85 directly between the previously coupled-to access valve 12 and the next-up access valve 12.

(Swinging arm 40 in the opposite direction, and thus swinging arm 40 underneath delivery pipe 13a, to the next-up access valve would constitute swinging arm 40 in the neighborhood of 280 degrees in contrast to about 80 degrees for the above "direct" route. Further, swinging arm 40 in that opposite, indirect, direction constitutes coupler body 85 traveling in the neighborhood of four times the distance of the direct route.)

The exemplary swinger 120 includes a transmittal 112, a rotator beam 121, a bottom bearing mount 122, a top bearing mount 123, a hinge support 171, a rotator beam hydraulic cylinder mount 124, a delivery pipe hydraulic cylinder mount 169, a hydraulic cylinder 126, a forward swing solenoid 127 of control 140, a reverse swing solenoid 128 of control 140 and utilizes two vicinity limit-switches, a forward vicinity limit-switch 149 of control 140 and a reverse vicinity limit-switch 156 of control 140.

Transmittal 112 includes two one-quarter inch wall square tubes. Each tube is four inch by four inch and 40 inches in length. Each tube is welded to a respective opposing side of beam 121 with each length extending mostly horizontal toward water main 11. The sides of raise and lower beam 101 that parallel the "respective opposing sides of beam 121" are slid between the two tubes and reside mated against an inner side of a respective one of the two tubes. Transmittal 112 thus provides to enable beam 101 to swing to and fro about pin 109 while transferring the rotation of rotator beam 121 to beam 101. In other words, when beam 121 of swinger 120 rotates, transmittal 112 forces the upper end of beam 101 to rotate along with beam 121. The rotation of the upper end of beam 101 transfers to swing arm 40 via cross member 102 and tubes 46 causing swing arm 40 to swing along with, and as dictated by, rotation of rotator beam 121.

Rotator beam 121 is a one-quarter inch wall square steel tube that's eight inch by eight inch, roughly eight feet in length and extends substantially vertically.

Bottom bearing mount 122 is welded to the top side of base-beam 29 of cart 14a (located at inlet end 20 of pipe assembly 15—FIGS. 8a and 8b). The bottom of rotator beam 121 is mounted to and rotates utilizing bottom bearing mount 122.

Top bearing mount 123 is bolted to a mount welded to trussed delivery pipe 13a (pipe 13a located at the inlet end 20 of pipe assembly 15). The top of rotator beam 121 is mounted to and rotates utilizing top bearing mount 123.

Hinge support 171 includes two 20-inch long lengths of one-half inch thick by six inch wide steel plates. The width of each plate is butted against and welded to an opposite side of rotator beam 121, each there-from extending toward water main 11. Each plate has a two inch hole drilled through its thickness near the hinge end, the hole constitutes the rotator beam halve of the previously-described hinge 111. The bottom of raise and lower beam 101 resides between the two plates and the previously described hinge pin 109 is fitted inside the two holes of beam 101 and the two holes of hinge support 171.

Rotator beam cylinder mount 124 (FIG. 9) is a three inch by three inch by 36 inch long steel tube halving one end welded near the top of rotator beam 121 (welded on the water main 11 side of beam 121) with a cylinder mount welded to the other end.

Delivery pipe cylinder mount 169 a three inch by three inch by 36 inch long steel tube halving one end welded near the cart 14a end of trussed delivery pipe 13a with a cylinder mount welded to the other end. (Mount 169 welded to a set of tabs welded to the bottom of the top pipe of delivery pipe 13a about two feet toward far end 21 from top bearing mount 123.)

Hydraulic cylinder 126 has a three inch ID and a 15 inch stroke. Cylinder 126 is pinned at one end to mount 124 and is pinned at its other end to mount 169.

Forward swing solenoid 127 (shown as F. SWING 127 in FIG. 18) when energized supplies pressurized hydraulic fluid to cylinder 126 causing cylinder 126 to retract swinging swing arm 40 in the travel direction of assembly 15 when connector 30 and assembly 15 are oriented relative to main 11 as shown in FIGS. 2d, 3a and 3b (clockwise relative to assembly 15).

Reverse swing solenoid 128 (shown as R. SWING 128 in FIG. 18) when energized supplies pressurized hydraulic fluid to cylinder 126 causing cylinder 126 to extend swinging swing arm 40 in the travel direction of pipe assembly 15 when assembly 15 travels in the direction opposite that shown in FIGS. 2d, 3a and 3b. (In other words, swing arm 40 swings reverse/counter-clockwise relative to assembly 15.)

Exemplary swinger 120 positions coupler body 85 within a vicinity of the next-up access valve 12 upon conclusion to swinging swing arm 40 (next-up valve 12 illustrated as valve 12b in FIG. 2d). Coupler body 85, positioned within the vicinity, is then within range to align with and couple to the next-up access valve 12 (valve 12b). Swinger 120 utilizes one or the other of two vicinity limit-switches to position coupler body 85 within the vicinity, a forward vicinity limit-switch 149 or a reverse vicinity limit-switch 156 (the one of the two switches employed depends upon the direction of travel of assembly 15, forward or reverse).

Knowing the dimensions of the size of the vicinity enables the dimensions of the prior-described plank 94 to be calculated providing that plank 94 is ensured to always find the top of a given access valve 12. Exemplary swing arm 40 is a fixed and known length. The distance between two access valves is also fixed and known. Delivery pipe assembly 15 employs a guidance system 130 (discussed below) to maintain inlet end 20 of assembly 15 within a distance range from water main 11. In other words, guidance 130 maintains inlet end 20 of assembly 15 within a known plus or minus of a dead-center distance from water main 11. (As an example, guidance 130 might be designed to display a range of accuracy of plus or minus 24 inches from a 50 foot dead-center.) Therefore, with length of arm 40 known and distance between valves 12 known, upon swinging swing arm 40 a pre-determined (known) angle as implemented by the triggering of the one or the other vicinity limit-switch, the area/vicinity coupler body 85 will then reside within directly correlates to the range of accuracy (distance range) of guidance 130. In other words, at the conclusion to the swing, the length and width of the area (vicinity) coupler body 85 then will reside within can be precisely calculated. From that precise calculation, the dimensions of previously-described plank 94 simply need be slightly longer and slightly wider for plank 94 to always detect the top of an access valve 12.

Forward vicinity limit-switch 149 (shown as F. VICINITY 149 in FIG. 18) is mounted to cart 14a just below the top pipe of pipe assembly 13a (cart 14a located at inlet end 20 of pipe assembly 15). When FORWARD 138 (FIG. 18) switch of assembly 15 has been tripped to "on" (see "system start up"), controller 150 activates forward vicinity limit-switch 149. A trigger is mounted near the top of rotator beam 121. If switch 149 has been activated, the trigger will be sensed by forward vicinity limit-switch 149. Controller 150 responds to a triggered switch 149 by discontinuing operation of forward swing solenoid 127 causing the retraction of hydraulic cylinder 126 to halt. Coupler body 85 and detector plank 94 now will appropriately reside within the calculated vicinity above a next-up access valve 12. (Plank 94 will reside within the vicinity, positioned above that next-up access valve 12, upon carriage 61 having been propelled toward delivery-pipe end 55 until plank set limit-switch 133 triggers. That propelling can be implemented prior to the swing, during the swing or subsequent to the swing.)

Reverse vicinity limit-switch 156 (shown as R. VICINITY 156 in FIG. 18) is mounted to cart 14a just below the top pipe of pipe assembly 13a. When REVERSE 139 (FIG. 18) switch of assembly 15 has been tripped to "on" (see "system start up"), controller 150 activates reverse vicinity limit-switch 156. A trigger is mounted near the top of rotator beam 121. If switch 156 has been activated, the trigger will be sensed by switch 156. Controller 150 responds to a triggered switch 156 by discontinuing operation of reverse swing solenoid 128 causing the extension of hydraulic cylinder 126 to halt. Coupler body 85 and detector plank 94 now appropriately reside relative to the calculated vicinity above a next-up access valve 12. (Plank 94 will reside within the vicinity, correctly positioned above that next-up access valve 12, upon carriage 61 having been propelled toward delivery-pipe end 55 until plank set limit-switch 133 triggers. That propelling can be implemented prior to the swing, during the swing or subsequent to the swing.)

Once swing arm 40 has been swung and plank 94 resides correctly positioned above that next-up access valve 12, the prior-described horizontal positioner 90 is employed to establish a horizontal orientation between coupler body 85 and that next-up access valve 12 (by lowering plank 94 to contact the top of the access valve 12 as discussed prior).

Exemplary connector 30 includes a junction hose 199 (shown in FIGS. 8a, 8b and 9). Hose 199 is a pressure-bearing flexible hose with an eight inch ID and is 54 inches in length. Hose 199 resides between the delivery-pipe end 55 end of supply pipe 41 (of swing arm 40) and the inlet end 20 end of the top pipe of delivery pipe 13a. One end of hose 199 is slid over and clamped to the end of pipe 41. The other end of hose 199 is slid over and clamped to the end of the top pipe.

In one variation of automated connector 30, connector 30 includes a horizontal leveler. Controller 150 responds to signal information from a level sensor by operating hydraulic cylinder 106 of lift 100 to horizontally orient swing arm 40. For example, when arm 40 has been raised off of the ground just prior to being swung, the leveler is employed to position arm 40 at a desired orientation relative to horizontally level. So oriented, arm 40 is subsequently then swung between valves. In other words, a set orientation of arm 40 relative to horizontally level (the orientation can be horizontal) is established prior to arm 40 being swung which results in a closer positioning of coupler body 85 (and plank 94) above the next-up access valve 12. The set orientation of arm 40 relative to level counters outer end 50 height deviation caused by cart 14a residing on a hill or in a valley and also by the cart 14 adjacent to cart 14a residing on a hill or in a valley.)

In another variation of connector 30, lift 100 employs rotator beam 131 to hold swing arm 40 off of the ground. (In other words, raise and lower beam 101 has been eliminated and arm 40 is cantilevered out from beam 131.) In this variation, valve coupler 80 includes a mechanism to lower and raise coupler body 85 relative to swing arm 40 at outer end 50 to couple to and uncouple from, respectively, an access valve 12. For this variation, connector 30 also includes compensator 60, free-rotating-elbow transfer 70, swinger 120, guidance 130 and control 140.

In yet another variation, connector 30 includes the horizontal leveler. Controller 150 responds to signal information from a level sensor by operating hydraulic cylinder 106 of lift 100 to horizontally orient swing arm 40. For example, when arm 40 has been raised off of the ground just prior to being swung, the leveler is employed to position arm 40 at a desired orientation relative to horizontally level which results in a closer positioning of coupler body 85 (and plank 94) above the next-up access valve. However, in this variation, lift 100 is not employed to lower and raise coupler body 85. Instead, valve coupler 80 includes a mechanism to lower and raise coupler body 85 relative to swing arm 40 at outer end 50 to couple to and uncouple from, respectively, an access valve 12. For this variation, connector 30 also includes compensator 60, free-rotating-elbow transfer 70, swinger 120, guidance 130 and control 140.

Guidance 130 functions to position a delivery pipe. An example of guidance 130 is illustrated in the FIG. 18 control diagram. The exemplary guidance 130 provides to position delivery pipe assembly 15 relative to water main 11 during linear travel of assembly 15 by position-indexing off of a coupled-to access valve 12. Exemplary guidance 130 affects to maintain inlet end 20 of pipe assembly 15 within a distance range (i.e. within a plus or minus distance) from an imaginary longitudinal line extending through the succession of access valves 12. (Present-day conventional linear-move systems employ other types of guidance to maintain the delivery pipe appropriately positioned relative to the water main. These conventional industry guidance include "furrow guidance", "above-ground wire guidance", "buried wire guidance" and "gps guidance". Any of these guidance types can alternately, more expensively, be employed in place of guidance 130 to guide delivery pipe assembly 15 when supplied by automated connector 30.)

Exemplary guidance 130 includes programming in controller 150. Controller 150 executes programming to position pipe assembly 15 relative to water main 11. Exemplary guidance 130 utilizes the prior-described plank set limit-switch 133, a guidance inside limit-switch 134, a hard jumper 146, an elapsed time timer A 141, an elapsed time timer B 158, a table A 147, a table B 148 and a shutdown 135. Exemplary guidance 130 operates in concert with a percentage timer 145 of pipe assembly 15. (Plank set limit-switch 133, shown as PLANK SET 133 in FIG. 18 is dual purpose, also employed by the above-discussed horizontal positioner 90.)

Guidance inside limit-switch 134 (shown as GUID. INSIDE 134 in FIG. 18) is located along one of the two of rail 62, near the delivery-pipe end 55 of the rail 62, there-positioned to activate when rails 62 translating relative to carriage 61 causes carriage 61 to trigger switch 134.

Hard jumper 146 (shown as JUMP 146 in FIG. 18) is a hardwire jumper physically installed in the hardware of control 140. For example, control 140 can have ten different pairs of receptacles for jumper 146 to be plugged into. Each pair of receptacles when jumper 146 is there-plugged-into instructs control 140 to implement an associated unique set of table values for the below-described table A 147 and table B 148. When system 10 is initially installed in a farmer's field, the installer physically plugs jumper 146 into the receptacle pair that best represents the travel speed of drive 18a (inlet end 20) and drive 18b (far end 21) for that particular linear-move water delivery pipe assembly. This "hard" jumper 146 approach remediates any possibility that a wrong set of table values erroneously gets installed and thus implemented by controller 150 (as could happen employing, for example, a keypad entry). (Connector 30 can be mated to any of the many different linear-move water delivery pipe assemblies manufactured today to their advantage. Though the travel speed of drives 18a and 18b is typically identical, that travel speed likely differs from one manufacturer to the next. Additionally, at least some of the manufacturers offer more than one choice of drives and more than one tire size. As such, multiple table sets are here-employed to accommodate the range of industry travel speeds so that controller 150 initiates tailored/precise course corrections.)

Elapsed-time timer A 141 (shown as TIMER A 141 in FIG. 18) is a timer that resides internal of controller 150 and provides to measure and subsequently register elapsed time. The elapsed time is then employed for implementing a first course correction 159 (correction 159 described below).

Elapsed-time timer B 158 (shown as TIMER B 158 in FIG. 18) is a timer that resides internal of controller 150 and provides to measure and subsequently register elapsed time. The elapsed time is then employed for implementing a second course correction 161 (correction 161 described below).

Table A 147 (shown as TABLE A 147 in FIG. 18) contains course correction values for the first course correction 159. (The set of values in Table A 147 is determined by the placement of jumper 146 as described above.) Each value stored in table A 147 corresponds to an amount of elapsed time potentially registered by timer A 141. Controller 150 obtains a registered amount of elapsed time from timer A 141 and references table A 147 to obtain a corresponding course correction value. Controller 150 then utilizes the obtained corresponding correction value and executes first course correction 159.

(As an example of executing the course correction, the registered amount of time from timer A 141 is 63 seconds. Controller 150 references table A 147 and the corresponding valve in table A 147 is "−23 seconds". The "−23 seconds" value indicates to controller 150 to pause operation of the drive motor of drive 18a (inlet end 20) for 23 seconds. The "−" designates drive 18a and a "+" designates drive 18b. Subsequently, when percentage timer 145 signals controller 150 to run drives 18a and 18b, for the first 23 seconds of run time, controller 150 will only operate the drive 18b. Operating only one of the two drives causes the travel direction of pipe assembly 15 to be turned slightly, i.e. course corrected. Controller 150 employs the same procedure for executing both first correction 159 and second correction 161.)

Table B 148 (shown as TABLE B 148 in FIG. 18) contains course correction values for the second course correction 161. (The set of values in Table B 148 is determined by the placement of jumper 146 as described above.) Each value stored in table B 148 corresponds to an amount of elapsed time potentially registered by timer B 158. Controller 150 obtains a registered amount of elapsed time from timer B 158 and references table B 148 to obtain a corresponding course correction value. Controller 150 then utilizes the obtained corresponding correction value and executes second course correction 161.

Shutdown 135 (shown as SHUTDOWN 135 in FIG. 18), is located on carriage 61 and is activated by one of two triggers, one trigger positioned essentially at the delivery-pipe end 55 of one of rails 62 and the other trigger positioned essentially at the outer end 50 end of one of the rails 62.

Switch 135 is triggered/activated when rails 62 translating across rollers 63 reposition carriage 61 toward the delivery-pipe end 55 of rails 62 beyond the above-suggested distance range or when rails 62 translating across rollers 63 reposition carriage 61 too close to the outer end 50 of rails 62. In other words, shutdown 135 is triggered when carriage 61 is in imminent danger of butting up against one or the other of the end 55 or the end 50 end of rails 62. An activated/triggered shutdown 135 instructs controller 150 to shut down the operation of system 10.

Percentage timer 145 (shown as P.TIMER 145 in FIG. 18), is a conventional component employed in the industry on irrigators such as delivery pipe assembly 15 and typically comes standard inside a control panel of assembly 15. The farmer sets timer 145 to prescribe the amount of water he wants applied during that particular irrigation cycle. As one example of timer 145 operation on present-day assemblies 15, timer 145 simultaneously dictates the powering of both drive 18a (at inlet end 20 of assembly 15) and drive 18b (at far end 21 of assembly 15). The drives 18 of the remaining carts 14 subsequently respond to the corresponding travel of carts 14a and 14b via span alignment switches located between the delivery pipes 13. (Timer 145, running drives 18a and 18b with the remaining carts operating via the alignment switches, is presently practiced industry procedure employing present hardware.) As one example, if the farmer sets timer 145 to 10%, timer 145 will simultaneously run drives 18a and 18b, for this example, for 15 seconds. Timer 145 will then wait 150 seconds, again run drives 18a and 18b for the 15 seconds and so on. (Timer 145 can alternately be located elsewhere than the panel of assembly 15, for example in a panel located at connector 30.)

For this example of automated connector 30, percentage timer 145 is an industry-supplied timer 145 located in a control panel of the assembly 15. However, the percentage timer 145 is disconnected from the conventional assembly 15 powering of drives 18a and 18b. Instead, the signal from percentage timer 145 is connected to P. TIMER 145 (FIG. 18) of input 151 of programmable controller 150. The farmer selecting the travel direction of assembly 15 (described below), also engages power to timer 145. The subsequent run signal from engaged timer 145 travels to controller 150. (As an example, timer 145 send the run signal for 15 seconds, waits 150 seconds, sends the run signal for 15 seconds etc.) Controller 150 selects to employ or not employ the run signal from timer 145 depending upon where connector 30 is in the "operational cycle". For example, if coupler body 85 is not coupled to an access valve, controller 150 will ignore the signal from timer 145 (though timer 145 continues to send its run signal) because when body 85 is not coupled to an access valve, there can be no water flow and so assembly 15 must remain stationary until water flow is subsequently resumed. When controller 150 employs the run signal from timer 145 (body 85 is coupled to an access valve 12), responsive to the run signal from timer 145, controller 150 energizes the drive motor of drive 18a and the drive motor of drive 18b until timer 145 discontinues the signal.

Guidance 130 performs the suggested first course correction 159 and suggested second course correction 161 to the travel direction of assembly 15 to maintain inlet end 20 of assembly 15 within the desired distance range from the succession of water main access valves 12 during the linear travel of assembly 15.

First course correction 159 (shown as 159 in FIG. 18): Upon coupler body 85 being coupled to an access valve 12 (swing arm 40 thus positioned relative to assembly 15 as illustrated in FIG. 2a), once water pressure has raised tripping a pressure sensor 136 (shown as H2O PRES. 136 in FIG. 18), controller 150 initiates travel of pipe assembly 15 by employing the run signal from percentage timer 145. Controller 150 also starts elapsed-time timer A 141.

With the signal from percentage timer 145 being employed, during each interval that timer 145 sends its run signal, controller 150 runs the drive motor of drive 18a and the drive motor of drive 18b. Simultaneously, elapsed-time timer A 141 measures and registers each interval of timer 145 run time until the travel of pipe assembly 15, translating rails 62 across rollers 63 of carriage 61, repositions carriage 61 toward delivery-pipe end 55 of swing arm 40 where plank set limit-switch 133 senses the presence of carriage 61 and trips/activates. Controller 150 responds to the tripped/activated limit-switch 133 by obtaining the total amount of elapsed run time registered by timer 141 and referencing table A 147 to obtain the course correction valve (+ or – seconds) that corresponds with that registered amount of time. Controller 150 then pauses operation of the drive motor of drive 18a or the drive motor of drive 18b (indicated by + or – in table A) for the amount of time prescribed. (The pause is enforced only during each run interval that timer 145 runs the drive motors of drives 18a and 18b. In other words, if the correction is 60 seconds, and each run interval is 20 seconds long, the correction will transpire over three run intervals.)

Second course correction 161 (shown as 161 in FIG. 18): Subsequent to the "first course correction 159", continuing travel of assembly 15 as dictated by percentage timer 145, translating rails 62 across rollers 63, repositions carriage 61 toward delivery-pipe end 55 of swing arm 40 to a location where guidance inside limit-switch 134 senses the presence of carriage 61 and activates. Controller 150 responds to the activated switch 134 by starting elapsed-time timer B 158. During each interval that timer 145 dictates operation of the drive motors of drives 18a and 18b, elapse-time timer B 158 measures and registers that interval. Continuing travel of pipe assembly 15 as dictated by the timer 145 intervals, while timer B 158 continues to measure and register run-time elapsed during each interval of travel, translates rails 62 across rollers 63 repositioning carriage 61 farther toward delivery-pipe end 55 until swing arm 40 and assembly 15 are parallel (FIG. 2b).

Further continuing travel of pipe assembly 15 in intervals, while timer B 158 continues to measure and register run-time elapsed, then causes rails 62 to translate across rollers 63 repositioning carriage 61 back in the opposite direction (i.e. carriage 61 is being repositioned toward outer end 50) while timer B 158 continues to measure and cumulatively register until guidance inside limit-switch 134 no longer senses the presence of carriage 61 and de-activates. Controller 150 responds to the de-activation by obtaining the total/cumulative amount of elapsed run time registered by timer B 158 and references table B 148 to obtain the course correction valve (+ or – seconds) that corresponds with that total amount of elapsed time. Controller 150 then pauses operation of the drive motor of drive 18a or the drive motor of drive 18b (+ or –) as prescribed in table B 148 and for the amount of time prescribed in table B 148.

Control 140 functions to control operations. An example of control 140 is illustrated in the control diagram of FIG. 18 (shown as CONTROL 140). Exemplary control 140 controls operations of automated connector 30. Exemplary control 140 includes a programmable controller 150.

Programmable controller 150 is a well known off-the-shelf controller that operates according to internally stored programming to respond to signal information received from one or more inputs and to engage one or more of outputs. (Controller 150 can be any type of controller, e.g. can be a programmable logic controller, a.k.a. PLC, can be a programmable-C language based controller or can be some other controller.) An example of controller 150 is illustrated in FIG. 18. Exemplary controller 150 responds to inputs 151 and engages outputs 152.

Inputs 151 receives signal information from devices. An example of inputs 151 is illustrated as INPUTS 151 in FIG. 18. The exemplary inputs 151 receives signal information from the previous-discussed percentage timer 145, plank set limit-switch 133, hard jumper 146, guidance inside limit-switch 134, "all up" limit-switch 157, forward vicinity limit-switch 149, reverse vicinity limit-switch 156, horizontal alignment limit-switch 131, vertical alignment limit-switch 132 and shutdown 135.

Exemplary inputs 151 also receives signal information from a water pressure switch 136, an end of rails limit-switch 129 and an operation timer 153.

Water pressure switch 136 (shown as H2O PRES. 136 in FIG. 18) is plumbed to top pipe 41 of swing arm 40. Exemplary switch 136 triggers/activates when the water pressure inside pipe 41 hits a pre-set pressure. For example, upon coupling to an access valve, water begins to flow into connector 30 and subsequently out of pipe assembly 15. Once assembly 15 is full of water (any and all of the air has escaped), the water pressure will rise in top pipe 41 and ultimately hits the pre-set pressure activating pressure switch 136. (As an example, the pre-set might be 43 p.s.i.) Additionally, once activated, switch 136 is configured to remain activated until the pressure drops below a preset level where switch 136 will de-activate, i.e. no longer sends a signal. (E.g. 20 p.s.i.)

End of rails limit-switch 129 (shown as RAIL END 129 in FIG. 18) is mounted close to the outer end 50 end of one of the rails 62 (for example six inches from rail end). Rails 62, translating across rollers 63, position carriage 61 approaching that end of the rail 62. Switch 129 activates upon sensing carriage 61. The activated switch 129 signals controller 150. (The six inches affords shutdown 135 sufficient space to prevent carriage 61 from butting up against the end of rails 62.)

Operation timer 153 (shown as OPS. TIMER 153 in FIG. 18) is a timer internal to controller 150 that is selectively employed by controller 150 to time events. For example, controller 150 can be employed to time the lowering of coupler body 85 onto an access valve 12 and the subsequent water pressure rise to the pre-set operating pressure. If that event (from trigger of vertical alignment limit-switch 132 to trigger of pressure switch 136) does not conclude within a pre-determined (programmed) amount of time as timed by operation timer 153, controller 150 will respond to the tardiness by sending a signal to lower pressure 183 and a signal to a system power off 142 (power off 142 of outputs 152 described below). Operations timer 153 can likewise be employed to time any and all connector 30 operations. As another example, timer 153 can be employed to measure the amount of time spent lifting swing arm 40 prior to the subsequent swing to a next-up access valve. For this example, controller 150 activates timer 153 when pressure sensor 136 stops sending its signal to controller 150 (water pressure has dropped). Controller 150 energizes "up" solenoid 103 causing hydraulic cylinder 106 to contract which lifts swing arm 40 until "all up" limit-switch 157 is triggered/activated. Controller 150 responds to the signal from switch 157 by deactivating timer 153. If the amount of time measured by timer 153 (the elapsed time between switch 136 off to switch 157 on) is more than that specified controller 150 programming for the lift to require, controller 150 will send a signal to system power off 142.

Figure 19:
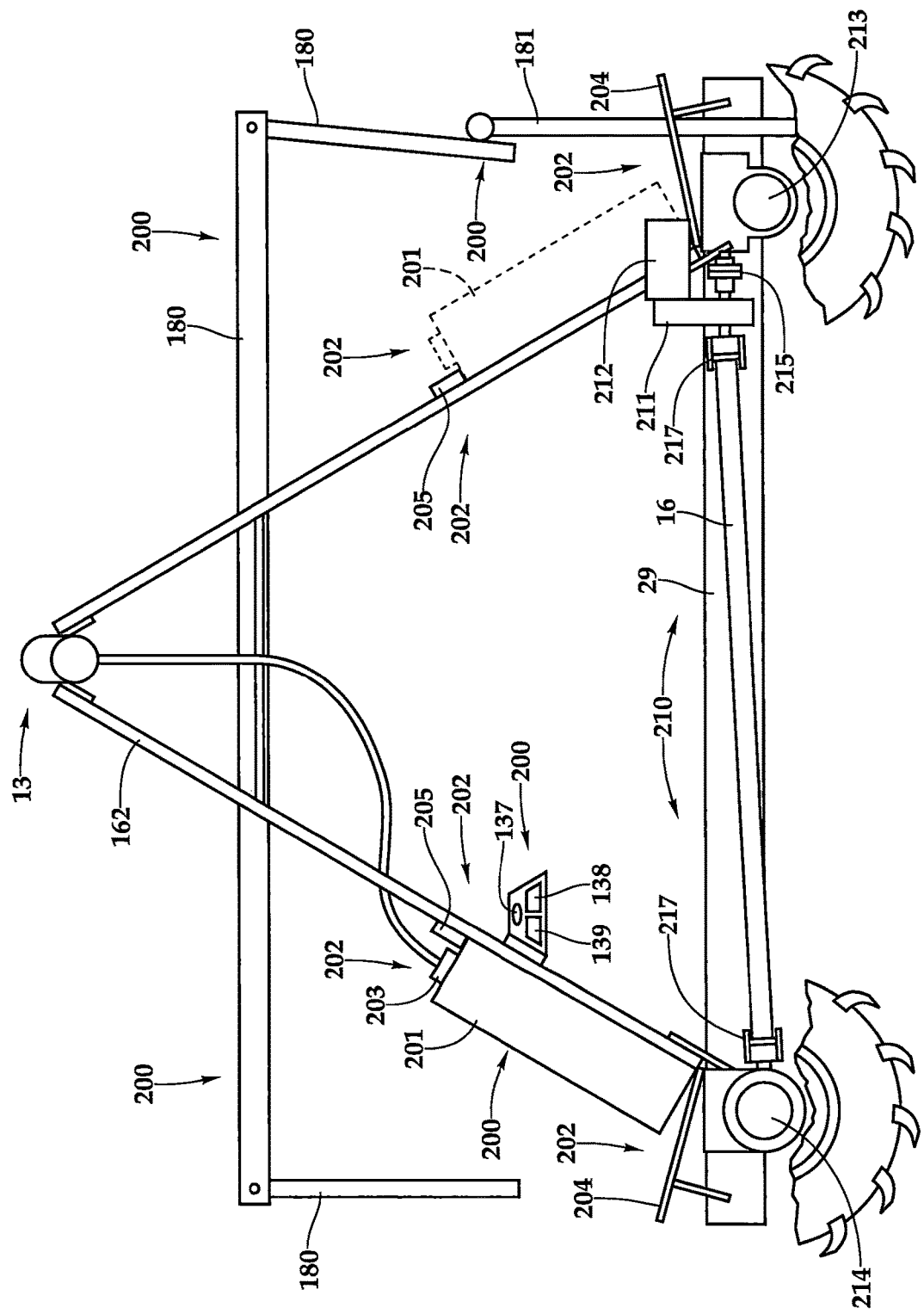
FIG. 19 is an end elevation view of a movable cart there-sporting components of a battery swap power supply and a high efficiency tower drive.

Exemplary inputs 151 also receives signal information during the later-described "System Start Up". System Start Up employs a start-up control 185. An example of start-up control 185 is illustrated in FIG. 19. Exemplary control 185 function to initiate travel of an irrigator and include a forward switch 138, a reverse switch 139 and a start button 137. (Control 185 can be located as shown or in a control panel of assembly 15 or in a control panel of connector 30 or elsewhere.)

An example of forward switch 138 (shown in FIG. 19 and as FORWARD 138 in FIG. 18) is a switch the farmer trips at "system start up" to engage a relay to cause assembly 15 to travel in a direction designated by the installer as being "forward". Exemplary witch 136 (or the relay) is wired by the installer to input 138 of controller 150. Exemplary switch 136 is a presently employed component on center-pivot and on linear move irrigators.

An example of reverse switch 139 (shown in FIG. 19 and as REVERSE 139 in FIG. 18) is a switch the farmer trips at "system start up" to engage a relay to cause assembly 15 to travel in a direction designated by the installer as being "reverse". Exemplary switch 139 (or the relay) is wired by the installer to input 139 of controller 150. Exemplary switch 139 is a presently employed component on center-pivot and on linear move irrigators.

Exemplary start button 137 (shown in FIG. 19 and as START 137 in FIG. 18) is a push button switch that the farmer pushes at "system start up" (subsequent to the tripping of one of either forward switch 138 or reverse switch 139) to begin operation of connector 30 (controller 150 subsequently initiating travel of assembly 15). Controller 150 responds to a signal from pushed button 137 by starting an operating program internal to controller 150. (Button 137 is unique to system 10 employing connector 30, i.e. not a conventionally deployed switch. Button 137 can be located in the control panel at pipe assembly 15 or in a panel at connector 30 or elsewhere.) Outputs 152 (shown as OUTPUTS 152 in FIG. 18) sends signal information to devices.

Outputs 152 sends signal information to the previous-discussed: carriage "in" switch 144, carriage "out" switch 143, swing arm "up" solenoid 103, swing arm "down" solenoid 104, slow solenoid 154, forward swing solenoid 127, reverse swing solenoid 128, inlet drive 18*a* and far drive 18*b*.

Outputs 152 also sends signal information to a power off 142, a raise pressure 182, a lower pressure 183 and a hydraulic pump 184.

Power off 142 is shown as POWER OFF 142 in FIG. 18. Exemplary power off 142 when energized by controller 150 trips a shutdown relay. What the tripped relay shuts down depends upon the power supply powering assembly 15 (and also powering connector 30). In one example, if the power supply is a diesel generator, the tripped relay will shut down the ignition system of the generator causing the generator to stop operating. In another example, if the power supply is a battery, the tripped relay will disconnect all power supplied by the battery. (As one example, programming in controller 150 responds to an event being timed by operations timer 153 that has not concluded within a set/programmed amount of time by signaling power off 142.)

Raise pressure 182 is shown as RAISE PRESSURE 182 in FIG. 18. Exemplary raise pressure 182 when energized causes a radio signal to be sent to a device causing that device to raises the water pressure in water main 11. The device can be, for example, a pump supplying water to main 11, a variable frequency drive that controls the operation of a pump supplying water to main 11, a control valve located between water main 11 and a water supply pump or can be other. As one example, energized raise pressure 182 causes a radio signal to be sent that turns on a pump that supplies water to water main 11.

Lower pressure 183 is shown as LOWER PRESSURE 183 in FIG. 18. Exemplary lower pressure 183 when energized causes a radio signal to be sent to a device causing that device to lower the water pressure in water main 11. The device can be, for example, a pump supplying water to main 11, a variable frequency drive that controls the operation of a pump supplying water to main 11, a control valve located between water main 11 and a water supply pump or can be other. As one example, energized lower pressure 183 causes a radio signal to be sent that turns off a pump that supplies water to water main 11.

Hydraulic pump 184 is shown as HYDRAULIC PUMP 184 in FIG. 18. Exemplary pump 184 is an off-the-shelf three gallon per minute 2000 psi hydraulic pump including a fluid reservoir. When energized, pump 184 supplies pressurized hydraulic fluid to operate hydraulic cylinder 106 of lift 100 and to operate hydraulic cylinder 126 of swinger 120.

Operation

An example of operation of linear-move irrigation system 10 where system 10 comprises automated connector 30 and linear-move water delivery pipe assembly 15 will now be given (with reference to FIGS. 1, 2a, 2b, 2c, 2d and 18). For this example, connector 30 includes swing arm 40, compensator 60, valve coupler 80, lift 100, swinger 120, guidance 130 and control 140.

Coupler body 85 has been positioned (by swinger 120) within a vicinity above a next-up access valve 12 and, subsequently, coupler body 85 has been coupled by valve coupler 80 to the next-up access valve 12.

Connector 30 and assembly 15 are now positioned as illustrated in FIG. 2a. Programmable controller 150 activates raise pressure 182 (shown as RAISE PRESSURE 182 in FIG. 18) which sends a radio signal to a supply pump which responds by turning itself on. The resultant flowing water rushes out of main 11, through riser 23, through the access valve 12, through coupler body 85, through free-rotating-elbow transfer 70, through top pipe 41, into pipe assembly 15 (see FIG. 4), out of the series of water applicators plumbed to assembly 15 and onto the field surface. When connector 30 and pipe assembly 15 are full of water, water pressure in the system rises and achieving designed system operating pressure trips/activates pressure sensor 136 (shown as H2O PRES. 136 in FIG. 18). Provided sensor 136 has activated within a prescribed amount of elapsed time as measured by operations timer 153 (shown as OPS. TIMER 153 in FIG. 18), controller 150 will respond to the tripped/activated sensor 136 by initiating travel of pipe assembly 15 by employing a run signal from percentage timer 145 (shown as P. TIMER 145 in FIG. 18). Sensor 136 has in fact activated within the prescribed amount of elapsed time and so controller 150 employs the percentage timer 145 run signal. Controller 150 also starts elapsed time timer A 141 (Shown as TIMER A 141 in FIG. 18).

An example of one "operational cycle" begins here (connector 30 and assembly 15 positioned as illustrated in FIG. 2a with coupler body 85 coupled to access valve 12a): Employed by controller 150, percentage timer 145 dictates run time for the drive motor on drive 18a, inlet end 20 of assembly 15 and for the drive motor on drive 18b, far end 21 of assembly 15 (shown as INLET DRIVE 18a and FAR DRIVE 18b respectively in FIG. 18). (The drives 18 of the remaining carts 14 operate when triggered by span alignment switches.) With percentage timer 145 employed, during each run time interval signal from timer 145, controller 150 operates drives 18a and 18b. The elapsed time that drives 18a and 18b operate is measured and cumulatively registered by timer A 141 until the travel of pipe assembly 15 causes rails 62 to translate across rollers 63 repositioning carriage 61 toward delivery-pipe end 55 of swing arm 40 (and thus toward inlet end 20 of assembly 15) where plank set limit-switch 133 (shown as PLANK SET 133 in FIG. 18) senses the presence of carriage 61 and trips/activates. Controller 150 responds to the activated limit-switch 133 by implementing a first course correction 159 (shown as 159 in FIG. 18). Controller 150 obtains the total amount of elapsed time registered by timer A 141 and references table A 147 (TABLE A 147 in FIG. 18) to obtain the course correction. Controller 150 then pauses operation of the drive motor prescribed by table A 147 (either drive 18a or drive 18b) for the amount of time prescribed in table A 147. (Controller 150 only counts down pause time during the run interval dictated by timer 145. In other words, timer 145 remains employed by controller 150 and the course correction gets implemented during the timer 145 run intervals. For example, if the course correction is 85 seconds and each timer 145 run interval is 30 seconds long, the course correction will transpire over two full run intervals plus 25 seconds of the third run interval.)

Continuing travel of pipe assembly 15, as dictated by percentage timer 145 via controller 150, causes rails 62 to translate across rollers 63 repositioning carriage 61 further toward delivery-pipe end 55 (and thus toward inlet end 20 of assembly 15) to the location where guidance inside limit-switch 134 (shown as GUID. INSIDE 134 in FIG. 18) senses the presence of carriage 61 and trips/activates. Controller 150 responds to the activated switch 134 by starting elapsed time timer B 158 (shown as TIMER B 158 in FIG. 18). Elapsed time timer B 158 measures and cumulatively registers each interval that the signal from timer 145 instructs controller 150 to operate the drive motors of drives 18a and 18b. Continuing travel of pipe assembly 15 repositions carriage 61 farther toward inlet end 20 of assembly 15 until swing arm 40 and assembly 15 are parallel.

Connector 30 and assembly 15 are now positioned as illustrated in FIG. 2b (coupler body 85 still coupled to valve 12a). Further continuing travel of pipe assembly 15, while timer B 158 continues to measure and cumulatively register drive run time elapsed, causes rails 62 to translate back in the opposite direction across rollers 63 repositioning carriage 61 away from delivery-pipe end 55. Timer B 158 continues the measuring and registering until guidance inside limit-switch 134 no longer senses the presence of carriage 61 and de-activates. Controller 150 responds to the de-activated limit-switch 134 by implementing a second course correction 161 (shown as 161 in FIG. 18). Controller 150 obtains the total/cumulative amount of elapsed time registered by timer B 158 and references table B 148 (shown as TABLE B 148 in FIG. 18) to obtain the corresponding course correction. Controller 150 then pauses operation of the drive motor prescribed in table B 148 reference (either drive 18a motor or drive 18b motor) for the amount of run time prescribed in table B 148 (the run time as dictated in intervals provided by timer 145 to controller 150.)

Continuing travel of pipe assembly 15, as dictated by percentage timer 145 via controller 150, translates rails 62 across rollers 63 repositioning carriage 61 farther away from delivery-pipe end 55. When the position of carriage 61 nears the outer end of rails 62 (the outer end being the end of rails 62 proximate to outer end 50) end-of-rails switch 129 (shown as RAIL END 129 in FIG. 18) activates upon sensing carriage 61.

Connector 30 and assembly 15 are now positioned as illustrated in FIG. 2c. The activated switch 129 signals controller 150. Controller 150 responds by disregarding percentage timer 145 (disregarding timer 145 halts the implementation of the run intervals of assembly 15) and by activating lower pressure 183 (shown as LOWER PRESSURE 183 in FIG. 18). which sends a radio signal to a supply pump which responds by turning itself off. As a result of the turned off pump, water pressure in the system drops. Pressure sensor 136 responds to the drop by de-activating (sensor 136 stops sending its signal).

Controller 150 responds to absence of a signal from the de-activated sensor 136 by implementing lift 100 (FIGS. 8a and 8b). Controller 150 energizes hydraulic pump 184 (shown as HYDRAULIC PUMP 184 in FIG. 18) and energizes "up" solenoid 103 (shown as SW. UP 103 in FIG. 18). Energizing solenoid 103 opens solenoid valve 103 supplying pressurized hydraulic fluid from the operating hydraulic pump to cylinder 106 causing cylinder 106 to contract. Contraction of cylinder 106 pulls the top of beam 101 toward beam 121 affecting to lift outer end 50 of swing arm 40 off of the ground and thus to lift coupler body 85 off of the access valve 12.

As the top of beam 101 is pulled toward beam 121, just prior to cylinder 106 being fully contracted, a trigger comes within sensing range of "all up" limit-switch 157 (shown as ALL UP 157 in FIG. 18). Sensing the trigger activates switch 157. Activated switch 157 send a signal to controller 150. Controller 150 responds by turning off "up" solenoid 103 and subsequently by beginning operation of swinger 120 (hydraulic pump remains on).

Controller 150 begins operation of swinger 120 (FIGS. 8a and 8b) by energizing either forward swing solenoid 127 or reverse swing solenoid 128 depending upon which travel direction the farmer has chosen for pipe assembly 15. When energized, forward swing solenoid 127 (shown as F. SWING 127 in FIG. 18) supplies pressurized hydraulic fluid to cylinder 126 causing cylinder 126 to retract thus swinging swing arm 40 in the direction pipe assembly 15 travels when forward switch 138 (switch 138 shown in FIG. 19 and as FORWARD 138 in FIG. 18) has been engaged by the farmer, that direction the clockwise direction illustrated by arrow 197 in FIG. 2d.

When energized, reverse swing solenoid 128 (shown as R. SWING 128 in FIG. 18) supplies pressurized hydraulic fluid to cylinder 126 causing cylinder 126 to extend thus swinging swing arm 40 in the direction pipe assembly 15 travels when reverse switch 139 (switch 139 shown in FIG. 19 and as REVERSE 139 in FIG. 18) has been engaged, that direction opposite to the direction illustrated by arrow 197 in FIG. 2d.

For this example, has been engaged by the farmer and so controller 150 powers forward swing solenoid 127 causing swing arm 40 to swing until plank 94 and coupler body 85 have been positioned within a calculated vicinity above the next-up access valve 12b (the swing indicated by the clockwise swing arrow 197 shown in FIG. 2d) where a trigger is detected by forward vicinity limit-switch 149 (shown as F. VICINITY 149 in FIG. 18). (If assembly 15 was headed in the reverse direction a trigger is detected by reverse vicinity limit-switch 156—shown as R. VICINITY 156 in FIG. 18.) (Again, if forward switch 138 has been engaged by the farmer, forward vicinity limit-switch 149 is active to controller 150 and detects the next-up access valve positioning. If reverse switch 139 has been engaged by the farmer, reverse vicinity limit-switch 156 is active to controller 150 and detects the next-up access valve positioning.)

Controller 150 responds to a signal from the energized vicinity limit-switch (in this example forward vicinity limit-switch 149) by turning off forward swing solenoid 127 causing the swinging of swing arm 40 to halt. Controller 150 subsequently further responds by implementing horizontal positioner 90 (of valve coupler 80) to establish a horizontal orientation between coupler body 85 and this next-up access valve 12.

Connector 30 and assembly 15 now positioned as illustrated in FIG. 2d. Controller 150 begins the implementation of horizontal positioner 90 (FIGS. 12, 13 and 18) by appropriately positioning plank 94 above the next-up access valve 12. Controller 150 energizes "in" switch 144 (shown as CAR. IN 144 in FIG. 18). Energized "in" switch 144 powers carriage motor 79 to propel carriage 61 toward delivery-pipe end 55 along rails 62. Carriage 61 travels until plank set limit-switch 133 (shown as PLANK SET 133 in FIG. 18) senses the presence of carriage 61. Activated switch 133 signals controller 150 which responds by turning off switch 144 causing motor 79 to halt. Subsequently, controller 150 energizes swing arm "down" solenoid 104 (shown as SW. DOWN in FIG. 18) extending hydraulic cylinder 106. Extending hydraulic cylinder 106 lowers outer end 50 of swing arm 40 (utilizing lift 100, FIGS. 8a and 8b) until the bottom side of detector plank 94 contacts the top of the access valve 12. Further lowering causes plank 94 via frame 92 to swing upward until horizontal alignment limit-switch 131 (shown as HOR. ALIGN 131 in FIG. 18) is tripped/activated. Activated switch 131 signals controller 150 which responds by de-energizing "down" solenoid 104. Thus the extension of cylinder 106 halts. (Plank 134 is now positioned as indicated by the dashed lines 198 in FIG. 13.) Controller 150 then simultaneously energizes "up" solenoid 103 and slow solenoid 154 (shown as SW. UP 103 and SLOW 154, respectively, in FIG. 18). Retracting hydraulic cylinder 106 raises outer end 50 at a slow speed causing plank frame 92 to swing downward until horizontal alignment limit-switch 131 de-activates. Controller 150 responds to the absence of signal from switch 131 by waiting two seconds and then by de-energizing solenoids 103 and 154. Consequently, upward travel of outer end 50 halts with plank 94 positioned just above the top of the access valve 12 as illustrated in FIG. 13. A precise horizontal orientation between body 85 and valve 12 has now-been established and vertical orientation between body 85 and the valve 12 via vertical positioner 95 can begin.

Figure 14:
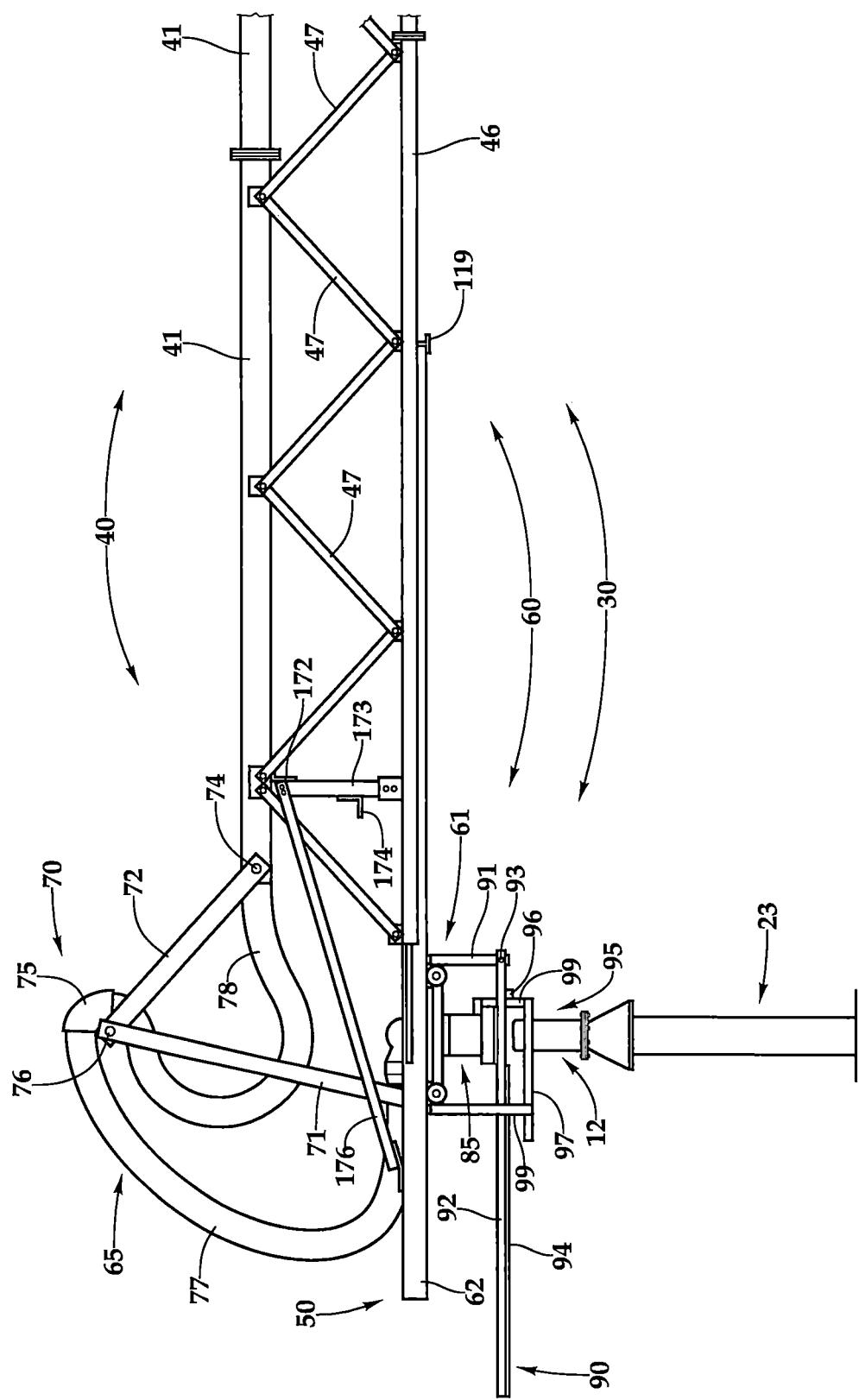
FIG. 14 is a view similar to FIG. 13 except that outward travel of the carriage has caused a v-catcher to act against the side of the access valve aligning the coupler body with the access valve.
Figure 15:
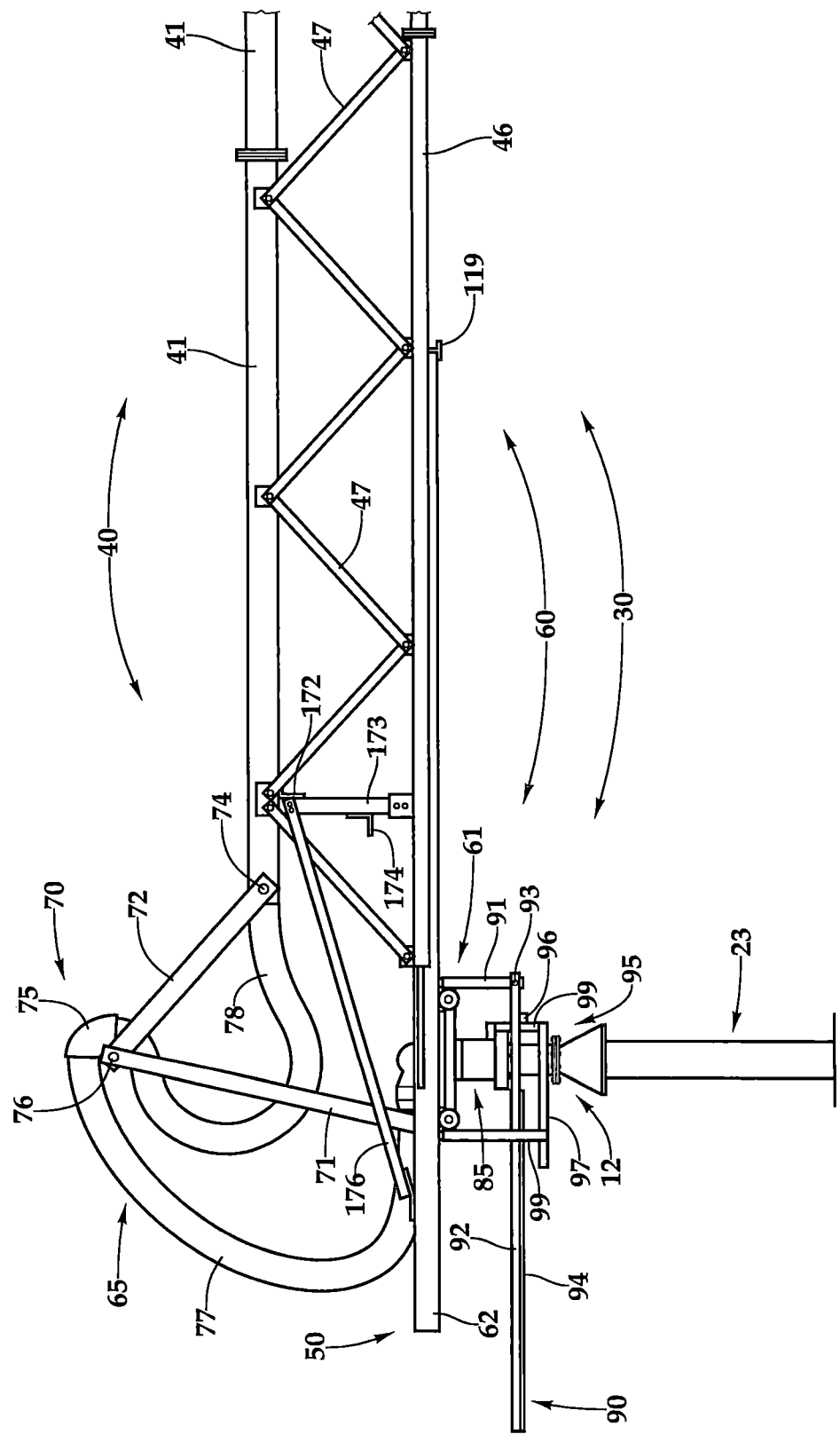
FIG. 15 is a view similar to FIG. 14 except that the coupler body has been lowered onto the access valve opening the valve.

Controller 150 then implements vertical positioner 95 to establish a vertical orientation between coupler body 85 and the access valve 12 (FIGS. 14 and 15). Controller 150 begins by energizing carriage "out" switch 143 (shown as CAR. OUT 143 in FIG. 18). The energized "out" switch 143 provides power to carriage motor 79 to propel carriage 61 outward along rails 62. The outward travel of carriage 61 causes one of the two of glider 98 (glider 98 shown in FIG. 7) to contact the side of access valve body 113. Continued outward travel pushes the one glider 98 against body 113 causing the glider 98 to slide along the side of access valve body 113 and consequently forcing swing arm 40 to swing via swinger 120. Continued outward travel of carriage 61 causes swing arm 40 to continue to swing from the force caused by glider 98 sliding against body 113 until body 113 resides wedged into the butt of v-catcher frame 97. (Body 113 thus pressed against both gliders 98.) Body 113 positioned in the butt of v-catcher frame 97 activates vertical alignment limit-switch 132 (shown as VERT. ALIGN 132 in FIG. 18). Activated switch 132 signals controller 150. Controller 150 responds to the signal by switching off carriage "out" switch 143 causing carriage motor 79 to halt and thus causing carriage 61 to halt. A vertical orientation between coupler body 85 and access valve 12 has now been established and final alignment and coupling of body 85 to access valve 12 can then commence.

Controller 150 subsequently further responds to the signal from activated limit-switch 132 by simultaneously energizing swing arm "down" solenoid 104 (solenoid 104 of lift 100, shown as SW. DOWN in FIG. 18) and activating operations timer 153 (shown as OPS. TIMER 153 in FIG. 18). The energized "down" solenoid 104 extends hydraulic cylinder 106. Extending hydraulic cylinder 106 lowers outer end 50 with coupler body 85. The lowering body 85 engages pre-couple alignment cone 83 with the top edge of valve body 113 (body 113 of the access valve 12) causing the position of body 85 to slightly adjust horizontally as body 85 lowers until cone 93 clears the top edge of body 113. Further lowering by coupler 80 causes body 85 to slide over the perimeter of body 113. Further lowering engages valve plunger 82 with the stem of poppet valve 17 (poppet valve 17 of the access valve 12). Further lowering causes plunger 82 to push down valve 17 opening access valve 12 enabling water from water main 11 to flow into coupler body 85. Further lowering further pushes down valve 17 until valve spring 18 is fully compressed and so valve 17 is all the way down and the weight at outer end 50 is sitting on riser 23.

After energizing swing arm "down" solenoid 104, controller 150 waits five seconds (for downward traveling coupler body 85 to fully open valve 12) and then energizes raise pressure 182. (Controller 150 also de-energizes hydraulic pump 184.) Energized raise pressure 182 causes a radio signal to be sent to the supply pump which responds by turning on. System pressure rises until pressure switch 136 is triggered/activated. Previously activated operations timer 153 has measured the elapsed time between the energizing of swing arm "down" solenoid 104 and the subsequent trigger of pressure switch 136. If switch 136 activates with timer 153 showing an elapsed time that's more than allowed for this operation, controller 150 energizes lower pressure 183 and energizes system power off 142. If switch 136 activates with timer 153 showing am elapsed time that's less than the maximum time allowed, controller 150 proceeds by employing the run signal from percentage timer 145 and by starting elapsed time timer A 141 (shown as TIMER A 141 in FIG. 18). For this operational example, timer 153 has shown a registered elapsed time that's less than maximum time allowed for this operation and controller 150 has proceeded to employ the run signal from percentage timer 145 and has started elapsed time timer A 141

This example of one "operational cycle" ends here. Connector 30 and assembly 15 are now positioned as illustrated in FIG. 2d with coupler body 85 coupled to access valve 12b. Controller 150 controls connector 30 to repeat this "operational cycle", access valve 12 after access valve 12 after access valve 12, typically until assembly 15 reaches the end of the field being irrigated.

As detailed in the above example of one "operational cycle", the exemplary connector 30 forwards coupler body 85 from being coupled to a valve 12 to a next-up access valve 12 as follows: Signaling to decrease pressure in the water main 11 (LOWER PRESSURE 183, FIG. 18), verifying that the pressure has been decreased (H2O PRES. 136, FIG. 18), uncoupling (lifting) coupler body 85 from (off of) the access valve 12 (lift 100), moving (swinging) coupler body 85 to a position proximate to the next-up access valve 12 (swinger 120), coupling body 85 to the next-up valve 12 (valve coupler 80), signaling to increase pressure in water main 11 (RAISE PRESSURE 182, FIG. 18) and verifying that pressure has been increased (H2O PRES. 136, FIG. 18).

System 10 can be configured as back and forth travel, water main 11 with valves 12 there-mounted being positioned along the edge of a field as illustrated in FIG. 3a. In another configuration, water main 11, with access valves 12, is positioned down the center of a field as illustrated in FIG. 3b. Pipe assembly 15 irrigates along one side of main 11 (shown as FIELD A in FIG. 3b). Assembly 15 is then dry rotated to a position along the opposite side of water main 11 where pipe assembly 15 subsequently is employed to irrigate along that side of main 11 (shown as FIELD B in FIG. 3b). The semi-circle dashed lines in FIG. 3b illustrates the rotation of assembly 15 about valve 12d to the edge of FIELD B. A barricade 181 trips a barricade switch 180 which turns off the power supply concluding the rotation. (Barricade 181 and switch 180 are described below. The same operational shutdown is employed at the end of Field A.) Subsequent to the rotation, the farmer visits the irrigator and initiates system travel across FIELD B. Assembly 15 irrigates across FIELD B, supplied water and guided by connector 30, until reaching the field end where barricade 181 trips switch 180. Connector 30 and assembly 15 are then positioned as illustrated in FIG. 3b with coupler body 85 coupled to access valve 12c.

(This rotation capability of assembly 15, for example using an access valve as an anchor, enables pipe assembly 15 to be employed on various field shapes as both a linear-move irrigator and as a center-pivot irrigator. As one example, after completing the irrigation of FIELD A in FIG. 3b, assembly 15 can be rotated counter-clockwise while irrigating, thus irrigating a half circle. As another example, after completing the irrigation of FIELD A, assembly 15 can be rotated ninety degrees operating as a center-pivot irrigator, irrigating the quarter circle, and can then linear irrigate a field in its newly headed direction. As another example, after completing the irrigation of FIELD A, assembly 15 can be dry rotated ninety degrees and subsequently can then linear irrigate a field in its newly headed direction.

System Start Up.

An example of system start up will now be given. For this example, linear-move delivery pipe assembly 15 and connector 30 reside at a field end coupled to an access valve 12c (valve 12c shown in FIG. 3a). Connector 30 is thus oriented relative to assembly 15 as illustrated in FIG. 2b with coupler body 85 located near the delivery-pipe end 55 of rails 62 as illustrated in FIG. 4. (For most/all installations, linear move pipe assembly 15 gets parked at the edge of a field with coupler body 85 left coupled to the respective valve 12 as shown.)

Sir Farmer visits the field and fires up the power supply (e.g. starts a generator or trips a contactor to connect a battery to drive 18). Sir farmer then utilizes the prior-described start-up control 185 (shown in FIG. 19) to initiate travel of an irrigator by engaging either reverse switch 139 (shown as REVERSE 139 in FIG. 18) or forward switch 138 (shown as FORWARD 138 in FIG. 18) and then by pushing start button 137 (shown as START 137 in FIG. 18).

For this example, the farmer engages forward switch 138. Engaged switch 138 triggers an electrical contactor. The triggered contactor supplies power for operation of drives 18 in the forward direction. Therefore, during run intervals drives 18 are powered to propel pipe assembly 15, for this example, in the direction of the big arrow shown in FIG. 3a.

The pushed start button 137 begins operation of automated connector 30 (and subsequently of assembly 15). Controller 150 responds by initiating an internal operating program. Controller 150 then energizes raise pressure 182 which causes a signal to be sent to a water supply pump. Controller 150 waits while the turned-on pump fills assembly 15 until designed operating pressure is reached as indicated by the triggering of pressure switch 136. Controller 150 responds to triggered switch 136 by engaging the run cycles of percentage timer 145. With delivery pipe assembly 15 residing at the field end and oriented relative to connector 30 as illustrated in FIG. 2b, carriage 61 resides along rails 62 where guidance inside limit-switch 134 is already tripped. Controller 150, according to start-up programming, knows active switch 134 was not preceded by a non-activated state and so controller 134 does not initiate any course correction. Rather, controller 150 simply passes along the run intervals dictated by timer 145 and pipe assembly 15 travels forward during those intervals causing rails 62 to translate across rollers 63 until carriage 61 triggers end-of-rails limit-switch 129. (Connector 30 and assembly 15 are now positioned as illustrated in FIG. 2c.) From here, controller 150 controls connector 30 to uncouple coupler body 85, swing outer end 50 to position coupler body 85 above a next-up access valve 12 and couple body 85 to that next-up access valve 12. (Controller 150 responds by disregarding percentage timer 145, energizing lower pressure 183 sending a radio signal to the supply pump which responds by turning off. System pressure drops. Pressure sensor 136 de-activates. Controller 150 implements lift 100, subsequently implements swinger 120 and subsequently implements valve coupler 80.)

Controller 150 controls connector 30 to repeat the prior-discussed "operational cycle" access valve 12 after access valve 12 until assembly 15 reaches the end of the field where an end-of-field barricade 181 triggers a barricade switch 180. Triggered switch 180 instructs controller 150 to shutdown system 10. (Barricade 180 and switch 181 described below. For this example, pipe assembly 15 and connector 30 consequently reside as shown at the end of the field in FIG. 3a with coupler body 85 coupled to access valve 12d.)
Designated Shutdown.

Exemplary system 10 employs a designated shutdown 190. Designated shutdown 190 functions to shutdown an irrigator at a designated location. An example of designated shutdown 190 is illustrated in FIG. 19. The exemplary shutdown 190 includes a barricade switch 180 and an end-of-field barricade 181. (Exemplary shutdown 190 is presently employed on today's center pivot and linear-move irrigators.)

Exemplary barricade switch 180 (FIG. 19) includes a 10 feet long three inch diameter 14 gauge steel tube bolted to the front side of the two closest tower legs 162. Two four foot long one inch diameter steel rods are spring loaded attached, one at each end of the steel tube so as to extend downward vertically. Barricade switch 180 includes two switches and deflection of either rod via the spring trips a respective one of the switches sending a signal to shutdown 135 (FIG. 18).

Exemplary end-of-field barricade 181 is fixed/planted in the ground at a location designated by the system installer. (Most often the designated location is the end of a field.) Exemplary barricade 181 a six feet long four inch diameter 12 gauge wall steel tube extending horizontally with a downward vertical leg welded to each end. Each leg is an nine foot long four inch diameter 12 gauge wall steel tube having the bottom two feet buried in the ground.

Travel of delivery pipe assembly 15 toward barricade 181 results in the closest rod of barricade switch 180 contacting the barricade 181 causing the rod to deflect about the spring loading until a switch is triggered which energizes shutdown 135. Controller 150 responds by causing the water pump to shut off via lower pressure 183 and by turning off the power supply. In this way, delivery pipe assembly is shutdown at the designated location.

A battery swap power supply 200 provides benefit to linear-move and center pivot irrigators. An example of battery swap power supply 200 is illustrated in FIG. 19. The exemplary power supply 200 functions to power irrigator travel. The exemplary battery swap power supply 200 includes the prior-described start-up control 185 and the prior-described designated shutdown 190. Exemplary battery swap power supply 200 also includes at least two of a rechargeable battery 201 and swapping hardware 202.

Exemplary rechargeable battery 201 is a battery that can be recharged. In one example, battery 201 can be a 24 volt D.C. battery. In another example, battery 201 can be a 450 volt D.C. battery. In another example, battery 201 can be a 650 volt A.C. battery. (In one configuration of power supply 200, the voltage of battery 201 matches the operating voltage of drives 18. In another configuration of power supply 200, the voltage of battery 201 is conditioned (inverted and/or transformed etc.) to achieve the operating voltage of drives 18.) In one example, battery 201 has a storage capacity of 60 kilowatts.

Exemplary swapping hardware 202 (FIG. 19) includes an interchange connector 203 and can include two of a landing pad 204 and can include two of a keeper 205. Exemplary interchange connector 203 is a battery connector that can be connected to and disconnected from battery 201 and in a reasonable period of time (for example, in five minutes). Exemplary landing pad 204 is a three feet long 12 inch wide one-quarter inch thick steel plate. One pad 204 is welded atop the left end of base-beam 29 and the other pad 204 is welded atop the right end of base-beam 29. Keeper 205 is a knob-tightened latch that locks battery 201 to a respective tower leg 162.

As an example of the operation of battery swap power supply 200, the system installer has designated a preferred location for exemplary pipe assembly 15 to be shut down and has installed barricade 181 to facilitate a shutdown at that location. Assembly 15 travels/irrigates across a field until barricade switch 180 is tripped by barricade 181 causing assembly 15 to be shutdown. (As one example, see FIG. 3a where connector 30 is coupled to valve 12d.) At some later date when irrigation (or rotation) is scheduled to be resumed, Sir farmer visits assembly 15 to start up the system. He brings along a freshly charged battery 201 in his truck bed. He slides battery 201 from his truck bed and onto a respective one of the pads 204 with the outer end of battery 201 then swung upward and toward the respective tower leg 162 where the respective keeper 205 is employed to lock battery 201. He then disconnects interchange connector 203 from the mostly discharged battery resting on the other shown tower leg 162 and connects the connector to the newly installed battery 201. (The newly installed battery is shown locked in place in FIG. 19.) Sir farmer then backs his truck up to the other pad 204, unlocks that battery 201, tips it toward his truck bed and slides what is a mostly discharged battery 201 into the truck bed. (The battery 201 of the right-hand pad 204 in FIG. 19 represented by dashed lines was where the discharged battery 201 had been located.) Sir farmer then employs start-up control 185 to initiate travel/irrigation of assembly 15 now powered by the recharged battery and returns home and connects a battery charger to the discharged battery 201. (There is no grid power at the irrigated field and swapping batteries means that the irrigator need not sit idle while a solo battery is being charged.) When switch 180 of assembly 15 gets tripped by the next barricade 181, say three days later, the charging battery is ready to go!

A high efficiency tower drive 210 provides benefit to linear-move and center pivot irrigators. An example of high efficiency tower drive 210 is illustrated in FIG. 19. Exemplary high efficiency tower drive 210 functions to provide self-locking braking and efficiency. Exemplary high efficiency tower drive 210 includes a drive gearbox 211, a motor 212, a self-locking gearbox 213, a non-self-locking gearbox 214, a coupler 215, a driveline 216 and a two of a universal joint 217. (Tower drive 210 can be employed on a center-pivot irrigator and can be employed on a linear-move irrigator.)

Exemplary drive gearbox 211 is a 40:1 ratio helical gear gearbox (92% efficient).

Exemplary motor 212 is a three-quarter horsepower electric motor.

Exemplary self-locking gearbox 213 is a 50:1 worm drive gearbox (45% efficient).

Exemplary non-self-locking gearbox 214 is a 50:1 planetary gearbox (90% efficient).

Exemplary coupler 215 is a flexible shaft coupling capable to handle minor misalignment.

Exemplary driveline 216 is a three inch O.D. 12 gauge steel tube approximately nine feet in length with a coupling shaft welded to each end.

Exemplary universal joint 217 is a flexible couple capable to handle major misalignment such as that shown between gearbox 211 and gearbox 214.

Gearbox 211, gearbox 213 and gearbox 214 are all bolted to base-beam 29. Motor 212 is bolted to gearbox 211. Gearbox 211 is coupled to self-locking gearbox 213 via coupler 215 and is coupled on the opposite side to one end of driveline 216 via universal joint 217. The other end of driveline 216 is coupled via the other universal joint 217 to non-self-locking gearbox 214.

(In one variation, motor 212 is coupled directly to one or the other of gearbox 213 and gearbox 214, coupled to a shaft on the outer side, with driveline 215 displaced between the two gearboxes 213 and 214. In other words, drive gearbox 211 is eliminated (meaning the gear ratios on boxes 213 and 214 need be increased to achieve the same output rpm as exemplary drive 210.)

In compliance with the statute, the invention has been described in language more or less specific as to structural features. It is to be understood, however, that the invention is not limited to the specific features shown, since the construction herein disclosed comprises a preferred form of putting the invention into effect. The invention is, therefore, claimed in any of its forms or modifications within the proper scope of the appended claims, appropriately interpreted in accordance with the doctrine of equivalents.

I claim:

1. An apparatus to successively connect a linear-move water delivery pipe assembly along a series of water main access valves, the delivery pipe assembly having an inlet end, the apparatus comprising:

a swing arm defined by an outer end;

a compensator residing proximate to the outer end and configured to accommodate distance change between a coupled-to access valve and the delivery pipe assembly when the pipe assembly travels linearly, the distance change accommodated parallel to the length of the swing arm;

a valve coupler comprising a coupler body mounted to the compensator, the valve coupler configured to couple the coupler body to a selected access valve to intake water from the water main, the water for supply to the inlet end of the delivery pipe assembly;

a lift configured to hold the swing arm off the ground; and a swinger configured to swing the held swing arm to position the coupler body for coupling to a next-up access valve.

2. The apparatus of claim 1 and wherein the coupler body is swung directly between a previously coupled to access valve to the next up access valve.

3. The apparatus of claim 1 and wherein the valve coupler utilizes the compensator to position the coupler body relative to the access valve.

4. The apparatus of claim 1 and wherein the compensator is configured for coupler body travel along a length of the swing arm.

5. The apparatus of claim 4 and wherein the swing arm comprises a supply pipe and the compensator is configured to transfer water flow from the coupler body to the supply pipe employing a free-rotating elbow.

6. The apparatus of claim 5 and further comprising a flexible hose between the coupler body and the free-rotating elbow and a flexible hose between the free-rotating elbow and the supply pipe.

7. The apparatus of claim 6 and further comprising a set of positioning struts between the coupler body and the free-rotating elbow and a set of positioning struts between the free-rotating elbow and the supply pipe.

8. The apparatus of claim 1 and wherein the valve coupler is configured to act between the water delivery pipe assembly and the swing arm to at least one of: raise and lower the coupler body.

9. The apparatus of claim 1 and wherein the lift is counterbalanced by at least some of the weight of the delivery pipe assembly.

10. The apparatus of claim 9 and wherein the counterbalance includes at least one rabbit ear.

11. The apparatus of claim 1 and wherein the lift is configured to act between the water delivery pipe assembly and the swing arm to lift the swing arm in a substantially vertical plane.

12. The apparatus of claim 1 and wherein the valve coupler utilizes the lift to raise and lower the swing arm.

13. The apparatus of claim 1 and wherein the swinger is configured to act between the water delivery pipe assembly and the swing arm to swing the swing arm.

14. The apparatus of claim 1 and wherein the swing arm is held off of the ground with a cantilever.

15. The apparatus of claim 14 and wherein the valve coupler is configured to act between the water delivery pipe assembly and the swing arm to at least one of: raise and lower the coupler body.

16. The apparatus of claim 14 and wherein the swinger is configured to act between the water delivery pipe assembly and the swing arm to swing the outer end of the swing arm.

17. The apparatus of claim 14 and wherein the cantilever is counterbalanced by at least some of the weight of the delivery pipe assembly.

18. The apparatus of claim 14 and wherein the valve coupler utilizes the compensator to position the coupler body relative to the access valve.

19. The apparatus of claim 14 and wherein the valve coupler utilizes the swinger to position the coupler body relative to the access valve.

20. A method for successively connecting a coupler body along a series of water main access valves, the coupler body residing at an outer end of a swing arm, the other swing arm end connected to a delivery pipe assembly having an inlet end and configured to travel linearly along the series of valves, the method comprising:
- accommodating distance change between a coupled-to access valve and the delivery pipe assembly when the pipe assembly travels linearly, the distance change accommodated parallel to the length of the swing arm;
- coupling the coupler body to the access valve to intake water from the water main, the water for supply to the inlet end of the delivery pipe assembly;
- uncoupling the coupler body from the access valve;
- holding the swing arm off the ground; and
- swinging the held swing arm to position the coupler body for coupling to a next-up access valve.

* * * * *